(12) United States Patent
Wu et al.

(10) Patent No.: US 9,093,082 B2
(45) Date of Patent: Jul. 28, 2015

(54) DATA STORAGE DEVICES AND METHODS

(75) Inventors: Pingfan Peter Wu, Woodbury, MN (US); Brian Lee Lawrence, Niskayuna, NY (US); Zhiyuan Ren, Malta, NY (US); John Erik Hershey, Ballston Lake, NY (US); Xiaolei Shi, Niskayuna, NY (US); Kenneth Brakeley Welles, Scotia, NY (US); John Anderson Fergus Ross, Niskayuna, NY (US); Victor Petrovich Ostroverkhov, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 1443 days.

(21) Appl. No.: 12/343,288

(22) Filed: Dec. 23, 2008

(65) Prior Publication Data
US 2010/0157772 A1    Jun. 24, 2010

(51) Int. Cl.
| | |
|---|---|
| *G03H 1/02* | (2006.01) |
| *G11B 7/0065* | (2006.01) |
| *G03H 1/04* | (2006.01) |
| *G11B 7/1362* | (2012.01) |
| *G11B 7/1369* | (2012.01) |
| *G11B 7/24044* | (2013.01) |
| *G03H 1/30* | (2006.01) |

(Continued)

(52) U.S. Cl.
CPC ............ *G11B 7/0065* (2013.01); *G03H 1/0248* (2013.01); *G03H 1/0404* (2013.01); *G11B 7/1362* (2013.01); *G11B 7/1369* (2013.01); *G11B 7/24044* (2013.01); *G03H 1/30* (2013.01); *G03H 2001/0264* (2013.01); *G03H 2001/0497* (2013.01); *G11B 7/245* (2013.01); *G11B 7/248* (2013.01); *G11B 2007/0009* (2013.01)

(58) Field of Classification Search
CPC ............ G03H 1/30; G03H 2001/0497; G03H 1/0248; G03H 1/0264; G03H 1/0404; G11B 7/0065; G11B 7/1362; G11B 7/1369; G11B 7/24044; G11B 7/245; G11B 7/248; G11B 2007/0009
See application file for complete search history.

(56) References Cited

U.S. PATENT DOCUMENTS 4,385,372 A * 5/1983 Drexler .................... 369/109.02
4,758,499 A * 7/1988 Abe et al. ................. 430/270.15
(Continued)

FOREIGN PATENT DOCUMENTS

JP          03-160638       *  7/1991

OTHER PUBLICATIONS

Horigome et al., "recording capacity enhancement of micro-reflector recording" Jap. J. Appl. Phys., vol. 47(7) pp. 5881-5884 (Jul. 2008).*

(Continued)

*Primary Examiner* — Martin Angebranndt
(74) *Attorney, Agent, or Firm* — Jean K. Testa; Fletcher Yoder, P.C.

(57) ABSTRACT

A data storage device comprises a substrate having oppositely disposed surfaces and a plurality of volumes arranged along tracks between the surfaces; a plurality of micro-holograms each contained in a corresponding one of the volumes; and, at least one groove in at least one of the surfaces and being operative to diffract light through the at least one surface and into the volumes; wherein, the presence or absence of a micro-hologram in a stacked layer in each of the volumes is indicative of a corresponding portion of data stored.

7 Claims, 41 Drawing Sheets

(51) Int. Cl.
    *G11B 7/245* (2006.01)
    *G11B 7/248* (2006.01)
    *G11B 7/00* (2006.01)

(56) References Cited

U.S. PATENT DOCUMENTS

| | | | |
|---|---|---|---|
| 5,111,445 | A | 5/1992 | Psaltis et al. |
| 5,339,305 | A | 8/1994 | Curtis et al. |
| 5,377,176 | A | 12/1994 | Redfield |
| 5,438,439 | A | 8/1995 | Mok et al. |
| 5,481,523 | A | 1/1996 | Dewald |
| 5,526,337 | A | 6/1996 | Housey et al. |
| 5,756,648 | A | 5/1998 | Lee |
| 5,759,721 | A | 6/1998 | Dhal et al. |
| 5,982,513 | A | 11/1999 | Zhou et al. |
| 5,995,292 | A | 11/1999 | McDonald |
| 6,020,985 | A | 2/2000 | McLeod et al. |
| 6,055,174 | A | 4/2000 | Zhou et al. |
| 6,097,514 | A | 8/2000 | Nishikawa |
| 6,104,511 | A | 8/2000 | Hesselink et al. |
| 6,111,828 | A | 8/2000 | McLeod et al. |
| 6,147,782 | A | 11/2000 | Daiber et al. |
| 6,157,470 | A | 12/2000 | Buse et al. |
| 6,212,148 | B1 | 4/2001 | Hesselink et al. |
| 6,256,271 | B1 | 7/2001 | McLeod |
| 6,288,804 | B1 | 9/2001 | Daiber et al. |
| 6,288,986 | B1 | 9/2001 | McDonald et al. |
| 6,310,850 | B1 | 10/2001 | Sochava et al. |
| 6,322,931 | B1 | 11/2001 | Cumpston et al. |
| 6,322,933 | B1 | 11/2001 | Daiber et al. |
| 6,512,606 | B1 | 1/2003 | Lipson et al. |
| 6,540,397 | B2 | 4/2003 | Yoshinari et al. |
| 6,549,664 | B1 | 4/2003 | Daiber et al. |
| 6,563,779 | B1 | 5/2003 | McDonald et al. |
| 6,574,174 | B1 | 6/2003 | Amble et al. |
| 6,625,100 | B2 | 9/2003 | Edwards |
| 6,992,805 | B2 | 1/2006 | Ingwall et al. |
| 7,052,812 | B1 | 5/2006 | Wang et al. |
| 2001/0030934 | A1 | 10/2001 | Lipson et al. |
| 2002/0114027 | A1* | 8/2002 | Horimai ............ 359/11 |
| 2002/0191501 | A1* | 12/2002 | Ueno ............ 369/44.13 |
| 2003/0123380 | A1 | 7/2003 | Waldman et al. |
| 2004/0004914 | A1 | 1/2004 | Ceshkovsky |
| 2004/0009406 | A1 | 1/2004 | Hesselink et al. |
| 2004/0030732 | A1 | 2/2004 | Gerspach et al. |
| 2005/0046915 | A1 | 3/2005 | Takizawa et al. |
| 2005/0136333 | A1 | 6/2005 | Lawrence et al. |
| 2006/0227398 | A1* | 10/2006 | Lawrence et al. ....... 359/15 |
| 2008/0068959 | A1* | 3/2008 | Saito ............ 369/53.19 |
| 2008/0285392 | A1* | 11/2008 | Fukushima ........ 369/44.11 |
| 2010/0157774 | A1* | 6/2010 | Ren et al. ........ 369/103 |
| 2010/0165817 | A1* | 7/2010 | Shi et al. ........ 369/103 |

OTHER PUBLICATIONS

Saito et al., "Drive system and readout characteristics of microreflector optical disc", Proc. SPIE 6620 pp. 66200B-1 to 6620B-5 (on line Jul. 11, 2007).*
Translation of jp 03-160638 (1991).*
S. Sakurai, "Control of Morphology in Block Copolymers", Trip, vol. 3, No. 3. 90-98 (1995).
T.M. Miller et al, Proc. SPIE 5069, 269 (2003).
R. McLeod et al, "Microholographic multilayer optical disc storage," Appl. Opt. 44, 3197-3207 (2005).
M. Nakano et al., "Light Propagation in a Multilayered Medium for Three-Dimensional Optical Memory", Applied Optics, vol. 44, No. 28, 5966-5971 (2005).
O. Matoba et al., "Reflection-Type Holographic Disk Memory With Random Phase Shift Multiplexing", Applied Optics, vol. 45, No. 14, 3270-3274 (2006).
J. S. Splitter et al., "The Photochemical Behavior of Some o-Nitrostilbenes", Contribution From the Department of Chemistry and Radiation Laboratory, vol. 20, 086-1115 (1955).
H. Kogelnik, "Coupled Wave Theory for Thick Hologram Gratings", The Bell System Technical Journal, vol. 48, No. 9, 2909-2947 (1969).
I. A. McCulloch, "Novel Photoactive Nonlinear Optical Polymers for Use in Optical Waveguides", Macromolecules, American Chemical Society, vol. 27, No. 7, 1697-1702 (1994).
M. M. Wang et al., "Three-Dimensional Holographic Stamping of Multilayer Bit-Oriented Nonlinear Optical Media", Applied Optics, vol. 39, No. 11, 1835-1841 (2000).
Y. L. Loo et al., "Polymer Crystallization in 25-nm Spheres", Physical Review Letters, The American Physical Society, vol. 84, No. 18, 4120-4123, (2000).
P. Huang et al., "Crystal Orientation Changes in Two-Dimensionally Confined Nanocylinders in a Poly(ethylene oxide)-b-polystyrene/Polystyrene Blend", Macromolecules, American Chemical Society, vol. 34, No. 19, 6649-6657 (2001).
S. Orlic et al., "High Density Multilayer Recording of Microgratings for Optical Data Storage", Proceedings of SPIE, vol. 5521, pp. 161-173, 2004.
L. Hesselink et al., "Holographic Data Storage Systems", Proceedings of the IEEE, vol. 92, No. 8, 1231-1280, (2004).
S. K. Park et al., "Master and Slave Beam Servo Technique for Volumetric Bit-Wise Optical Data Storage", Japanese Journal of Applied Physics, vol. 44, No. 5B, 3442-3444 (2005).
I. Ichimura et al., "Proposal for a Multilayer Read-Only-Memory Optical Disk Structure", Applied Optics, vol. 45, No. 8, 1794-1803 (2006).
R. R. McLeod et al., "Holographic Storage Without Holography: Optical Data Storage by Localized Alteration of a Format Hologram", Optical Society of America (2005).
M. Dubois et al., "Characterization of Microholograms Recorded in a Thermoplastic Medium for Three-Dimensional Optical Data Storage", Optical Society of America, vol. 30, No. 15, pp. 1947-1949, Aug. 1, 2005.
C.H.Wang et al., "Holographic Grating Studies of the Diffusion Process of Camphorquinone in Polycarbonate above and below Tg", Macromolecules, vol. 21, No. 12, 3519-3523 (1998).
M. Antonietti et al., "Diffusion of Labeled Macromolecules in Molten Polystyrenes Studied by a Holographic Grating Technique", Macromolecules, vol. 17, No. 4, 798-802 (1984).
H. Bach et al., "Biphoton-Induced Refractive Index Change in 4-Amino-4-nitroazobenzene/Polycarboante", J. Phys. Chem, vol. 100, No. 10, 4135-4140 (1996).
J. Coutandin et al., "Diffusion of Dye Molecules in Polymers above and below the Glass Transition Temperature Studied by the Holographic Grating Technique", Macromolecules, vol. 18, No. 3, 587-589 (1985).
B.R. Reddy et al., "Optical phase conjugation in polycarbonate resin doped with Coumarin 314 dye", Applied Optics, vol. 32, No. 21, 3966-3968 (1993).

* cited by examiner

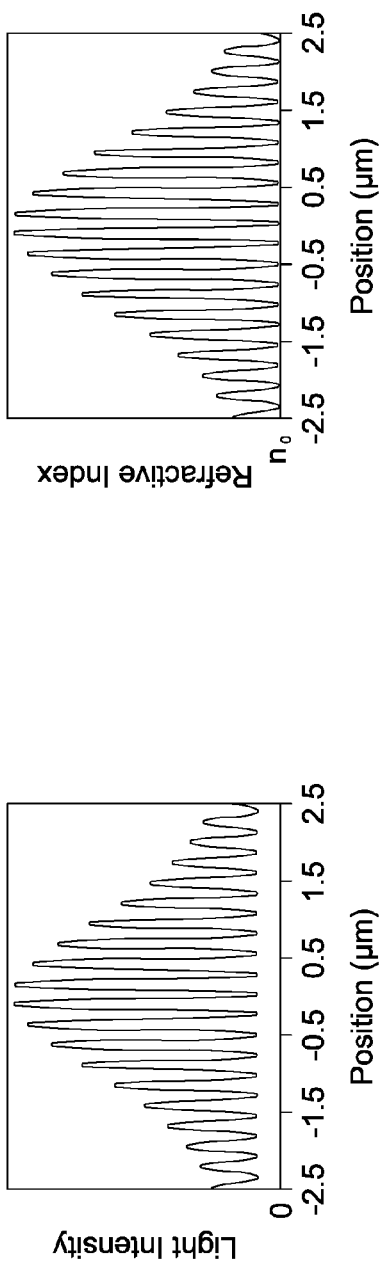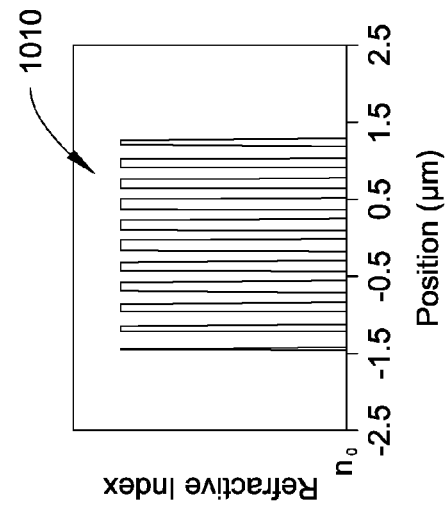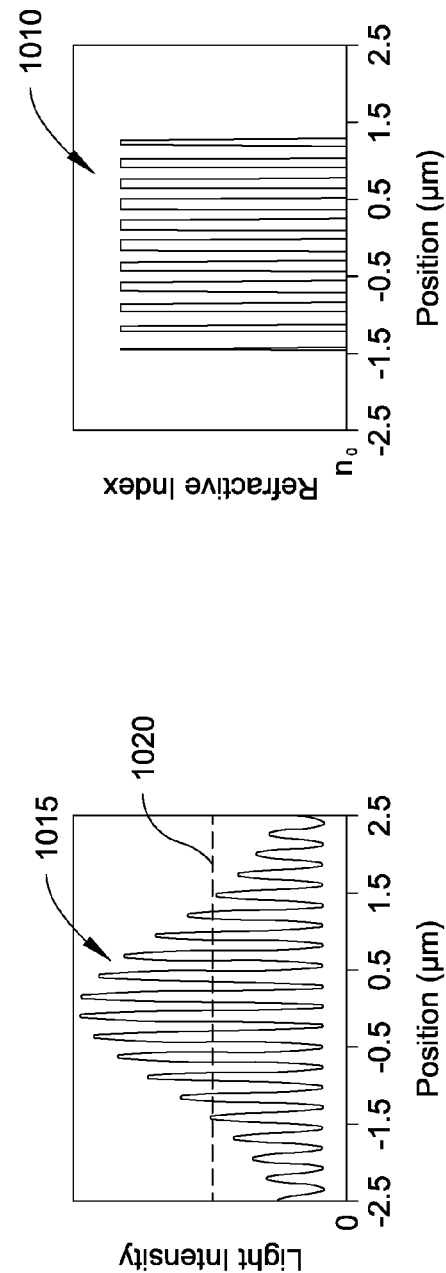

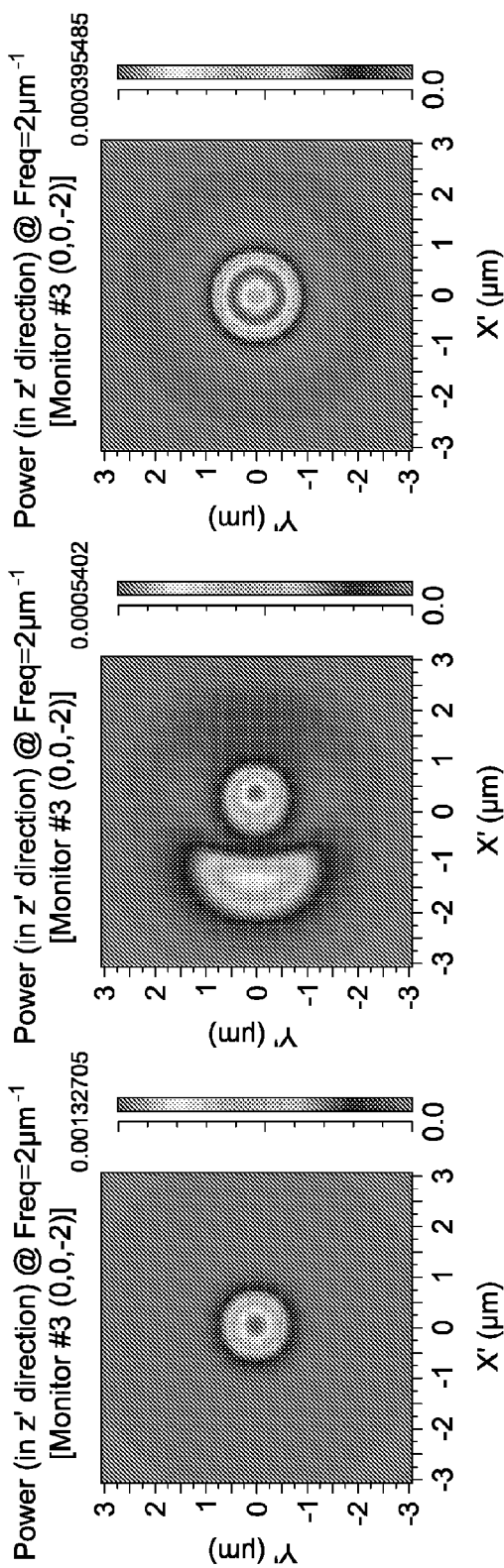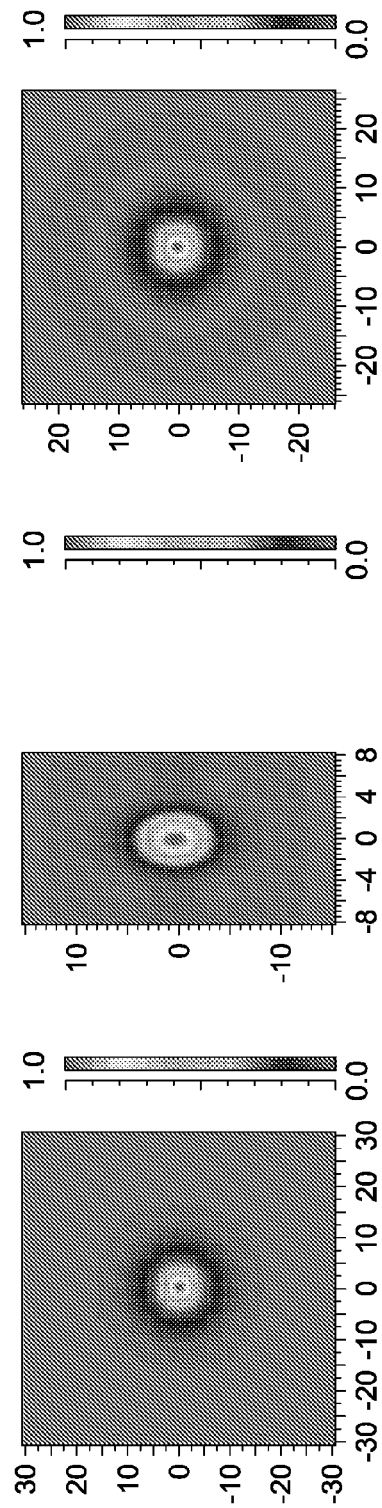

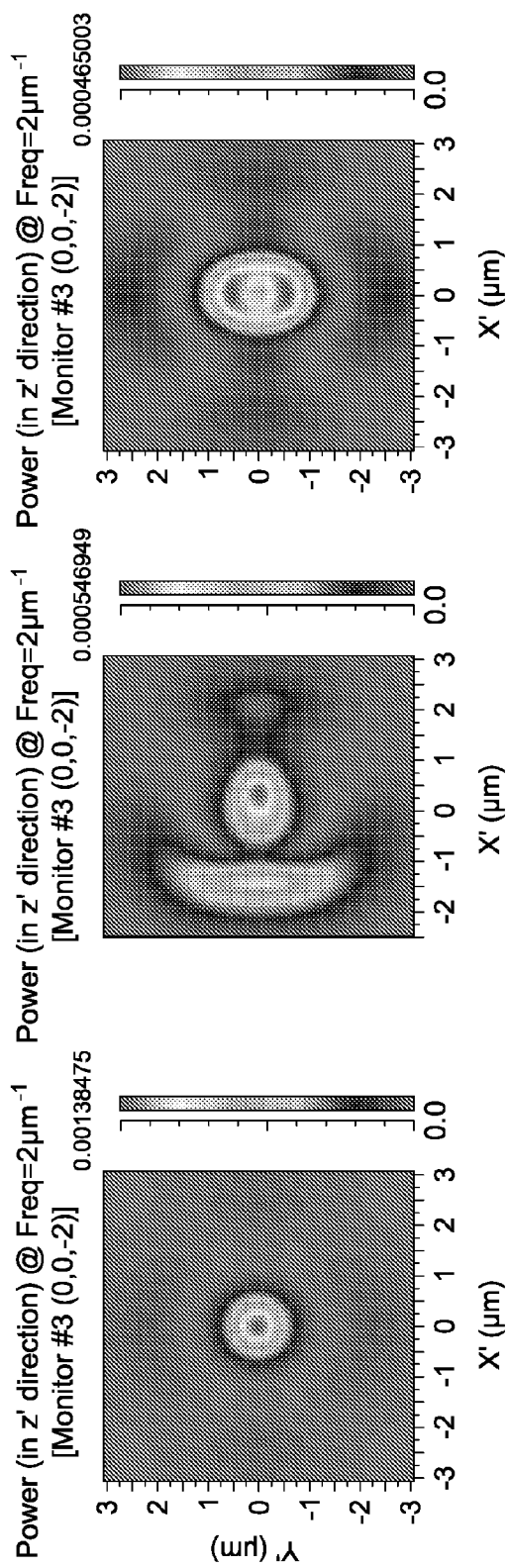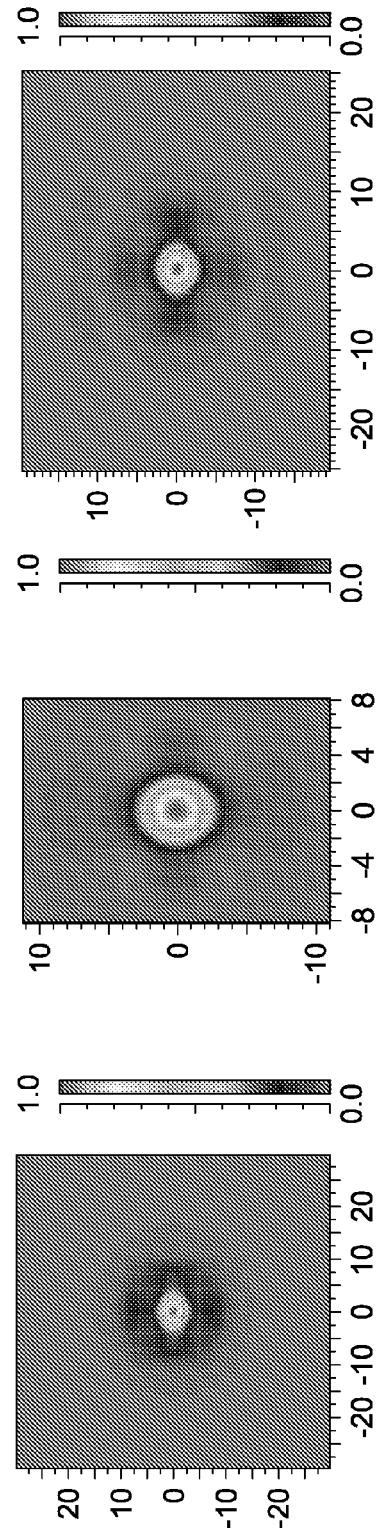

DATA STORAGE DEVICES AND METHODS

FIELD OF THE INVENTION

The present invention relates generally to data storage systems and methods, more particularly to optical based data storage systems and methods, and holographic data storage systems and methods.

BACKGROUND OF THE INVENTION

Data storage systems and methods are known to be desirable. Volume holographic recording systems generally use two counter-propagating laser or light beams converging within a photosensitive holographic medium to form an interference pattern. This interference pattern causes a change or modulation of the refractive index of the holographic medium. Where one of the light beams is modulated, responsively to data to be encoded, the resulting interference pattern encodes the modulating data in both intensity and phase. The recorded intensity and phase information may later be detected responsively to reintroduction of the un-modulated, or reference light beam, thereby recovering the encoded data as reflections.

Conventional "page-based" holographic memories have data written in the holographic medium in parallel, on 2-dimensional arrays or "pages".

It is desirable to provide a relatively simple, inexpensive and robust holographic memory system. Further, bit-oriented holographic memory systems are desired.

SUMMARY OF THE INVENTION

A data storage device comprising: a substrate having oppositely disposed surfaces and a plurality of volumes arranged along tracks between the surfaces; a plurality of micro-holograms each contained in a corresponding one of the volumes; and at least one groove in at least one of the surfaces and being operative to diffract light through the at least one surface and into the volumes; wherein, the presence or absence of a micro-hologram in a stacked layer in each of the volumes is indicative of a corresponding portion of data stored.

BRIEF DESCRIPTION OF THE FIGURES

Understanding of the present invention will be facilitated by considering the following detailed description of the preferred embodiments of the present invention in conjunction with the accompanying drawings, in which like numerals refer to like parts, and:

FIGS. 10A-10B illustrate a light intensity and corresponding refractive index change in a substantially linear optically responsive medium;

FIGS. 10C-10D illustrate a light intensity and corresponding refractive index change in a substantially non-linear optically responsive medium;

FIGS. 21A-21C illustrate near-field distributions (z=−2 μm) corresponding to a simulation of a circular micro-hologram of FIGS. 19A-19C;

FIGS. 22A-22C illustrate far-field distributions corresponding to the near-field distributions of FIGS. 21A-21C, respectively;

FIGS. 24A-24C illustrate near-field distributions corresponding to a simulation of the circular micro-hologram of FIGS. 23A-23C;

FIGS. 25A-25C illustrate far-field distributions corresponding to the near-field distributions of FIGS. 24A-24C, respectively;

DETAILED DESCRIPTION OF THE PREFERRED EMBODIMENTS

Figure 1:
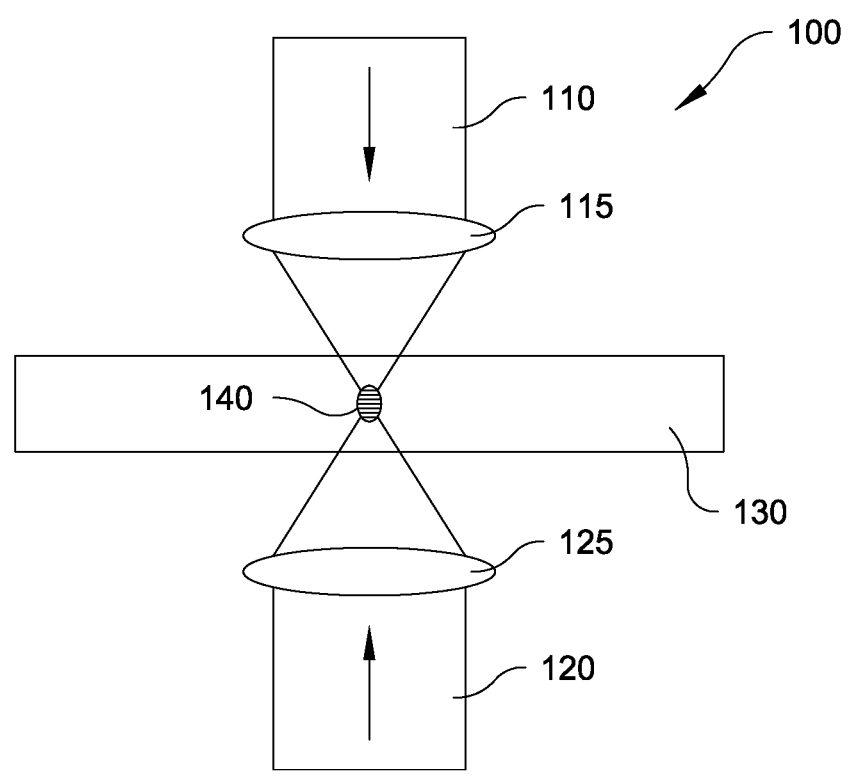
FIG. 1 illustrates a configuration for forming a hologram within a media using counter-propagating light beams.

It is to be understood that the figures and descriptions of the present invention have been simplified to illustrate elements that are relevant for a clear understanding of the present invention, while eliminating, for purposes of clarity, many other elements found in typical holographic methods and systems. However, because such elements are well known in the art, and because they do not facilitate a better understanding of the present invention, a discussion of such elements is not provided herein. The disclosure herein is directed to all such variations and modifications known to those skilled in the art.

Overview

Volumetric optical storage systems have the potential to fulfill demands for high-capacity data storage. Unlike traditional optical disc storage formats, such as compact disc (CD) and digital versatile disc (DVD) formats, where the digital information is stored in a single (or at most two) reflective layer(s), according to an aspect of the present invention digital content is stored as localized refractive index alterations in a plurality of volumes arranged in vertically stacked, laterally directed tracks in the storage medium. Each of the tracks may define a corresponding laterally, e.g., radially, directed layer.

According to an aspect of the present invention, single bits, or groups of bits, of data may be encoded as individual micro-holograms each substantially contained in a corresponding one of the volumes. In one embodiment, the medium, or media, takes the form of an injection moldable thermoplastic disc, and exhibits one or more non-linear functional characteristics. The non-linear functional characteristics may be embodied as a refractive index change that is a non-linear function of experienced energy, such as incident optical intensity or energy or heating. In such an embodiment, by generating interference fringes within a given volume of the medium, one or more bits of data may be selectively encoded in that volume as a later detectable refractive index modulation. Thus, three-dimensional, molecular, photoresponsive matrix of refractive index changes may thus be used to store data.

According to an aspect of the present invention, the non-linear functional characteristic may establish a threshold energy responsive condition, below which no substantial change in refractive index occurs and above which a measurable change in the refractive index is induced. In this manner, a selected volume can be read, or recovered, by impinging a light beam having a delivered energy less than the threshold, and written or erased using a light beam having a delivered energy above the threshold. Accordingly, dense matrices of volumes that each may, or may not, have a micro-hologram substantially contained therein may be established. Each of the micro-holograms is embodied as an alternating pattern of sub-regions having differing refractive indices, which correspond to the interference fringes of counter-propagating light beams used to write the micro-holograms. Where the refractive index modulation decays rapidly as a function of distance from a target volume, such as an encoded bit center, the more densely the volumes may be packed.

According to an aspect of the present invention, the refractive index changes in a particular volume may be induced by localized heating patterns—corresponding to the interfering fringes of counter-propagating laser beams passing through the volume. In one embodiment, the refractive index change results from a density difference between an amorphous and crystalline state of a thermoplastic medium. A transition from one to the other state may be selectively induced in target volumes of a medium by thermally activating sub-volumes of the target volume at interference fringes therein. Alternatively, the refractive index changes may be induced by a chemical change within sub-volumes of target volume of the medium, such as a chemical change occurring in a dye or other catalyst within a dye, located within the target volume. Such a chemical change may be selectively induced using thermal activation as well.

A configuration utilizing a non-linearly responsive medium is well suited to be used to provide a bit oriented (as opposed to page-based) micro-holographic medium and system that uses a single tightly-focused light beam, a focused, slightly focused or unfocused reflected light beam. Such a configuration provides advantages including: improved tolerance to misalignment of the recording optics and simpler, less costly micro-holographic systems. Thus, a reflective element with little or no curvature may be used in a micro-holographic system according to an aspect of the present invention. One surface of a data recording disc may be used as a reflective element (with or without a reflective coating).

For example, an injection-moldable thermoplastic media with low-curvature features may be molded into the media surface and can be metallized and used for generating the reflection as well as for tracking. According to an aspect of the present invention, a thermoplastic media may be molded to incorporate slightly curved elements into a disc, which may then be used for generating reflections with higher power density. These features may be well suited for tracking, like grooves on a DVD. Further, one or more elements may be used to correct the reflected light beam. For example, a curved mirror may be used to generate a collimated light beam and a liquid crystal cell may be used to offset the path length difference generated by going to different layers. Or, a holographic layer that acts like a diffractive element may be positioned near a surface of the medium, so as to provide correction to the light beam. An external mirror or the disc surface may be used to generate the reflection.

According to an aspect of the present invention, data readout at different layers may be different. Because the reflections have different aberrations at different layers, the aberration may be used for layer indexing in a focusing process. Designs at the backside of the disk may be used to provide for better control of a reflected light beam in order to increase effective grating strength. Multi-layer coatings and/or surface structures (similar to display film structures) are suitable for use. According to an aspect of the present invention, a design that absorbs oblique incidence light beams and reflects perpendicular light beams may also be used to both reduce noise and control the orientation of the micro-holograms. Further, grating strength of micro-holograms need not be the same for different layers. Power scheduling may be used for recording at different layers.

According to an aspect of the present invention, recording micro-holograms using one focused light beam and one plane-wave light beam in a threshold material may be effected. While such a method may utilize two input light beams, alignment requirements are less stringent than conventional methodologies, while micro hologram orientation and strength remain well controlled and uniform through layers. Readout signal may be better predicted as well.

Single-Bit Holography

Single bit micro-holography presents several advantages for optical data storage over other holographic techniques. Referring now to FIG. 1, there is shown an exemplary configuration 100 for forming a hologram within a media using counter-propagating light beams. Therein, micro-holographic recording results from two counter-propagating light beams 110, 120 interfering to create fringes in a volume 140 of a recording medium 130. Interference may be achieved by focusing light beams 110, 120 at nearly-diffraction-limited diameters (such as around 1 micrometer (μm) or smaller) at a target volume, e.g., desired location, within recording medium 140. Light beams 110, 120 may be focused using a conventional lens 115 for light beam 110 and lens 125 for light beam 120. While simple lensing is shown, compound lens formats may of course be used.

Figure 2:
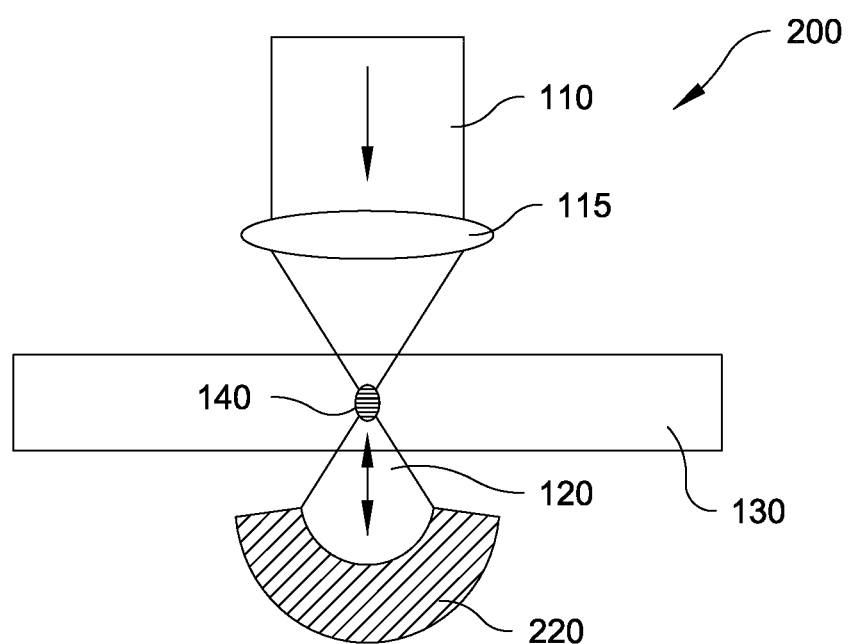
FIG. 2 illustrates an alternative configuration for forming a hologram within a media using counter-propagating light beams.

FIG. 2 shows an alternative configuration 200 for forming a hologram within a hologram supporting media using counter-propagating light beams. In configuration 200, lens 125 has been replaced by a curved mirror 220, such that a focused reflection 120 of light beam 110 interferes with light beam 110. Configurations 100, 200 require highly precise alignment of both lenses 115, 125 or of lens 115 and mirror 220 relative to each other. Accordingly, micro-holographic recording systems employing such a configuration are limited to stable, vibration-free environments, such as those incorporating conventional high-precision positioning stages.

Figure 3:
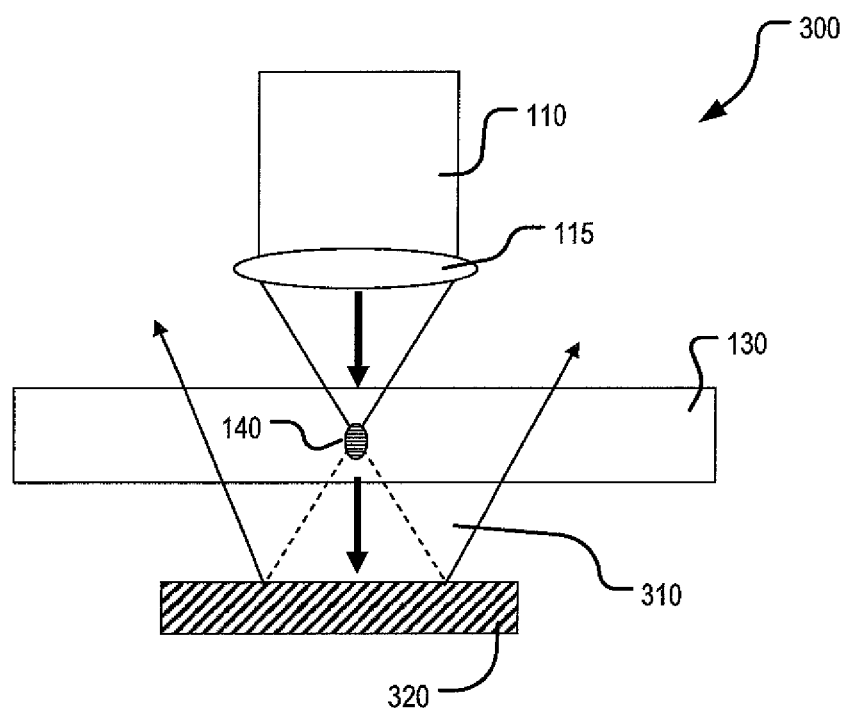
FIG. 3 illustrates an alternative configuration for forming a hologram within a media using counter-propagating light beams.

According to an aspect of the present invention, a focused, slightly focused or unfocused reflected light beam (relative to a counter-propagating focused light beam) may be used for recording. FIG. 3 shows an alternative configuration 300 to forming a hologram within a media using counter-propagating light beams. Configuration 300 uses an unfocused counter-propagating reflection 310 of light beam 110 from mirror 320. In the illustrated embodiment, mirror 320 takes the form of a substantially planar mirror.

Figure 4:
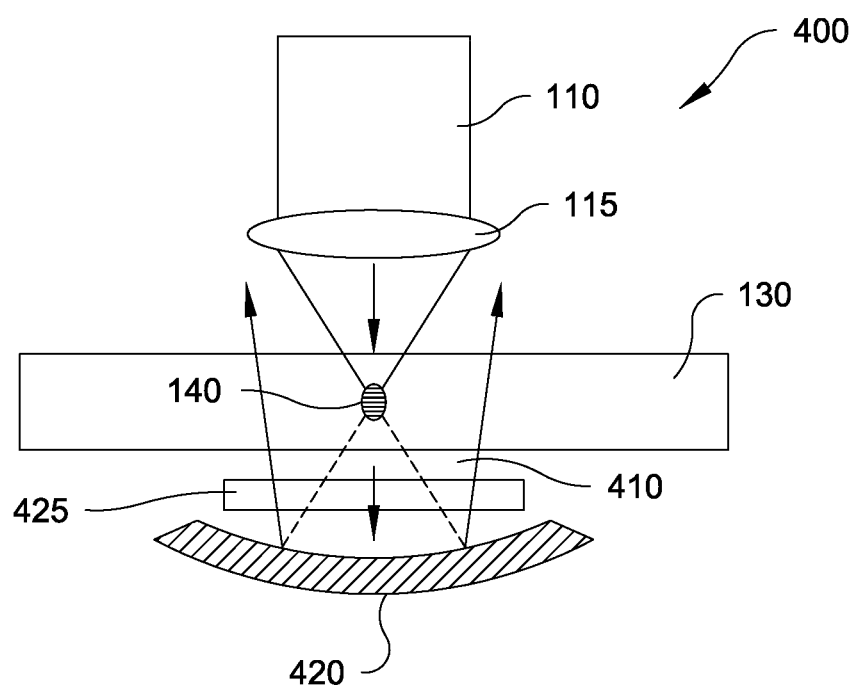
FIG. 4 illustrates an alternative configuration for forming a hologram within a media using counter-propagating light beams.

FIG. 4 shows an alternative configuration 400 for forming a hologram within a media using counter-propagating light beams. Configuration 400 uses a slightly-focused counter-propagating reflection 410 of light beam 110 from mirror 420. The illustrated embodiment of configuration 400 also includes optical path length correction element 425 that may take the form of a liquid crystal cell, glass wedge, or wedge pair, for example.

Figure 5:
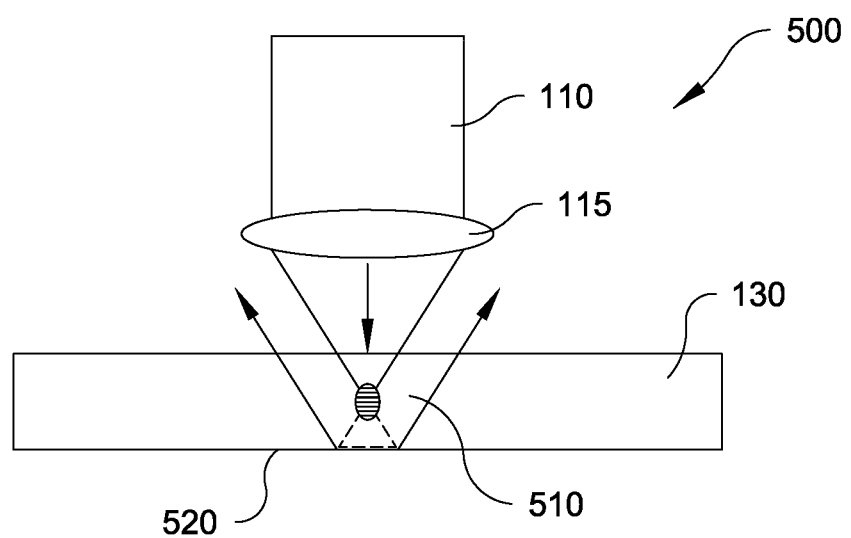
FIG. 5 illustrates an alternative configuration for forming a hologram within a media using counter-propagating light beams.

FIG. 5 shows another alternative configuration 500 for forming a hologram within a media using counter-propagating light beams. Similar to configuration 300 (FIG. 3), configuration 500 uses a substantially planar reflecting surface. However, configuration 500 uses a portion 520 of media 130 to provide reflection 510 of light beam 110. Portion 520 may take the form of a reflective (such as a metal coated) rear surface of media 130, a reflective layer within media 130 or one or more holograms essentially forming a reflective surface in media 130, all by way of non-limiting example.

In configurations 300, 400 and 500, light beam 110 has a smaller spot size and larger power density in a target volume or region than light beam 310, 410, 510, such that the micro-hologram dimensions will be driven by the dimensions of the smaller spot size. A potential drawback to the difference in power density between the two light beams is a resulting pedestal or DC component in the interference pattern. Such a pedestal or DC component consumes a considerable portion of the recording capabilities (dynamic range) of material 130, where material 130 exhibits a linear change of refractive index with experienced exposure intensity.

Figure 7:
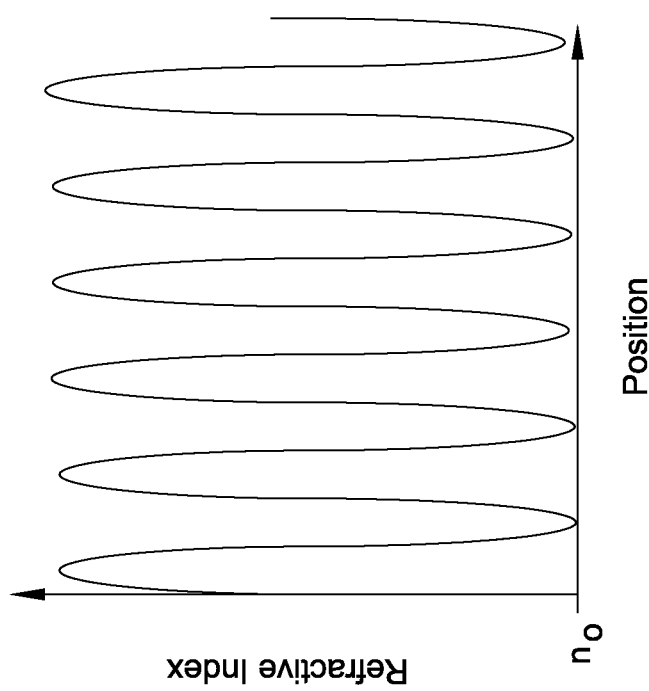
FIG. 7 illustrates a refractive index modulation in a linear medium corresponding to the intensity pattern of FIG. 6.
Figure 6:
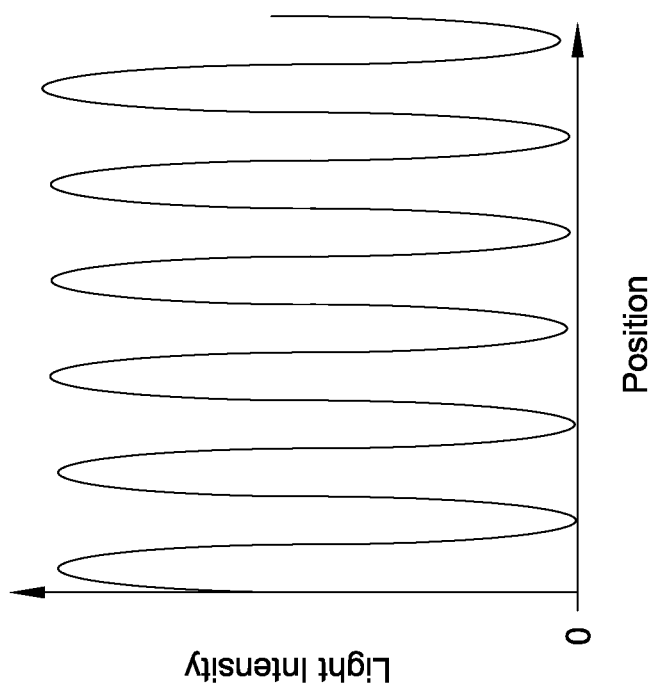
FIG. 6 illustrate a light intensity pattern.

FIG. 6 shows that experienced light intensity from counter-propagating light beams varies with position—thereby forming the interference fringes. As is shown in FIG. 7, in a linearly responsive material, where refractive index changes substantially linearly with experienced light intensity relative to $n_o$, the (relatively) unfocused light beam may thus consume dynamic range in a volume much larger than the target volume corresponding to the desired hologram, thereby decreasing the possible reflectivity of other volumes and micro-holograms. Dynamic range is also consumed throughout the depth of the media where the counter-propagating light beams are at normal incidence as well (see e.g., FIGS. 1 and 2).

According to an aspect of the present invention, such a consumption of dynamic range in affected volumes other than the target volume during hologram formation is mitigated by using a recording material exhibiting a non-linear response to experienced power density. In other words, a non-linear recording property exhibiting media is used in combination with a micro-holographic approach. The non-linear recording property of the material is used to facilitate recording that is non-linear with light intensity (e.g. square, cubic, or of the threshold type), such that recording occurs substantially only above a certain light intensity. Such a non-linear recording characteristic of the material reduces or eliminates consumption of dynamic range in non-addressed volumes, and facilitates reduction of dimensions of the micro-holograms, and thus target volumes.

FIGS. 10A-B and 11A-B illustrate recording characteristics of a linear recording medium, while FIGS. 10C-D and 11C-D illustrate recording characteristics of a non-linear recording medium of a threshold type. More specifically, FIGS. 10A-10D show that interfering two focused, counter-propagating light beams, as shown in FIGS. 1 and 2, produces a modulation of the light intensity, where position 0 (mid-way between −0.5 and 0.5) corresponds to the focal point along the medium thickness of both focused light beams. In the case of a medium presenting linear recording properties, a refractive index modulation like that shown in FIG. 10B will result—which follows the intensity profile shown in FIG. 10A. While the refractive index modulation may ultimately maximize near position 0, it may be noted that it extends substantially over the full thickness of the material and is not limited, for example, to the position (abscissa) values in FIG. 10B—such that resulting micro-holograms are not substantially contained within a particular volume within the media, where multiple volumes are stacked one-upon another. In a non-linear or threshold property exhibiting recording medium on the other-hand (a threshold condition being shown in FIG. 10D), recording 1010 occurs substantially only in the volumes where a threshold condition 1020 is reached such that resulting micro-holograms are substantially contained within a particular volume, where multiple volumes are stacked one-upon another. FIG. 10D shows that the micro-hologram inducing fringes extend over approximately 3 μm. Similar characteristics are exhibited in the lateral dimensions of the micro-hologram as illustrated in FIGS. 11A-11D. As is demonstrated thereby, undesirable consumption of the dynamic range of untargeted volumes of a media is mitigated by using a non-linear material of the threshold type.

While a threshold type non-linear material is discussed for purposes of explanation, it should be understood that to a first-order approximation, the amplitude of the refractive index modulation varies linearly with the light intensity in a linear responsive material (see FIGS. 10A-10B, 11A-11B). Thus, even though a material having a recording threshold may prove particularly desirable, a material that exhibits a non-linear optical response to exposure in which the amplitude of the refractive index modulation varies, e.g., like a power larger than one (or a combination of powers) would significantly mitigate dynamic range consumption in other affected volumes.

Returning again to the threshold type of non-linear material, and referring again to FIGS. 10C-D and 11C-D, in such a case, a threshold-responsive media operates by experiencing an optically-induced refractive index change 1010 substantially only when the incident energy density or power density 1015 is above a threshold 1020. Below threshold 1020, the media experiences substantially no change in refractive index. One of the counter-propagating light beams, e.g., a reflected light beam, used for recording may be focused (FIGS. 1 and 2), slightly focused (FIG. 4) or even unfocused (FIGS. 3 and 5). Using such a threshold responsive material nonetheless has the affect of lessening focusing tolerance requirements. Another advantage of is that the reflective device may be incorporated into the media, such as a disc, similar to current surface technology optical storage devices, such as is illustrated in FIG. 5.

Figure 8:
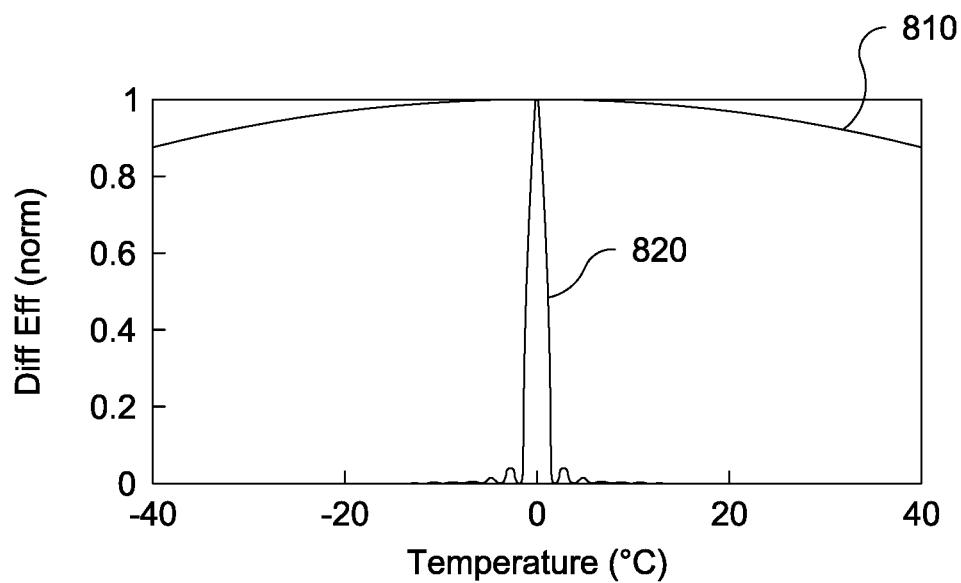
FIG. 8 illustrates an expected Bragg detuning of a hologram as diffraction efficiency being a function of the difference between record and read temperature.
Figure 9:
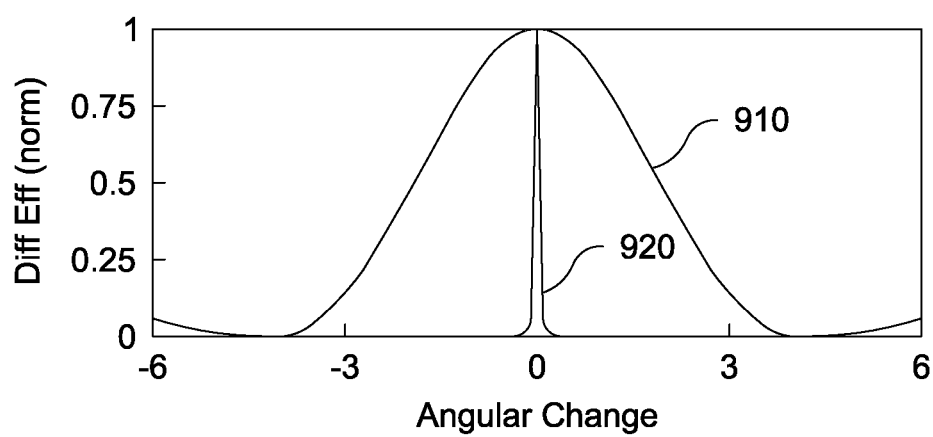
FIG. 9 illustrates an expected Bragg detuning of a hologram as diffraction efficiency being as a function of angular change.
Figure 11A:
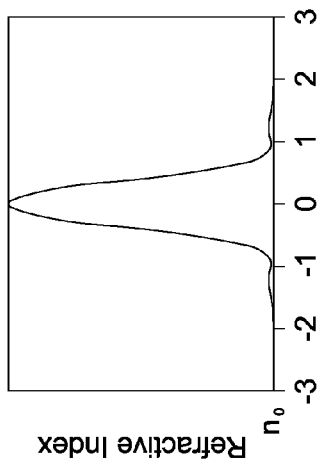
FIGS. 11A-11B illustrate a light intensity and corresponding refractive index change in a substantially linear optically responsive medium.
Figure 11B:
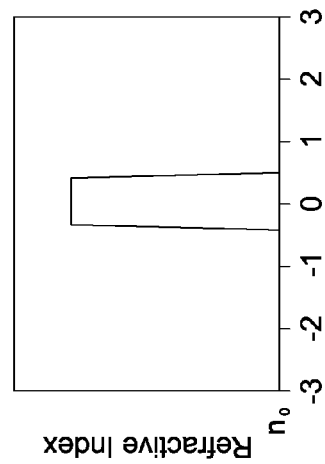
Figure 11C:
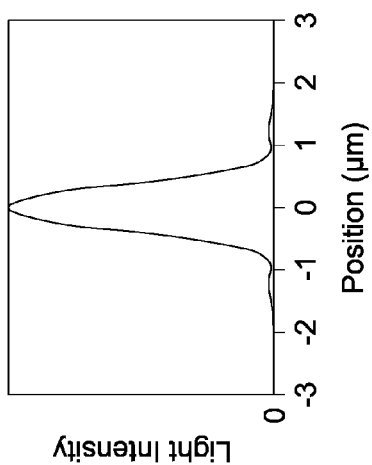
FIGS. 11C-11D illustrate a light intensity and corresponding refractive index change in a substantially non-linear optically responsive medium.
Figure 11D:
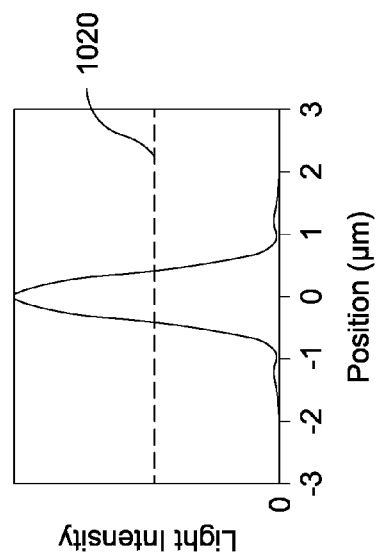

Referring now also to FIGS. 8 and 9, using smaller micro-holograms, as opposed to larger page-based holograms, provides improved system tolerance to temperature fluctuations and angular misalignments. FIG. 8 illustrates expected Bragg detuning of a hologram ($\propto 1/L$, where L is the hologram length) as a function of the difference between record and read temperature. Reference 810 corresponds to expected performance of a micro-hologram, while reference 820 corresponds to expected performance of a page-based hologram. FIG. 9 illustrates expected Bragg detuning of a hologram ($\propto 1/L$, where L is the hologram length) as a function of angular change. Reference 910 corresponds to expected performance of a micro-hologram, while reference 920 corresponds to expected performance of a page-based hologram.

By way of non-limiting, further explanation only, an incoming light beam focused at nearly-diffraction limited size may be reflected with a slight focusing or no focusing at all, such that the reflected light beam is unfocused (or slightly focused) relative to the counter-propagating, focused incoming light beam. The reflective element may be on a disc surface, and may take the form of a flat mirror, or a slightly curved mirror, for example. If some misalignment occurs between the focused light beam and reflection, the interference pattern will be driven by the location of the focused light beam where the reflected light beam has a relatively large curvature of its phase front. The large curvature produces small power density variation when the focused spot moves relative to the reflected light beam.

Non-Linearly Responsive Material Example 1

Photopolymers have been proposed as a media candidate for holographic storage systems. Photopolymer based media have reasonable refractive index changes and sensitivities recorded in a gel-like state sandwiched between glass substrates. However, it is desirable to provide a simplified structure, such as a molded disc. Further, photopolymer systems are sensitive to environmental conditions, i.e., ambient lighting, and often require special handling prior to, during and even sometimes after the recording process. It is desirable to eliminate these drawbacks as well.

According to an aspect of the present invention, a polymer phase-change material in which refractive index modulations are induced via exposure to a light beam is used as a holographic data storage medium. In one embodiment, the detectable change in refractive index results from thermally inducing localized changes between amorphous and crystalline components of the material. This provides for potentially large refractive index modulations induced using small energies. Such a material may also provide for a threshold condition, in which optical exposure energies below a threshold have little or substantially no impact on the refractive index of the material, while optical exposure energies above the threshold cause detectable refractive index changes.

More particularly, a phase-change induce-able polymer material can provide large refractive index changes ($\Delta n > 0.01$), with good sensitivity ($S > 500$ or more cm/J), in an injection-moldable, environmentally-stable, thermoplastic substrate. Additionally, such a material also offers the potential to use a substantially threshold-responsive recording process—enabling a same wavelength laser to be used for both reading and writing, while preventing ambient light exposure from substantially degrading stored data. In one embodiment, the detectable refractive index change corresponds to the index difference between the amorphous and crystalline states of one of the components of a copolymer thermoplastic substrate. Such a substrate can be prepared by elevating the copolymer above the melting temperature (Tm) and rapidly cooling, or quenching, the material to induce the previously crystalline components of the material to cool in an amorphous state.

Figure 14A:
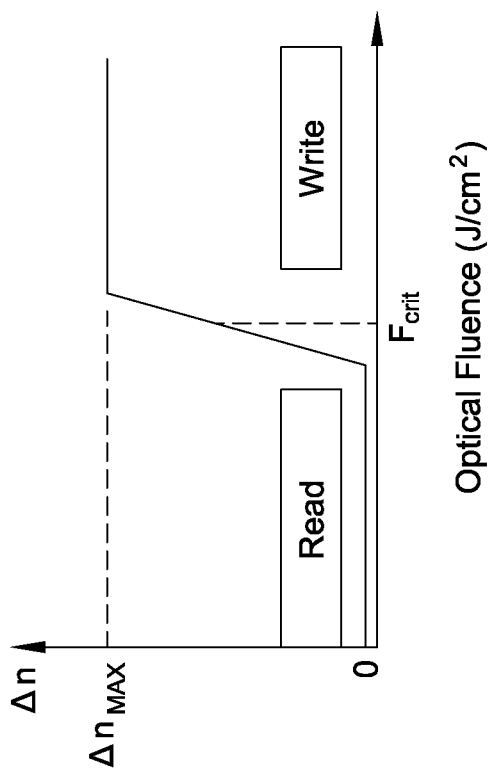
FIGS. 14A and 14B illustrate expected refracted index changes as a function of elevating temperature, and corresponding micro-hologram read and write modes.
Figure 14B:
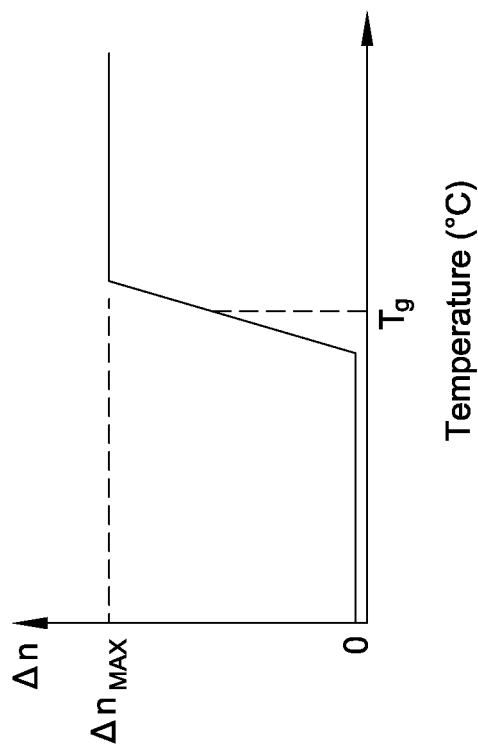

Referring now also to FIGS. 14A and 14B, light beams are interfered within target volumes of the material to locally heat sub-volumes thereof corresponding to the interference fringes, as a result of energy absorption thereat. Once the local temperature is raised above the critical temperature, for example the glass transition temperature (Tg) (FIG. 14A), the crystalline components of the material melt and subsequently cool into an amorphous state, resulting in a refractive index difference relative to the other crystalline state volumes in the material. The critical temperature may alternatively be around the melting temperature (Tm) of the nano-domain component material. Regardless, if the energy of the incident light beam is not sufficient to elevate the temperature of the material above the critical temperature, substantially no change takes place. This is shown in FIG. 14B, where an optical fluence above a critical value $F_{crit}$ causes a phase change resulting in the writing of a hologram, and an optical fluence less than the critical value $F_{crit}$ causes substantially no such change—and is thus suitable for reading recorded holograms, and hence recovering recorded data.

Figures 15A, 15B, 15C:
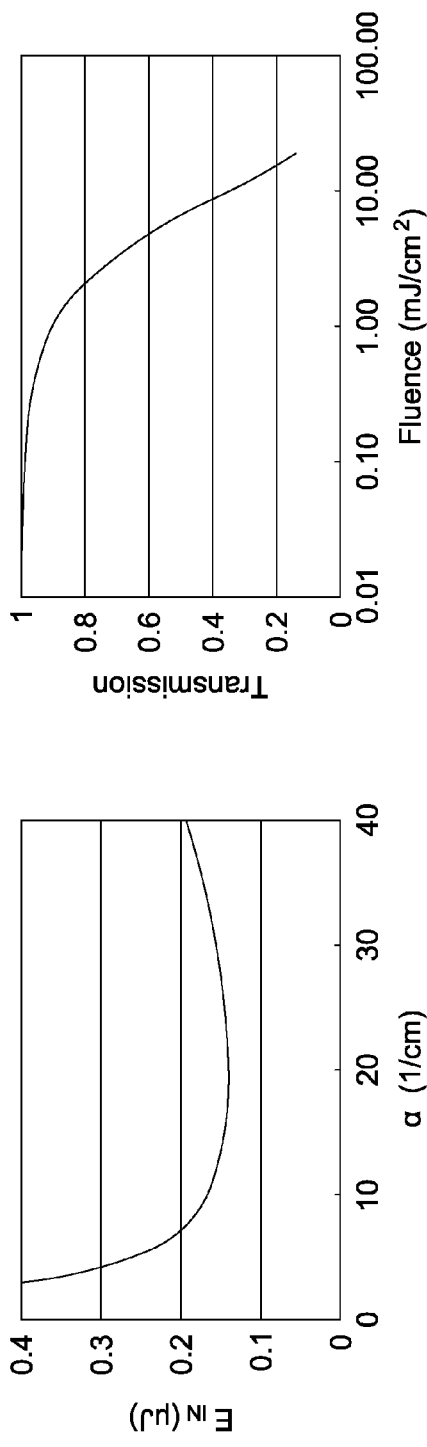
FIGS. 15A-15C illustrate expected relationships between light beam incident light beam energy required to elevate material temperature to the critical temperature as a function of corresponding optical fluence and normalized linear absorption, light beam waist and distance using a reverse saturable absorber, and transmission and fluence using a reverse saturable absorber.

For non-limiting purposes of further explanation, the critical value is given by $F_{CRIT}=L\times\rho\times c_P\times\Delta T$, where L is the length, or depth, of a micro-hologram, $\rho$ is the material density, $c_p$ is the specific heat of the material, and $\Delta T$ is the experienced temperature change (i.e., $T_g-T_0$, where $T_g$ is the glass transition temperature and $T_0$ is the ambient temperature of the material). As an example, where a polycarbonate having a density of 1.2 g/cm³ and a specific heat of 1.2 J/(K·g) is used, the length of the micro-hologram is $5\times10^{-4}$ cm, and the temperature change is 125° C. (K), $F_{CRIT}=90$ mj/cm². Translated to energy terms, the energy ($E_{CRIT}$) needed to reach the critical fluence $F_{CRIT}$ is $$E_{CRIT} = F_{CRIT} \times A = F_{CRIT} \times \frac{\pi w_o^2}{2},$$

where A is the transverse area of the hologram and $w_o$ is the light beam waist. The energy at focus, $E_F$, needed to provide $E_{CRIT}$ is $$E_F = \frac{E_{CRIT}}{(1 - e^{-\alpha L})},$$

where $e^{-\alpha L}$ is the transmission, $\alpha=\alpha_0+\alpha_{NL}F$, $\alpha_0$ is the linear absorption of the material, $\alpha_{NL}$ is the non-linear absorption of the material, F is the maximum incidence optical fluence, and L is the length of the micro-hologram. The incident energy, $E_{IN}$, delivered to the material to provide needed energy at focus, $E_F$, is $$E_{IN} = \frac{E_{CRIT}}{(1 - e^{-\alpha L})e^{-\alpha D/2}},$$

where $e^{-\alpha L}$ is the transmission, $\alpha=\alpha_0+\alpha_{NL}F$, $\alpha_0$ is the linear absorption of the material, $\alpha_{NL}$ is the non-linear absorption of the material, F is the the maximum incidence optical fluence, L is the length of the micro-hologram, and D is the depth (or length) of the material (e g., the thickness of the media disc). Referring now also to FIGS. 15A-15C, assuming a light beam waste, $w_o$, of $0.6\times10^{-4}$ cm, the transverse area of the hologram, A, is $5.65\times10^{-9}$ cm². Still assuming a depth of the micro-hologram, L, to be $5\times10^{-4}$ cm, and the depth of the material D (e.g., entire media disc) to be 1 mm, a predicted relation between incident energy, $E_{IN}$, and $\alpha$ is shown in FIG. 15A. Further assuming a material linear absorption, $\alpha_0$, of 0.018 1/cm, and a material non-linear absorption, $\alpha_{NL}$, of 1000 cm/J (and still a material length of 0.1 cm), a predicted relation between transmission and fluence is shown in FIG. 15B. Using these same assumptions, predicted relations between light beam waist and distance, and normalized absorption and distance are shown in FIG. 15C.

Figure 16A:
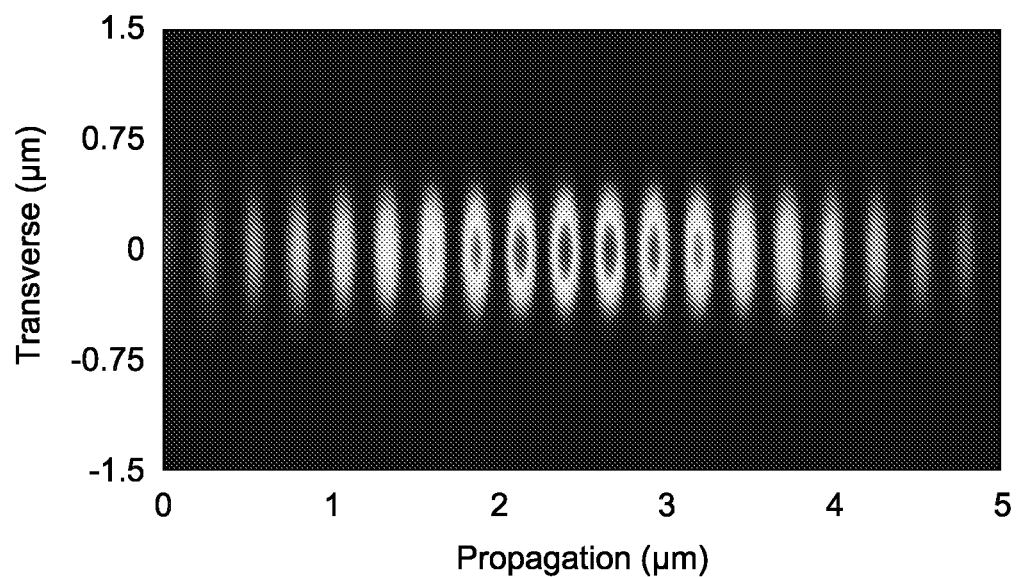
FIGS. 16A and 16B illustrate expected counter-propagating light beam exposures within a media, and corresponding temperature increases.
Figure 16B:
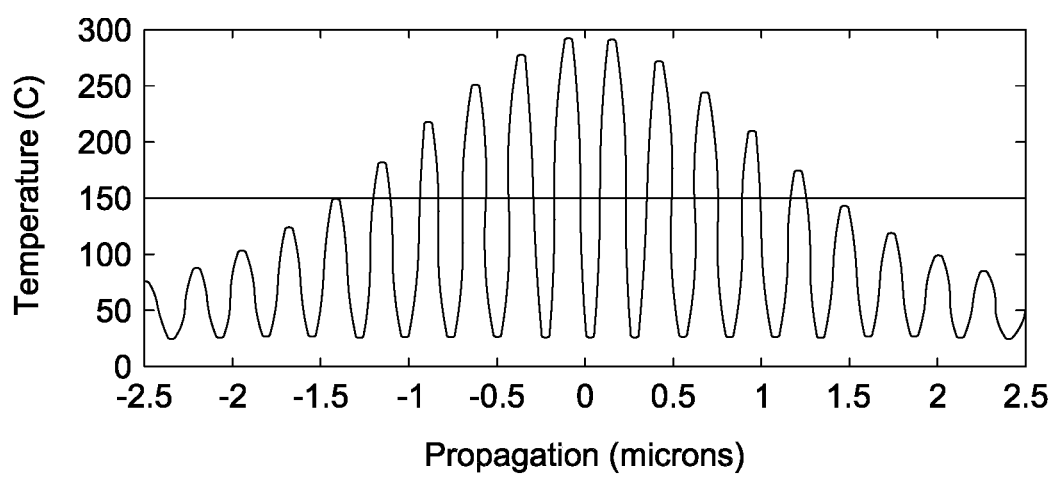
Figure 16C:
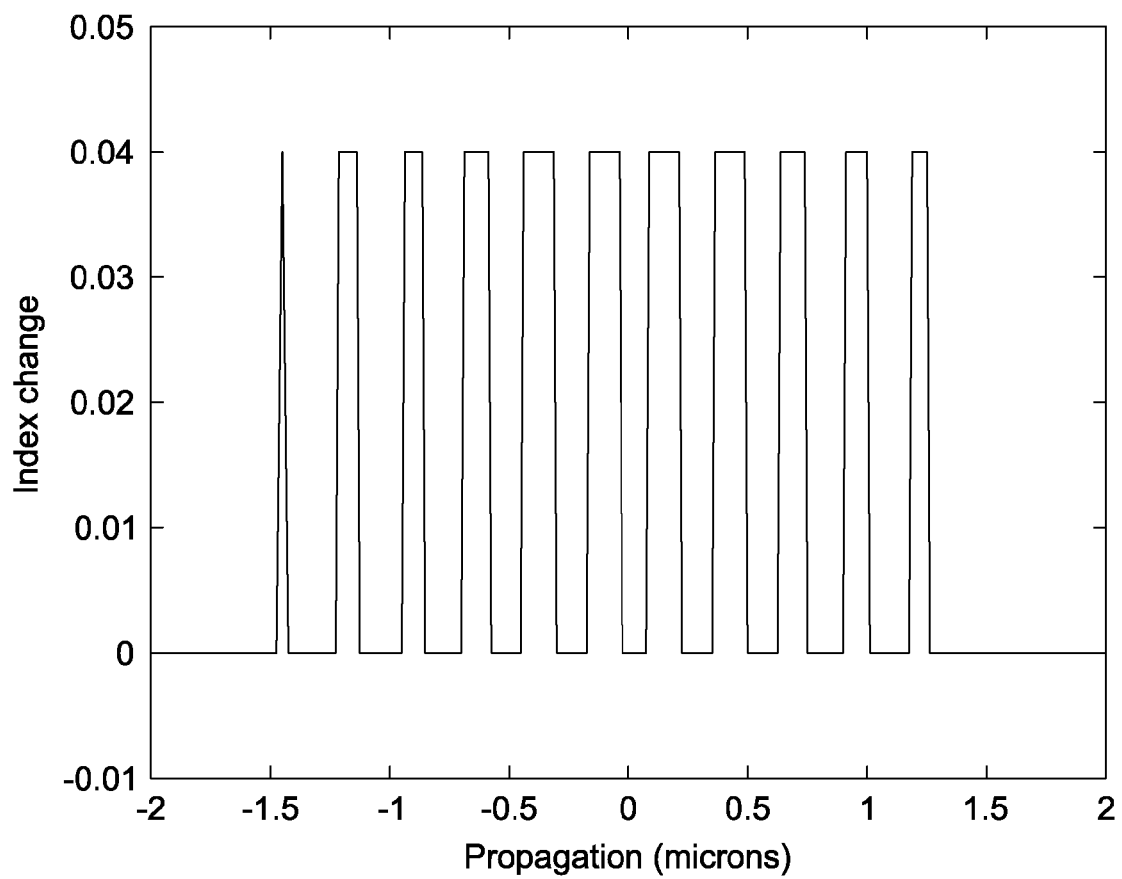
FIG. 16C illustrates an expected refractive index change corresponding to the temperature increases of FIGS. 16A and 16B.

Consistently, and as is shown in FIGS. 16A and 16B, it is expected that counter-propagating light beam exposure of such a copolymer material media will write micro-holograms in the form of fixed index modulations corresponding to the counter-propagating light beam interference fringes due to the formation or destruction of nano-domains of crystalline polymer thereat. That is, the phase change/separation mechanism generates a refractive index modulation based on the formation or destruction of crystalline nano-domains that are substantially smaller than the wavelength of the light being used. The values of FIG. 16B are predicted using two counter-propagating beams each having an incident, single beam power (P1=P2) of 75 mW, $\alpha=20$ cm$^{-1}$ and an exposure time (T) of 1 ms. A predicted resulting refractive index change ($\Delta n=0.4$) that forms the micro-hologram is shown in FIG. 16C. As can be seen therein, a micro-hologram embodied as a series of refractive index changes corresponding to interference fringes of counter-propagating light beams occurs substantially only where a localized heating exceeds a threshold condition (e.g., the temperature exceeds 150° C.), such that a threshold recording condition results.

Suitable polymers for use, include, by way of non-limiting example, homopolymers displaying partial crystallinity, blends of homopolymers composed of amorphous and crystalline polymers, and a variety of copolymer compositions including random and block copolymers, as well as blends of copolymers with or without homopolymers. Such a material is suitable for storing holograms on the order of 3 micrometers (microns) deep, by way of non-limiting example only. The linear absorption of the material may be high, rendering the material opaque and limiting the sensitivity.

A thermally induced reaction responsive to an optically absorbing dye is well suited for separating the index change mechanism from the photo-reactive mechanism, enabling potentially large sensitivities. According to an aspect of the present invention, the thermally induced process may provide the non-linear responsive mechanism for the optically induced refractive index change. This mechanism, or threshold condition, enables optical beams of a same wavelength to be used at low and high powers for data reading and recording, respectively. This characteristic also prevents ambient light from substantially degrading the stored data. Dyes with a reverse saturable absorption (RSA) property, in which the absorption is a function of the fluence and increases with increasing fluence, are useful. As a consequence, absorption is highest at the light beam(s) focus, which means background linear absorption is small, ultimately yielding a material that is nearly transparent. Examples of such dyes include porphyrins and phthalocyanines, by way of non-limiting example only.

Further, amorphous/crystalline copolymers are well suited to provide the desired properties in an injection-moldable thermoplastic substrate, such as a disc. The use of a thermoplastic enables data to be recorded in a stable substrate without significant post-processing requirements, such that the refractive index change, sensitivity, stability, and "fixing" are provided by the single co-polymer material itself. And, index modulations larger than conventional photopolymers may be possible via selection of copolymer components. The sensitivity of the material may depend on the optical absorption properties of dye(s) used. In the case of known reverse saturable absorption dyes, sensitivities as high as 2-3 times conventional holographic photopolymers are achievable. The threshold condition also provides the ability to read and write data at a same wavelength with little or no post-processing required after the data is recorded. This is in contrast to photopolymers, which typically require total substrate exposure after recording of data to bring the system to a full cure. Finally, the copolymer substrate may be in a thermoplastic state, as opposed to the gel-like state of photopolymers, prior to data recording. This advantageously simplifies the physical structure of the media as compared to photopolymers, as thermoplastic state material may be injection molded itself and need not be contained within a container or carrier, for example.

Thus, according to an aspect of the present invention, amorphous/crystalline copolymers may be used to support optically induced phase changes and resultant index modulations. Linear absorbing dyes may be used in combination with amorphous/crystalline phase change materials to convert optical energy to temperature increases. Reverse saturable absorption dye(s) may be used to efficiently generate temperature increases. Optical activation may be separated from index change inducement via the dyes and phase change/separation materials enabling a threshold condition to index change.

By way of further explanation, in certain block copolymer compositions, the individual polymers phase separate spontaneously into regularly ordered domain structures that do not grow macroscopically like polymer blends, because of the nature of the copolymer. This phenomena is discussed by Sakurai, TRIP vol. 3, 1995, page 90 et. seq. The individual polymers making up the copolymer can display amorphous and/or crystalline behavior depending on temperature. The weight ratio of the individual polymers may tend to dictate whether the micro-phases that separate form spheres, cylinders or lamellae. A copolymer system in which both phases are amorphous upon a brief (or extended) heating above the glass transition temperature (Tg) and melting temperature (Tm) of the individual blocks may be used. Upon cooling to low temperatures, one of the phases crystallizes, while maintaining the shapes of the original micro-phases. An example of this phenomenon is illustrated in poly(ethylene oxide)/polystyrene block copolymers, as reported by Hung et al., in Macromolecules, 34, 2001, page 6649 et seq. According to an aspect of the present invention, poly(ethylene oxide)/polystyrene block copolymers may be used in a 75%/25% ratio, for example.

For example, a photo-chemically and thermally stable dye, such as a phthalocyanine dye, like Copper Phthalocyanine, Lead Phthalocyanine, Zinc Phthalocyanine, Indium Phthalocyanine, Indium tetra-butyl Phthalocyanine, Gallium Phthalocyanine, Cobalt Phthalocyanine, Platinum Phthalocyanine, Nickel Phthalocyanine, tetra-4-sulfonatophenylporphyrinato-copper(II) or tetra-4-sulfonatophenylporphyrinato-zinc (II) can be added to such a copolymer and injection molded into a 120 mm diameter disc. The molding raises the temperature of the copolymer above the glass transition temperature (Tg) of the polystyrene and the melting temperature (Tm) of the poly(ethylene oxide), thus producing an amorphous material with micro-phase separations. Cooling, e.g., quenching, of the disc to about −30° C. causes the poly(ethylene oxide) phase to crystallize throughout the material. Where the domain sizes of the crystalline regions are sufficiently small, such as less than one hundred nanometers (e.g.,<100 nm), light will not be scattered by the media, and the media will remain transparent even in thick substrates. Data may be recorded into the material by interfering 2 laser beams (or a light beam and a reflection thereof) at specific regions, e.g., in target volumes, of the disc.

Upon exposure to one or more recording light beams (e.g., high power laser beams), the dye absorbs the intense light at the interference fringes, momentarily raising the temperature in the corresponding volume or region of the disc to a point above the melting temperature (Tm) of the poly(ethylene oxide) phase. This causes that region to become substantially amorphous, producing a different refractive index than the crystalline domains in the surrounding material. Subsequent exposure to low energy laser beams for the purpose of reading the recorded micro-holograms and recovering corresponding data as micro-hologram reflections does not cause any substantial change in the material, where laser powers that do not heat the polymer above the Tg or Tm of the individual polymers are used. Thus, a non-linear optically responsive, such as a threshold responsive, holographic data storage media may be provided that is substantially stable for long periods of time and over a number of readings.

While spheres, cylinders and lamellas are common structures, other permutations can form and work equally well. A variety of block copolymers, including polycarbonate/polyester block copolymers, may alternatively be used and allow for different forming temperatures of the crystalline domains, as well as the temperature at which they are destroyed. Where the dye used to absorb the radiation and produce heat takes the form of a reverse saturable absorber, good control in pinpointing where the heating takes place may result. Lateral extension of the micro-holograms may be significantly smaller than the diameter of the waist of the focused laser beam(s). Limiting or eliminating consumption of dynamic range of the recording material outside of the recorded micro-holograms, hence increasing reflectivity of each micro-hologram and therefore data storage capacity, may thus be realized through the use of a non-linear recording medium according to an aspect of the present invention.

Figure 12:
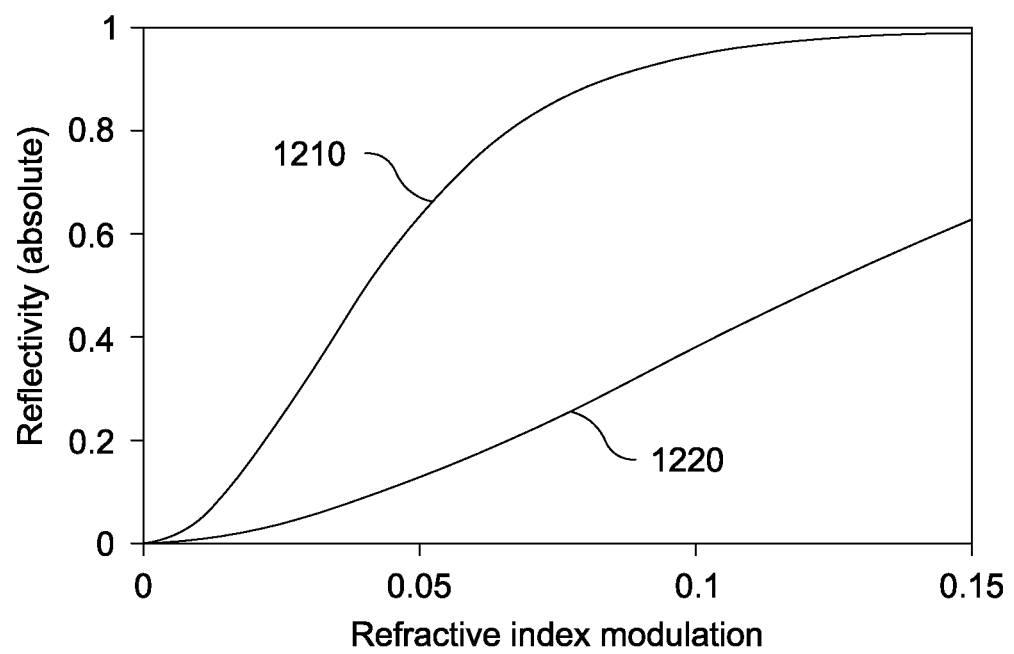
FIG. 12 illustrates an expected micro-hologram reflectivity as a function of refractive index modulation.
Figure 13B:
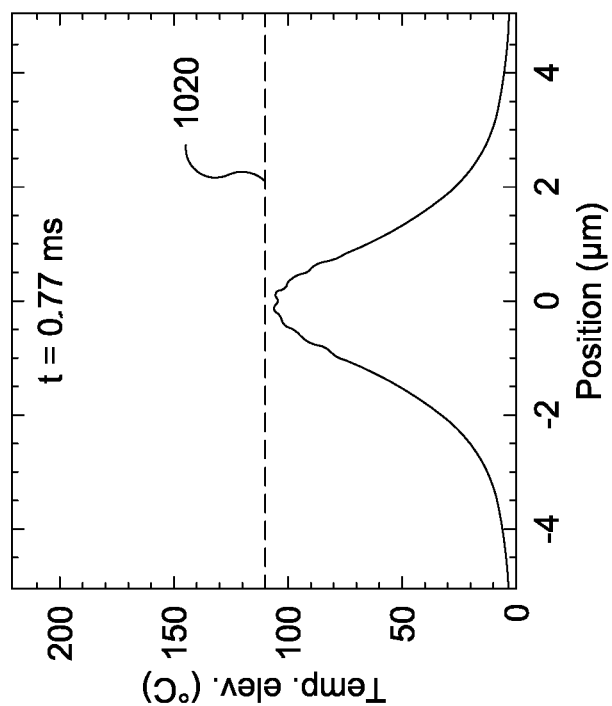
FIGS. 13A and 13B illustrate expected temperature elevation profiles as a function of position, at various times.
Figure 13A:
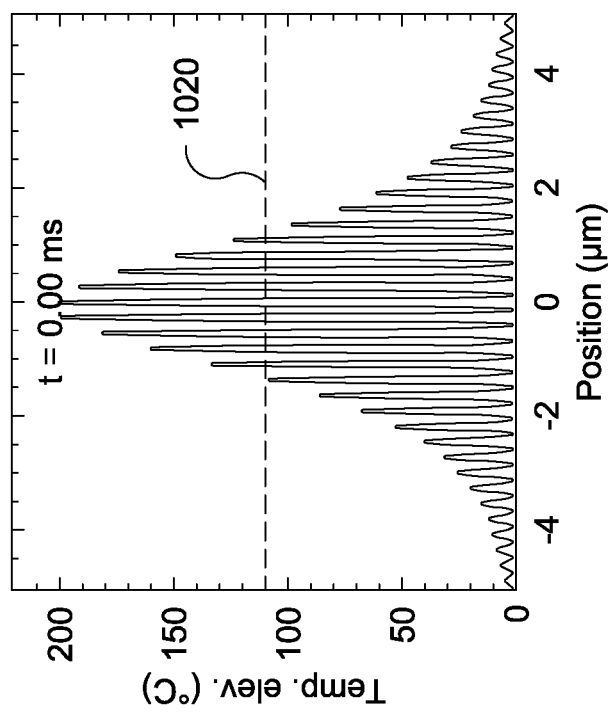

A threshold material can also present the additional benefit of being more sensitive to recording than a linear material. This advantage may translate into higher achievable recording data rates for a micro-holographic system. Further, a step-wise refractive index modulation resulting from a threshold characteristic of the media may serve to produce micro-holograms less reflective than when using linear materials. However, reflectivity may remain sufficiently high for data storage applications. Referring now also to FIG. 12, it is expected that reflectivity will increase with increasing refractive index modulation. It is also expected that thermal diffusion should not present undue problems. Thermal diffusion during hologram formation has also been considered, and the temperature pattern is expected to follow the interference fringes of the counter-propagating light beams, i.e., the exposure pattern. To maintain the fringes in the index pattern, thermal diffusion may be substantially limited to the region between the fringes reaching the phase change temperature. Curve 1210 in FIG. 12 corresponds to a linearly responsive material, and curve 1220 in FIG. 12 corresponds to a threshold responsive material. Referring now also to FIGS. 13A and 13B, there are shown expected temperature elevation profiles as a function of position. Accordingly, it is expected that thermal leakage from a target volume to surrounding volumes should not raise the surrounding volumes to the threshold temperature 1020.

Non-Linear Material Example 2

According to another configuration, organic dyes in polymer matrices may be used to support refractive index changes (Δn) to effect holographic data storage, where the organic dyes have large resonant enhanced refractive indices relative to the polymer matrix. In such a case, bleaching of the dyes in specific regions, or target volumes, may be used to produce the refractive index gradient for holography. Data may be written by interfering light beams within the media to bleach specific areas. However, where interfering light passes through the entire media, (even though only specific areas are to be bleached) and a linear response to the bleaching radiation exists, (even though the light beam intensity is highest in the focused areas, and produces the most bleaching thereat) relatively low levels of the dye are expected to be bleached throughout the impinged media. Thus, after data is written into multiple levels, an undesirable additional bleaching of is expected to occur in a linear recording media. This may ultimately limit the number of layers of data that can be written into the media, which in-turn limits overall storage capacity for the linear recording media.

Another concern arises from the recognition that a recording medium needs to have a high quantum efficiency (QE) in order to have a useful sensitivity for commercial applications. QE refers to the percentage of photons hitting a photo reactive element that will produce an electron-hole pair and is a measure of the device's sensitivity. Materials with high QEs are typically subject to rapid bleaching of stored holograms, and thus data, even when using a low power reading laser. Consistently, data can only be read a limited number of times before the data essentially become un-readable in a linearly responsive medium.

According to an aspect of the present invention, a non-linear optically responsive medium is used to address these shortcomings. Again, a material solution based on thermoplastics, instead of photopolymers, may be used in a holographic system for providing data storage and retrieval. This may prove advantageous in terms of processes, handling and storage, as well as compatibility with a variety of holographic techniques.

By way of further explanation, narrow band absorbing dyes in thermoplastic materials may be used for holographic optical data storage. It is believed that rigid polymer networks retard Quantum Efficiencies (QE) for certain photochemical reactions. Thus, according to an aspect of the present invention, localized heating of a polymer network, such as to temperatures near or above the Tg of the thermoplastic, are useful for increasing the localized QE of the material, such as by a factor >100. This improvement directly enhances the sensitivity of the material in a manner useful for holographic optical data storage. Further, it provides a gating process, or a threshold process, in which dye molecules in discrete molten regions of the media undergo photochemical reactions faster than in the surrounding amorphous material—in turn facilitating writing on many virtual layers of a media without significantly affecting other layers. In other words, it enables reading and writing without deleteriously causing significant bleaching of other volumes.

Figure 17A:
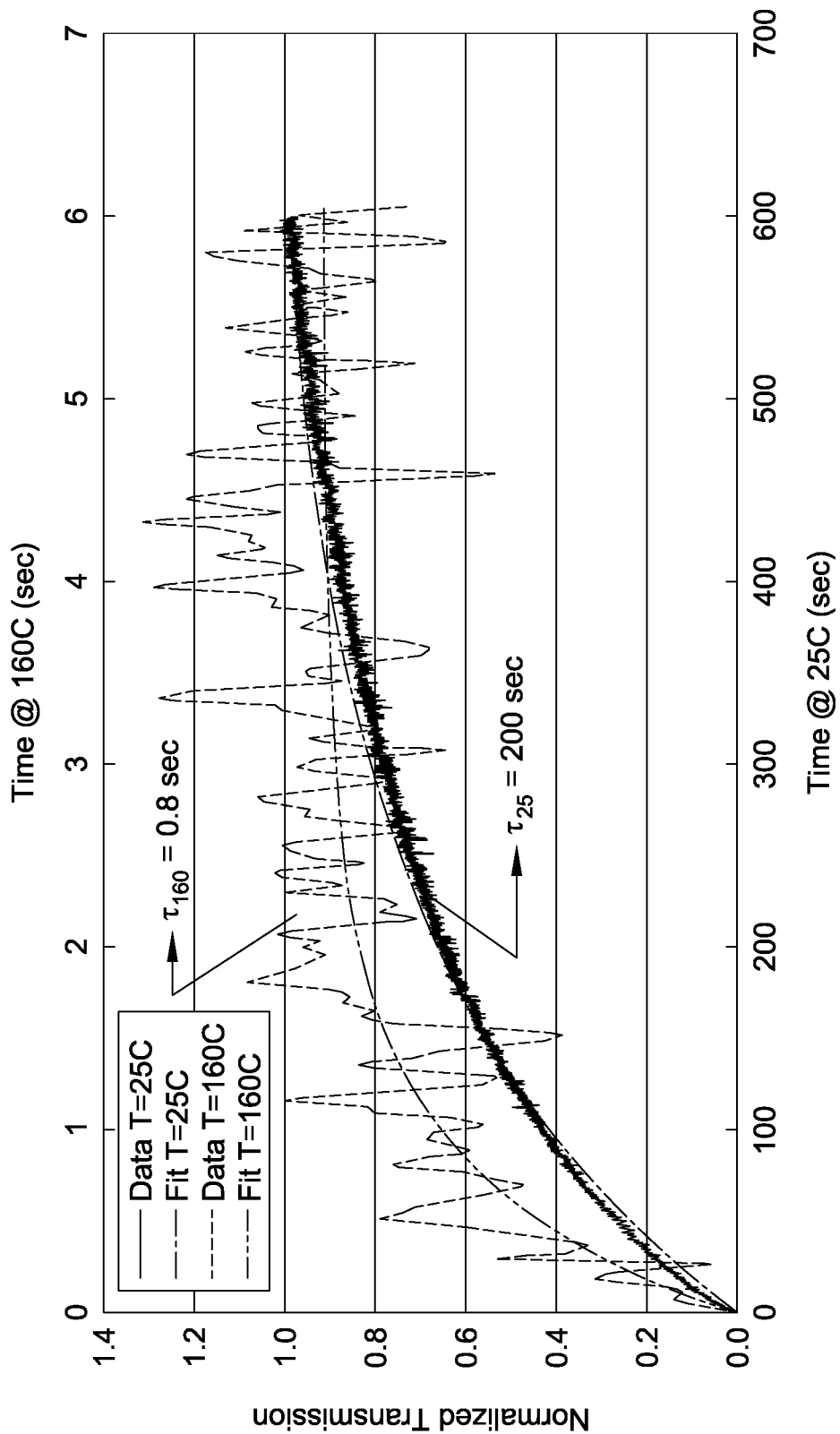
FIG. 17A illustrates changes in normalized transmission of an ortho-nitrostilbene at 25° C. and 160° C. as a function of time.
Figure 17B:
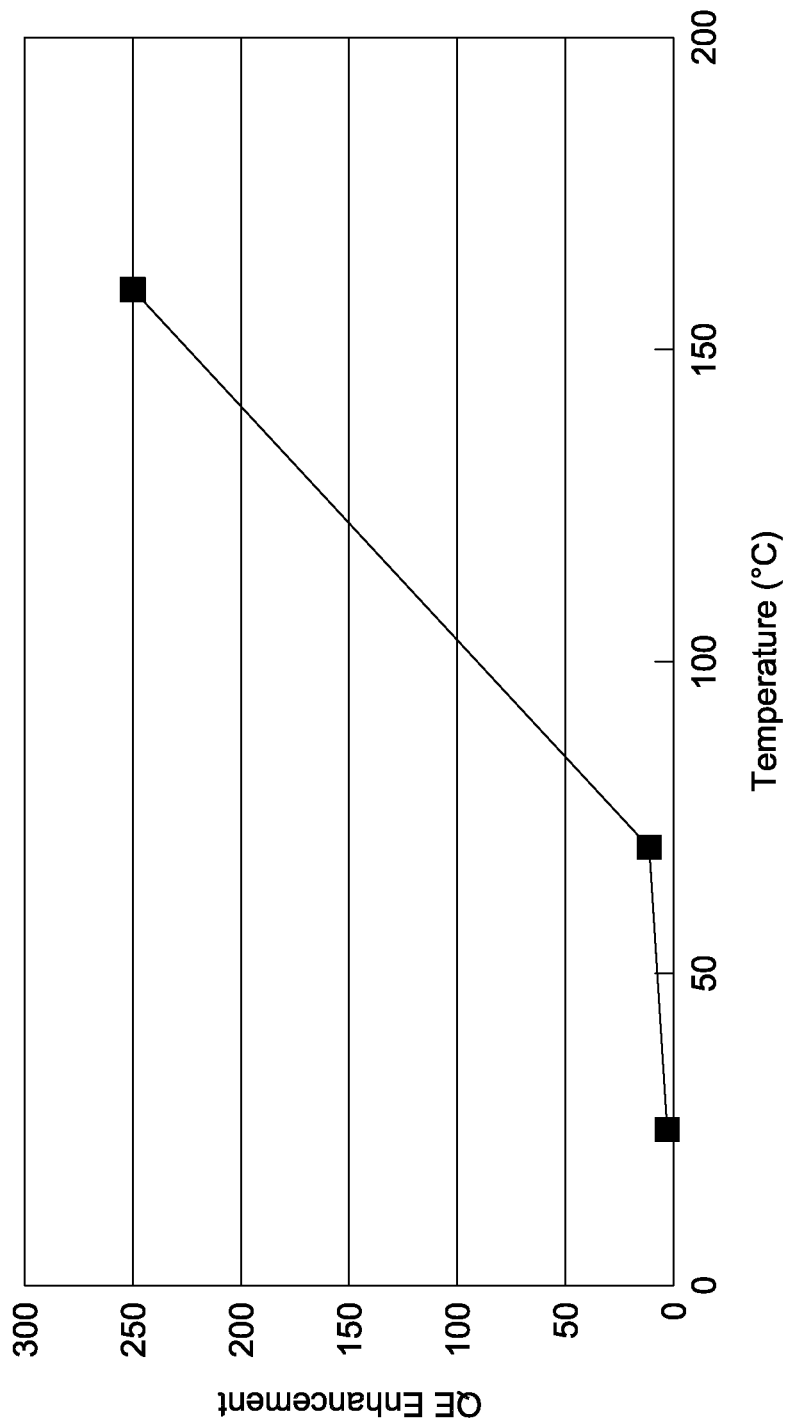
FIG. 17B illustrates a change in quantum efficiency of an ortho-nitrostilbene as a function of temperature.
Figure 17C:
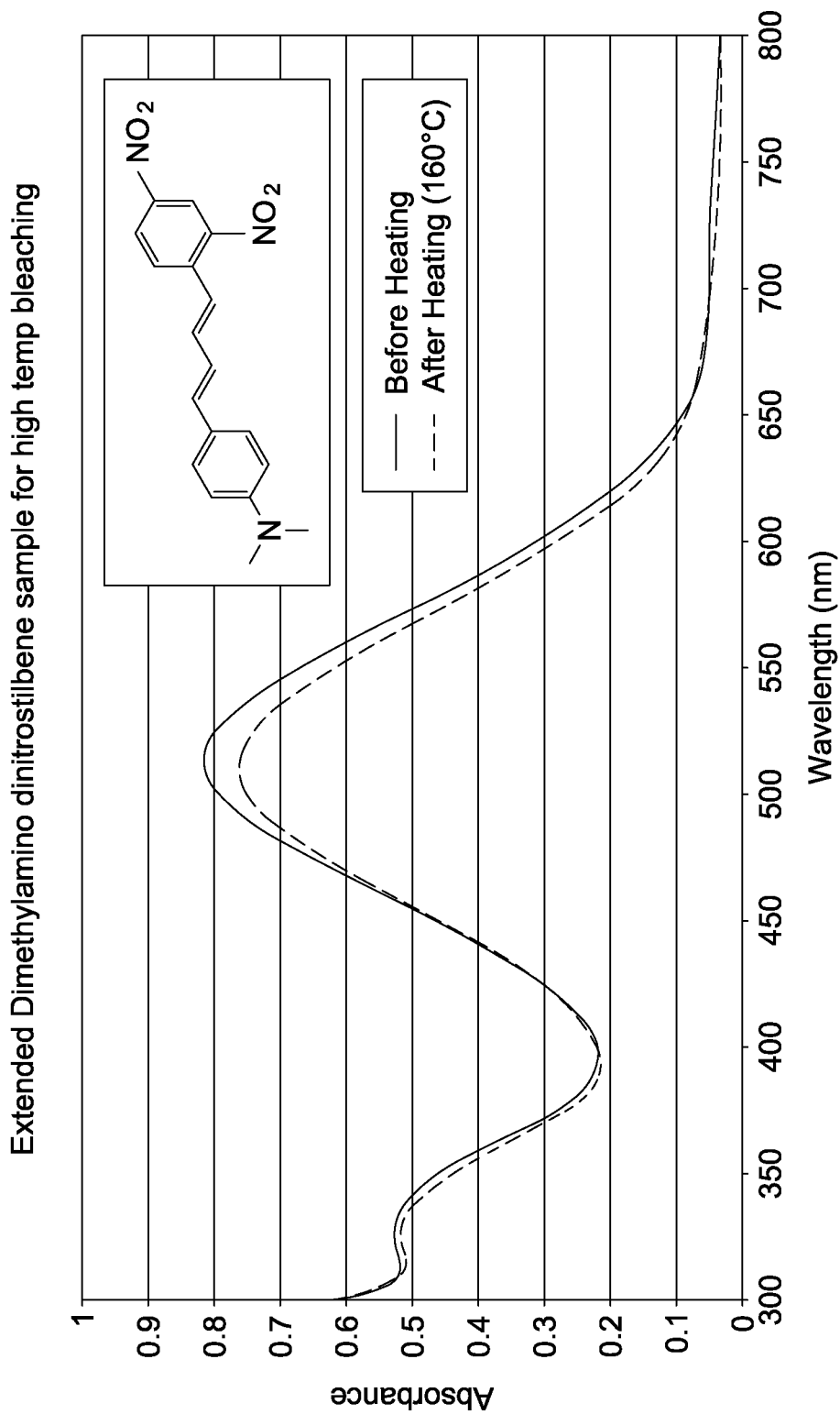
FIG. 17C illustrates the absorbance of dimethylamino dinitrostilbene as a function of wavelength at 25° C. and 160° C.

Referring now to FIGS. 17A-17C, ortho-nitrostilbenes (o-nitrostilbenes) containing polymer matrices may be used for holographic data storage. The photochemical reaction that causes bleaching of ortho-nitrostilbenes is well known, and discussed for example in Splitter and Calvin, JOC, 1955, vol. 20 and pages 1086-1115. McCulloch later used this class of compound for producing waveguides in a thin film application by bleaching the dye to form cladding material (see, Macromolecules, 1994, vol. 27, pages 1697-1702. McCulloch reported a QE of a particular o-nitrostilbene to be 0.000404 in a Polymethylmethacrylate (PMMA) matrix. However, he noted the same dye in a dilute hexane solution had a QE of 0.11 at the same bleaching wavelength. McCulloch further speculated this difference was due to hypsochromic shift in the lambda max in going from thin polymer films to hexane solutions. It may be related to a mobility effect, since the stable conformation of the o-nitrostilbene in the rigid polymer may not be aligned properly due to the initial pericyclic reaction. FIG. 17A illustrates data indicative of bleaching with a 100 mW 532 nm laser at 25° C. and at 160° C. Enhancement may be due to increased mobility or simply faster reaction kinetics due to the higher temperature, or a combination of both. Consistent with FIG. 17A, FIG. 17B shows an enhanced QE of the discussed matrix is expected at above around 65° C. Thus, in one embodiment o-nitrostilbene dyes are used in combination with polycarbonate matrices to provide performance comparable to PMMA materials, though slightly higher QEs may be possible.

It should be understood, however, that the present invention is not to be restricted to this class of dyes. Rather, the present invention contemplates the use of any photoactive dye material having a sufficiently low QE in a solid polymer matrix at or near room temperature and that displays an increase in QE, such as an exponential increase in QE, upon heating. This provides for a non-linear recording mechanism. It should be understood that the heating need not raise the temperature above glass transition temperature (Tg) or it may raise it well above Tg, as long as the QE becomes significantly enhanced. The QE of such a photoactive dye may be enhanced within specific regions of a polymer matrix that contains a substantially uniform distribution of the dye. In the case of a polycarbonate matrix, by heating the polycarbonate matrix containing the photoactive dye above the Tg thereof an increase in the bleaching rate may be achieved. The increase of the bleaching rate may be on the order of >100 times.

Optionally, in addition to a photo reactive dye being added to a polycarbonate matrix like o-nitrostilbene, a second thermally and photo chemically stable dye may also be added to the matrix to function as a light absorber, to produce localized heating at the interference fringes at the focus of counter-propagating laser beams. Dye concentrations, laser power and time at the focusing point may be used to adjust the expected temperature to the desired range near or above the Tg of the matrix, for example. In such an embodiment, the first and second wavelengths of light for photo bleaching are simultaneously focused in roughly the same region of the matrix. Since the sensitivity in the heated region of the material is expected greater, e.g., on the order of 100 times greater, than surrounding cool rigid polymer regions (see, FIG. 17A), information can be quickly recorded in a target, heated volume using a relatively low power light beam having a significantly less bleaching affect on the surrounding regions. Thus, previously recorded regions or regions that have not yet had data recorded experience minimal bleaching, thereby mitigating undesired dynamic range consumption thereat and permitting more layers of data to be written in the media as a whole. Also, by reading at relatively low power with the laser wavelength used to heat the specific region for writing, inadvertent dye bleaching during readout is also mitigated against. Alternatively, a single wavelength, or range of wavelengths, of light may be used for heating and bleaching, such that only one wavelength of light (or range of wavelengths) is used instead of two different wavelengths.

Although a variety of dyes are suitable for acting as thermally and photo-chemically stable dyes for localized heating purposes, dyes that behave non-linearly may prove particularly well suited. One such class of dyes, known as Reverse Saturable Absorbers (RSA), also known as excited state absorbers, is particularly attractive. These include a variety of metallophthalocyanines and fullerene dyes that typically have a very weak absorption in a portion of the spectra well separated from other strong absorptions of the dye, but nonetheless form strong transient triplet-triplet absorption when the intensity of the light surpasses a threshold level. Data corresponding to a non-limiting example using extended dimethylamino dinitrostilbene is shown in FIG. 17C. Consistently therewith, it is expected that once an intensity of light at interference fringes of counter-propagating light beams in a medium incorporating dimethylamino dinitrostilbene surpasses the threshold level, the dye absorbs strongly at a focused point and can quickly heat the corresponding volumes of the material to high temperatures. Thus, according to an aspect of the present invention, a thermal gating event is used to enable a relatively low energy to write data into a target volume of a media (thus exhibiting increased sensitivity), while minimizing unwanted exposure induced reactions in other volumes of the media.

Tracking and Focusing

Figure 28:
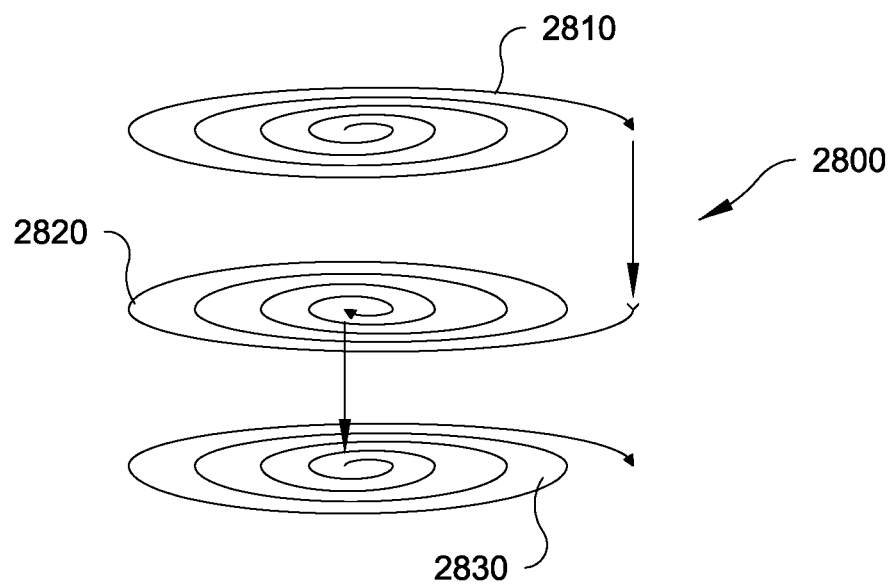
FIG. 28 illustrates a formatting having alternating-direction spiral tracks.
Figure 30:
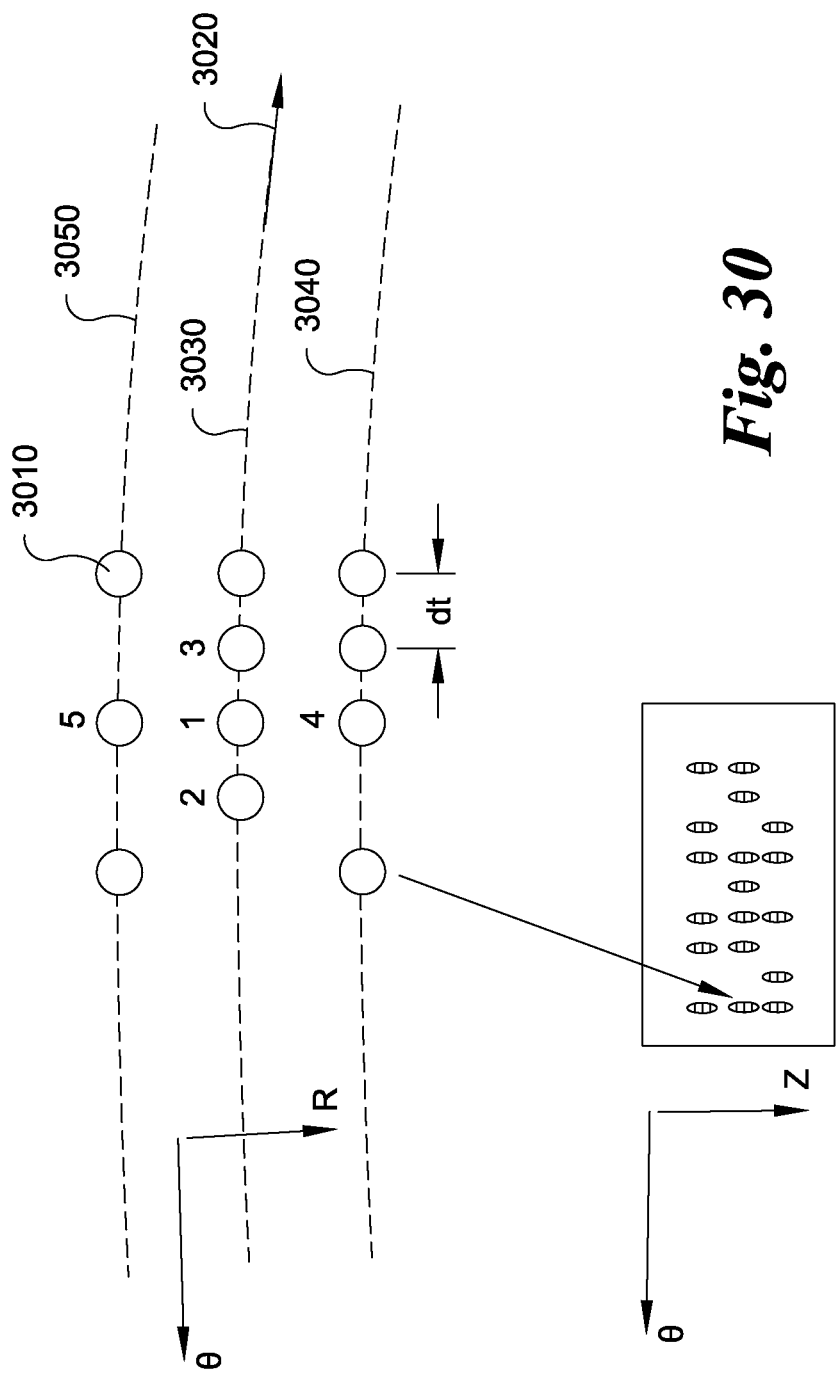
FIG. 30 illustrates a formatting including substantially circular micro-holograms.

In one embodiment, micro-holograms are stored in a volumetric medium along radially extending spiral tracks in a plurality of vertically stacked layers where the media is in the form of a disc that spins (see, e.g., FIGS. 28 and 30). Alternatively, micro-holograms may be stored in a volumetric medium along vertically (depth-wise) extending spiral tracks in a plurality of radially stacked cylinders where the media is in the form of a disc that spins. Either way, an optical system focuses a light beam into particular target volumes in the media, to detect the presence or absence of a micro-hologram thereat, in order to recover or read out the previously stored data or to generate interference fringes thereat to generate a micro-hologram. Thus, it is important that target volumes be accurately targeted for data writing and recovery light beam illumination.

In one embodiment, the spatial characteristics of reflections of an impinging light beam are used to aid accurate targeting of selected volumes of the micro-hologram array containing media. If a target volume, e.g., micro-hologram, is out of focus or off track, the reflected image differs from a reflection from a micro-hologram that is in-focus and on-track in a predictable manner. This can in-turn be monitored and used to control actuators to accurately target specific volumes. For example, the size of reflections from micro-holograms out of focus varies from those of micro-holograms in focus. Further, reflections from misaligned micro-holograms are elongated as compared to reflections from properly aligned micro-holograms, e.g., are more elliptical in nature.

Figure 18:
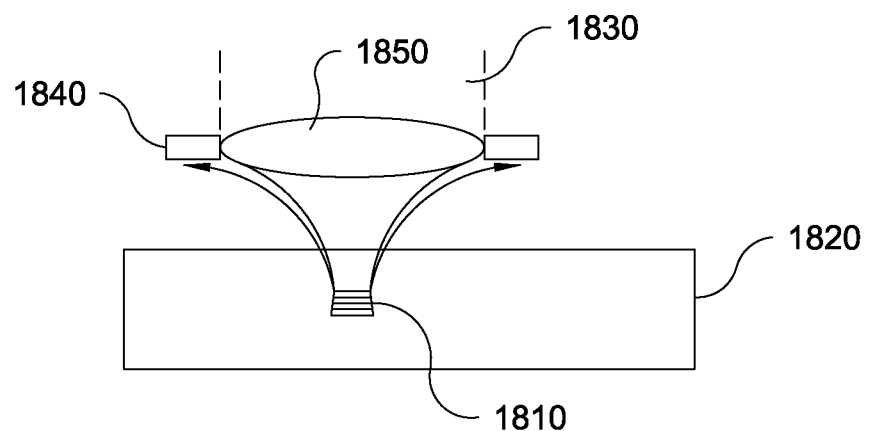
FIG. 18 illustrates a tracking and focus detector configuration.

By way of further explanation, in the above-discussed material systems, (different from conventional CD and DVD technologies) a non-metalized layer is used to reflect an incident reading light beam. As shown in FIG. 18, micro-hologram 1810 contained in media 1820 reflects reading light beam 1830 to a ring detector 1840 positioned around one or more optical elements (e.g., lens) 1850. Optical element 1850 focuses light beam 1830 into a target volume corresponding to micro-hologram 1810—such that micro-hologram 1810 generates a reflection that is incident on optical element 1850 and ring detector 1840. In the illustrated embodiment, optical element 1850 communicates the reflection to a data recovery detector (not shown). It should be understood that while only a single micro-hologram 1810 is illustrated, in actuality media 1820 is expected to contain an array of micro-holograms positioned at various positions (e.g., X, Y coordinates or along tracks) and in many layers (e.g., Z coordinates or depth planes or pseudo-planes). Using actuator(s), optical element 1850 may be selectively targeted to different target volumes corresponding to select ones of the micro-holograms.

Figure 19A:
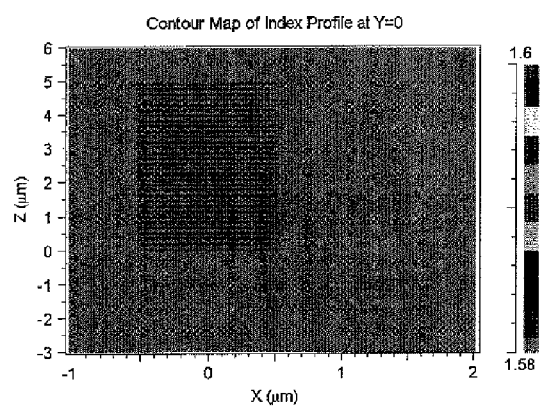
FIGS. 19A-19C illustrate the contour of a simulated refractive index profile.
Figure 19B:
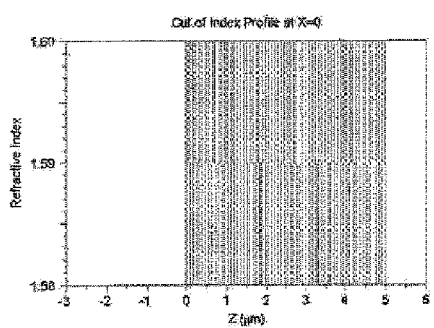
Figure 19C:
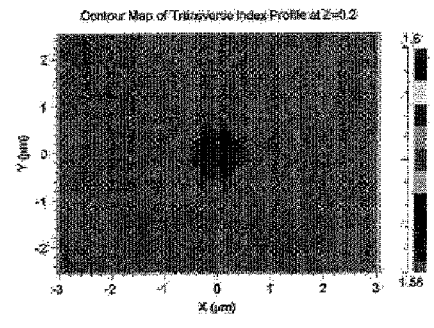

If micro-hologram 1810 is at the focus of the reading light beam 1830, the reading laser beam 1830 gets reflected, thereby generating a reflected signal at optical element 1850, which is communicated to a data recovery detector. The data recovery detector may take the form of one or more photodiodes positioned to detect light beam 1830 reflections, for example. If no micro-hologram 1810 is present at the focus, no corresponding signal is generated by the data recovery detector. In a digital data system, a detected signal may be interpreted as a "1" and the absence of a detected signal as a "0", or vice-a-versa. Referring now also to FIGS. 19A-19C, there is shown simulated reflection data corresponding to an on-focus, on-track circular micro-hologram, using a reading light beam having an incident wavelength of 0.5 µm, a laser spot size of D/2=0.5 µm, a left circular polarization, a confocal light beam parameter: z/2=2.5 µm, and a far field half diffraction angle of θ/2=11.55° (field) or θ/2=8.17° (power).

Figure 20:
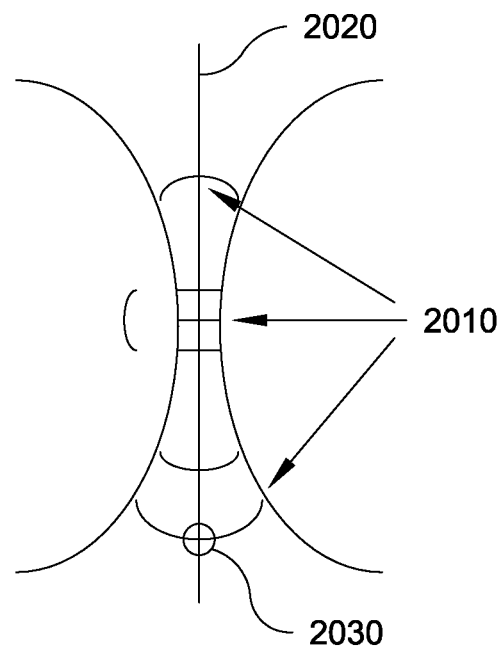
FIG. 20 illustrates a cross-section of an incident laser beam impinging a region of a holographic recorded media.

Referring now also to FIG. 20, in order for a reading laser beam to be reflected by a micro-hologram correctly, the laser beam should be correctly focused and laterally centered on the micro-hologram. In FIG. 20, an incident light beam is seen to have wave-fronts 2010 that are normal to the propagation optical axis 2020 in the central portion 2030 thereof. A micro-hologram substantially only reflects the light of those wave vectors (i.e., k vectors) that match a certain direction. A focused Gaussian light beam, such as that shown in FIG. 20, is the overlap of many wavelets with various wave vector. The maximum angle of the wave vector is determined by the numerical aperture of the focusing objective lensing. Accordingly, not all wave vectors are reflected by the micro-hologram—such that a micro-hologram acts like a filter that only reflects incident light with certain wave vectors. When away from focus, only the central portion of the incident light overlaps with the micro-hologram. So, only the central portion gets reflected. In this scenario, changes in the reflection efficiency decrease.

When the focused light beam is not properly aligned with a micro-hologram in a track, the wave vectors along the direction vertical to the track do not have as strong a reflection in the direction along the track. In such a case, the light beam is elongated in the direction vertical to the track in the near field, while the light beam is squeezed in this direction in the far field. Accordingly, separate tracking holograms may be provided.

FIGS. 21A-21C show near-field distributions (z=−2 µm) corresponding to the simulation of the circular micro-hologram of FIGS. 19A-19C. FIG. 21A illustrates a data recovery light beam being launched at x=y=0 and z=0.01 into a media. FIG. 21B illustrates an off-track condition reflection caused by a shift of x=0.5. FIG. 21C illustrates an out of- or off-focus condition reflection caused by a shift of z=1.01. Thus, in an out of focus condition light beam efficiency decreases, while in an off track condition the reflection is spatially distorted. Referring now also to FIGS. 22A-22C, there are shown far-field distributions corresponding to the near-field distributions of FIGS. 21A-21C, respectively. FIG. 22A shows a data recovery light beam being launched at x=y=0 and z=0.01 into a media provides analogous far-field divergence angles (full) in the X and Y directions, in the illustrated case 11.88° in both X- and Y-directions. FIG. 22B shows an off-track condition reflection caused by a shift of x=0.5 results in different far-field distribution angles in the X and Y, in the illustrated case 4.6° in the X-direction and 6.6° in the Y-direction. Finally, FIG. 22C shows an out of- or off-focus condition reflection caused by a shift of z=1.01 results in analogous far-field divergence angles (full) in the X and Y directions, in the illustrated case 9.94° in both X- and Y-directions. Thus, micro-holograms act as k-space filters, such that the far field spot will be elliptical in an off-track condition, and the far field spot will be smaller with an out of focus condition.

Figures 23A, 23B, 23C:
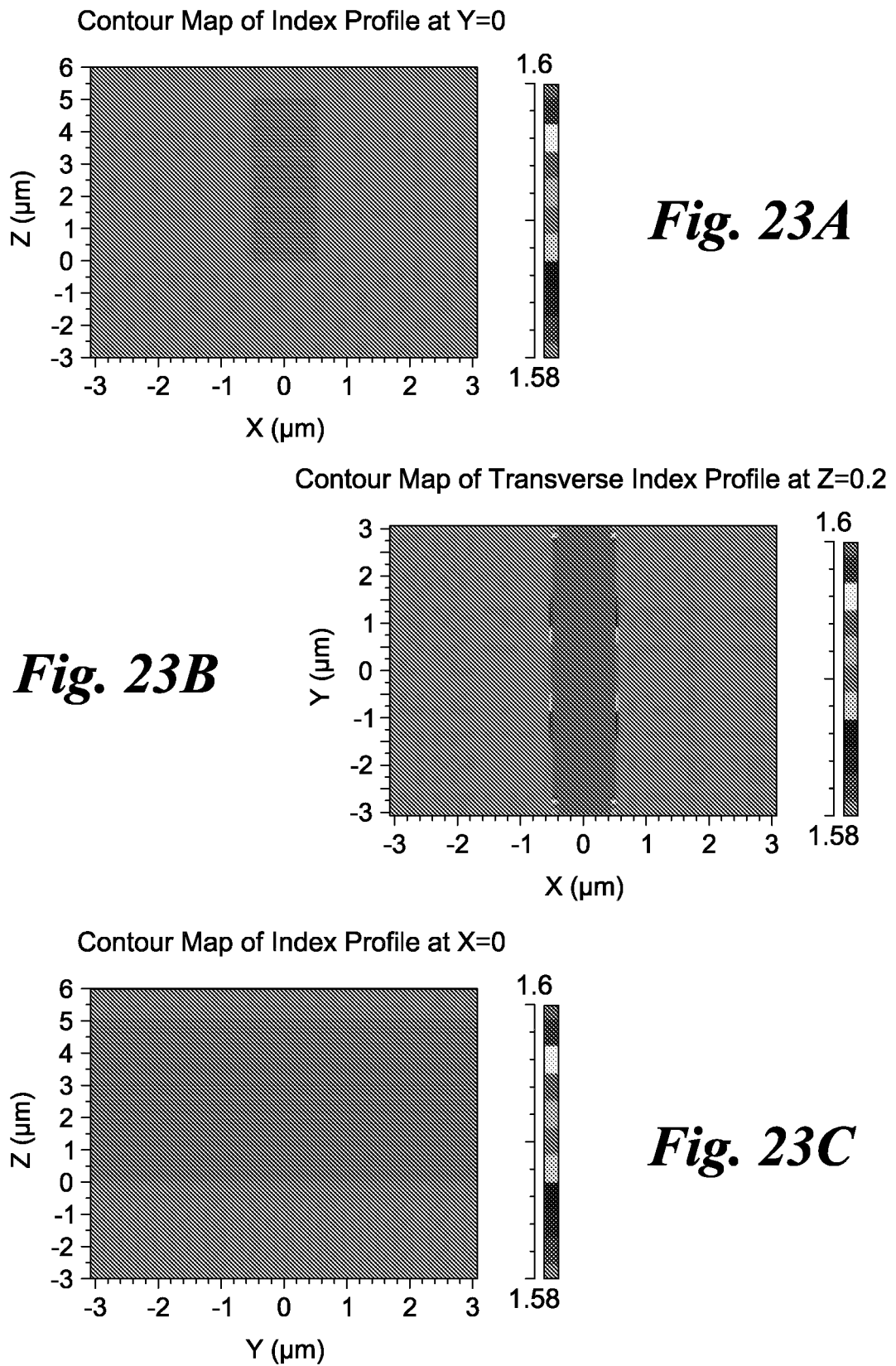
FIGS. 23A-23C illustrate the contour of a simulated refractive index profile.

It should be understood that the micro-holograms need not be circular. For example, oblong micro-holograms may be used. Referring now also to FIGS. 23A-23C, there is shown a simulation corresponding to an on-focus, on-track oblong micro-hologram, using a reading light beam having an incident wavelength of 0.5 µm, a laser spot size of D/2=0.5 µm, a left circular polarization, a Rayleigh range of z/2=2.5 µm, and a far field half diffraction angle of θ/2=11.55° (field) or θ/2=8.17° (power)—analogous to the simulation of FIGS. 19A-19C. FIGS. 24A-24C show near-field distributions (z=−2 µm) corresponding to the simulation of the oblong micro-hologram of FIGS. 23A-23C. FIG. 24A illustrates a data recovery light beam being launched at x=y=0 and z=0.01 into a media. FIG. 24B illustrates an off-track condition reflection caused by a shift of x=0.5. FIG. 24C illustrates an out of- or off-focus condition reflection caused by a shift of z=1.01. Thus, in an out of focus condition, light beam efficiency decreases, while in an off track condition the reflection is spatially distorted. Referring now also to FIGS. 25A-25C, there are shown far-field distributions corresponding to the near-field distributions of FIGS. 24A-24C, respectively. FIG. 25A shows a data recovery light beam being launched at x=y=0 and z=0.01 into a media provides far-field divergence depending upon the oblong-ness of the micro-hologram, in the illustrated case 8.23° in the X-direction and 6.17° in the Y-direction. FIG. 25B shows an off-track condition reflection caused by a shift of x=0.5 results in different far-field distribution angles in the X and Y, in the illustrated case 4.33° in the X-direction and 5.08° in the Y-direction. Finally, FIG. 25C shows an out of- or off-focus condition reflection caused by a shift of z=1.01 results in different far-field divergence angles (full) in the X and Y directions, in the illustrated case 5.88° in the X-direction and 5.00° in the Y-direction.

Thus, oblong micro-holograms also act as k-space filters, and that while oblong micro-holograms result in elliptical far-field spot spatial profiles, in an off track condition the elongated direction may differ, and the far field spot will be smaller with an out of focus condition.

The present invention will be further discussed as it relates to circular micro-holograms for non-limiting purposes of explanation only. The light beam shape variation in the off track direction, as well as light beam spatial intensity, may be determined using a quadropole detector, such as that shown in FIG. 26. Thus, in one embodiment, the spatial profile of micro-holograms reflections are used to determine whether a reading light beam is in focus and/or on track. This signal may also serve to separate the two light beam focusing scenarios, out of focus and out of track, and provide a feedback signal to a drive servo to correct the position the laser optics head, for example. For example, one or more detectors that convert micro-hologram reflections into electrical signals can be used to detect changes in the reflected image of the micro-holograms—and hence be used to provide focus and tracking feedback for optical element positioning actuators. A variety of photodetectors may be used to detect the micro-hologram reflections. As an example, one or more photodiodes may be used to detect reflections from micro-holograms in a conventional manner. The manufacturing and use of photodiodes are well known to those possessing an ordinary skill in the pertinent arts. The information provided by these detectors is used to perform real-time control of actuators in the optical system in order to maintain focus and stay on the correct data track.

Such a servo control system may thus address primarily two scenarios that can occur for laser beam out of focus condition: the first is when the laser beam is not focused onto the correct layer, and the second is when the laser beam is laterally misaligned from the micro-hologram to be read; while also being configured to optimize tracking and focus performance in the presence of noise sources. Estimation techniques, such as Kalman filters, can be used to deduce an optimal estimate of past, present, or future states of the system in order to reduce the real-time errors and reduce read and write errors.

FIGS. 26A-26D show a detector configuration or array (FIG. 26A) and various detected conditions (FIGS. 26B-26D) for determining whether the system is in focus or on track. In one embodiment, a four quadrant detector array 2600 may be used to determine if the optical system is out of focus or off-track. Each quadrant detector 2600A, 2600B, 2600C, 2600D of detector array 2600 generates a voltage that is proportional to the amount of energy reflected onto it. Detector array 2600 incorporates an array of photodiodes that each correspond to one of the quadrants, such as in the form of a quadrapole detector, for example. In the illustrated embodiment detector array 2600 is responsive to optical energy propagating over an area greater than the focusing optics (e.g., lens 2620) used to relay (e.g., focus) light beams in and reflections out of the volumetric storage media. For example, quadrapole detector 2600 may be positioned behind objective lensing used to impinge and receive reflections from a target volume, to detect light beam shape variations. In the case of a circular micro-hologram, if the detected light beam shape is elliptical, it may be inferred that the light beam is off track, such that the off-track direction is the elliptical light beam short axis. If the detected light beam is smaller than expected (with smaller numerical aperture), but the variation is symmetric in nature, it may be inferred the light beam is out of focus. These detected changes in the spatial profile of the reflected read light beam from volumetric media are used as feedback for a drive focusing and/or tracking control. Optionally, a smaller lens array may be used around the objective lensing to focus the distorted reflected signal. Further, changes in the angle of propagation of the reflected light beam are also useful as an indication of the direction of misalignment.

Figure 26A:
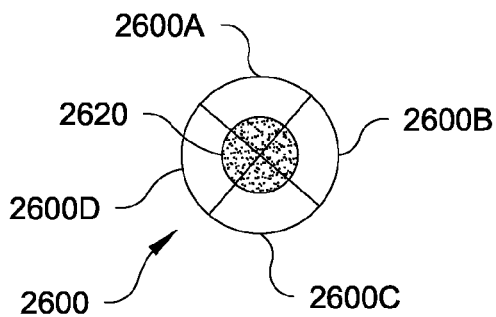
FIGS. 26A-26D illustrate tracking and focus detector configuration and exemplary sensed conditions.
Figure 26B:
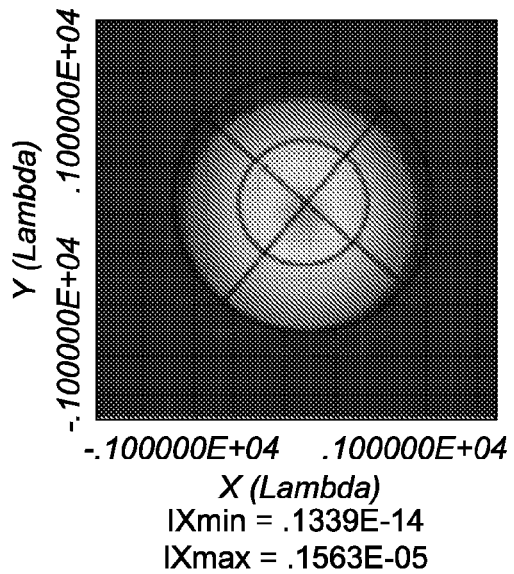
Figure 26C:
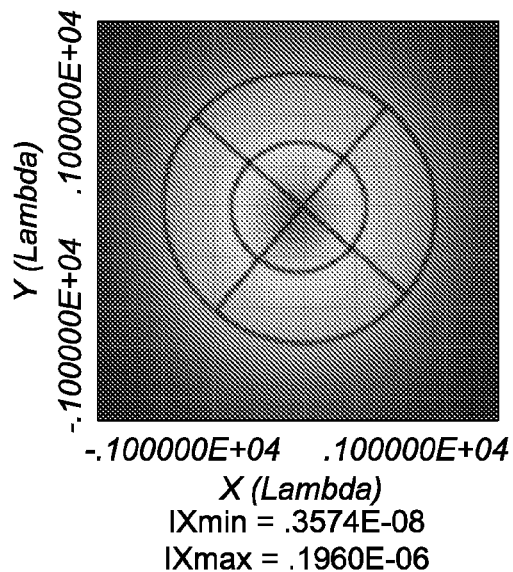
Figure 26D:
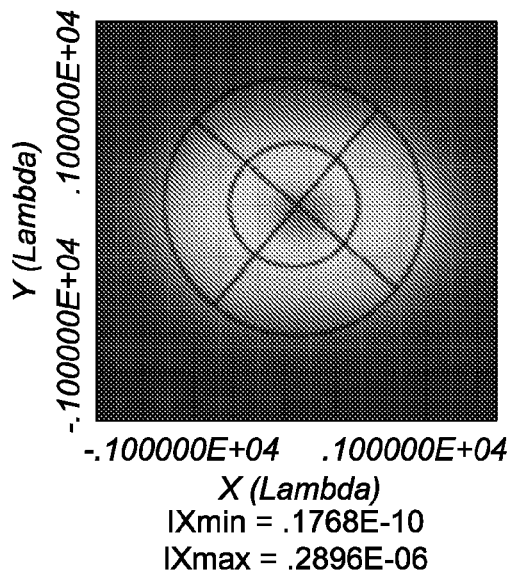

The total amount of signal generated by quadrant ring detectors 2600A-2600D is represented by $\alpha$. If the system is in focus, as is shown in FIG. 26B, the focused spot will be circular, of minimum size and produce the least amount of signal $\alpha_{min}$. Where $\alpha > \alpha_{min}$, as is shown in FIG. 26C, the light beam spot may be determined to be out of focus. Lens 2620 may be positioned in the center of detector array 2600 to pass and focus a reading light beam on the micro-holograms. Conventional feedback control mechanisms that minimize $\alpha$ may be used to maintain focus of the micro-hologram. Referring now also to FIG. 26D, an asymmetrical pattern is detected if the sensor head is moving off-track. When on-track, all four quadrant detectors 2600A, 2600B, 2600C, 2600D receive equal energy, such that $\beta = (1800B + 1800D) - (1800A + 1800C) = 0$. Thus, a condition $\beta \neq 0$ indicates an off-track condition. By way of further example, the reflected signal becomes elongated if the sensor head is off track and variable $\beta$ (the difference between opposite quadrants) becomes more positive or negative. Conventional feedback control mechanisms may be used in combination with a tracking servo to reduce the tracking error by minimizing the absolute value of β. In one embodiment, a time reference can be established so α and β are sampled at suitable times. A phase locked loop (PLL) may be used to establish this reference and form a sampled tracking and focusing control system. Information from the rotational rate of the disc and the current read head location may also be used to generate a master time reference, T, for the system.

Figure 27:
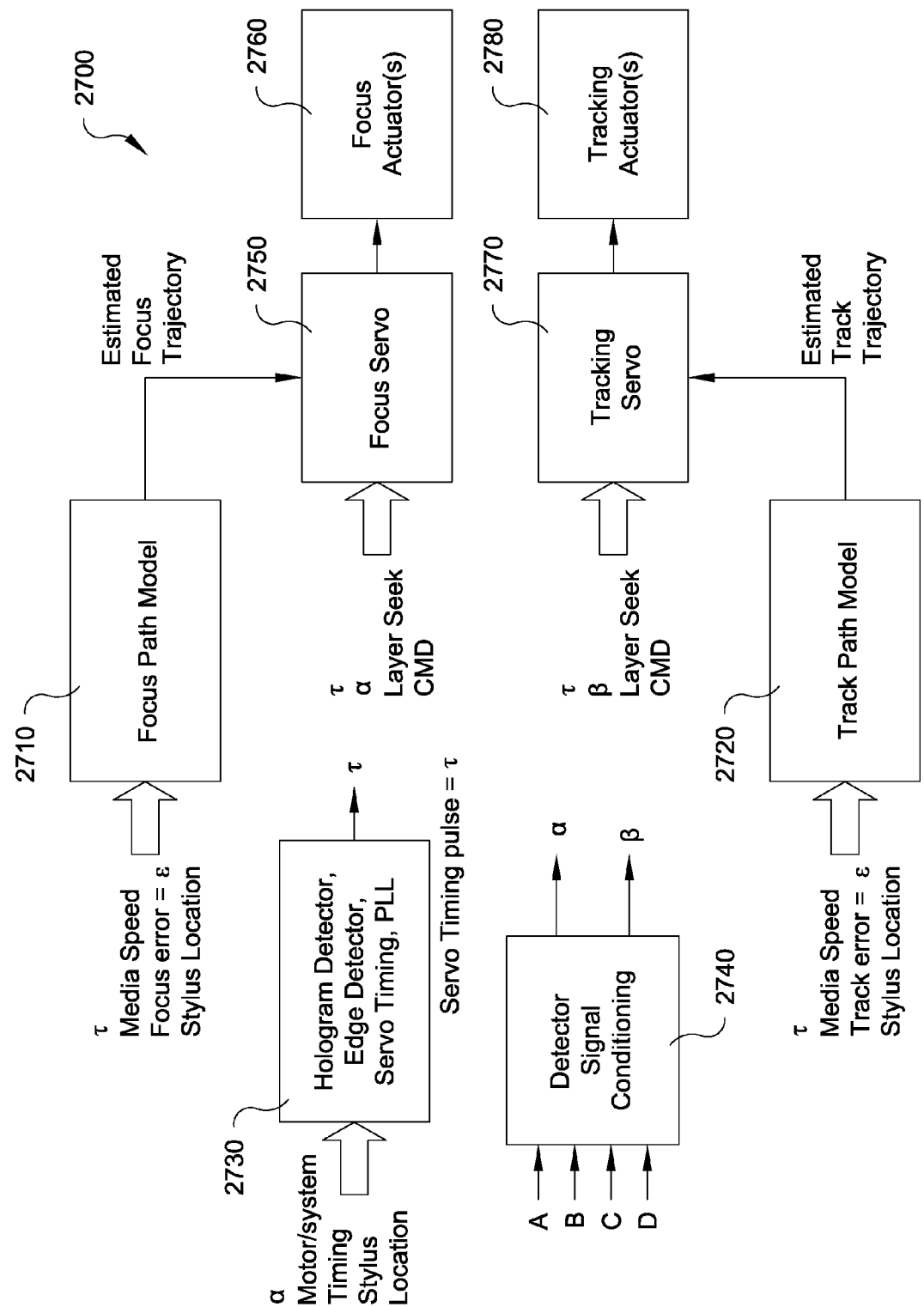
FIG. 27 illustrates a focus and tracking servo system.

Error sources, such as an off-center disk, disc warping and/or missing data can be compensated for. Kalman filters may be used to account for error sources, and predict a future path of recorded micro-holograms based on past information. Normal progression of the spiral path trajectory can also be estimated and forwarded to the tracking servos. This information is useful for enhancing the performance of the tracking and focusing servos, and reducing tracking and focusing servo error. FIG. 27, shows a block diagram of a servo system 2700 suitable for implementing focus and tracking control. System 2700 including focus and track path estimators 2710, 2720, that in one embodiment take the form of conventional Kalman filters. Focus path Kalman filter 2720 uses a servo timing pulse (τ), a rotational speed of the media, a focus error value (ε) (the difference between the desired track path and the actual track path), and a current stylus (e.g., read head) location to provide an estimated focus trajectory as the media rotates. Track path Kalman filter 2720 uses the servo timing pulse (τ), a rotational speed of the media, track error value (ε), and the current stylus location to provide an estimated track trajectory. System 2700 also includes a hologram detecting, edge detecting, servo timing pulse (τ) providing phase locked loop (PLL) 2730, that provides servo timing pulse (τ) responsively to detected total signal α, a motor timing signal that is directly related to the speed of the motor and the current stylus location. Conventional conditioning circuitry 2740, e.g., incorporating differential amplifiers, provides the total signal a, as well as the afore-discussed signal β, responsively to quadrant detectors 2600A, 2600B, 2600C, 2600D (FIG. 26A).

A focus servo 2750 controls focus actuators) 2760 responsively to the estimated focus trajectory from focus path Kalman filter 2710, as well as servo timing pulse (τ), total signal α, and a layer seek command from conventional layer and track seek logic (not shown). A tracking servo 2770 controls a tracking actuator(s) 2780 responsively to the estimated track trajectory from track path Kalman filter 2720, as well as servo timing pulse (τ), signal β, and a track seek command from the conventional layer and track seek logic (not shown). In essence, actuators 2760, 2780 position and focus a reading and/or writing light beam into a target volume of the head in the media responsively to corresponding layer and track seek commands from conventional layer and track seek logic (not shown).

It is to be understood that holograms formed by the conversion of dye molecules may be written so as to provide a range of reading return power corresponding to a more than binary-quantized level in order that each hologram is able to store more than one bit of data. In one configuration, this may be accomplished by adjusting the writing power that in turn controls the percentage of the dye molecules converted. In another configuration, this may be accomplished by introducing more than two quantization levels using pairs of closely positioned stacked gratings such that the gratings share a common axis. With a fixed distance between the grating envelope centers, by varying the relative phase between the two fringe patterns upon recording, one can generate structures that, when scanned with a readout beam, will generate either constructive or destructive interference for the diffracted beam propagating toward the detector. In this configuration, the refractive index variation may be discrete (e.g. step-like) as in threshold index-change materials, and still be capable of producing multiple reflectivity levels at a cost of slightly increased size of a single element (e.g. a grating pair, in this example). Also, when a threshold material is used to generate index change, the depth of the grating (e.g. the dimension along the writing/reading beams) is reduced due to the threshold cut-off at the periphery of the beam's focal region, so the two gratings may be positioned closer together so that the effective volume taken by a single (multilevel) element is reduced.

Figure 47:
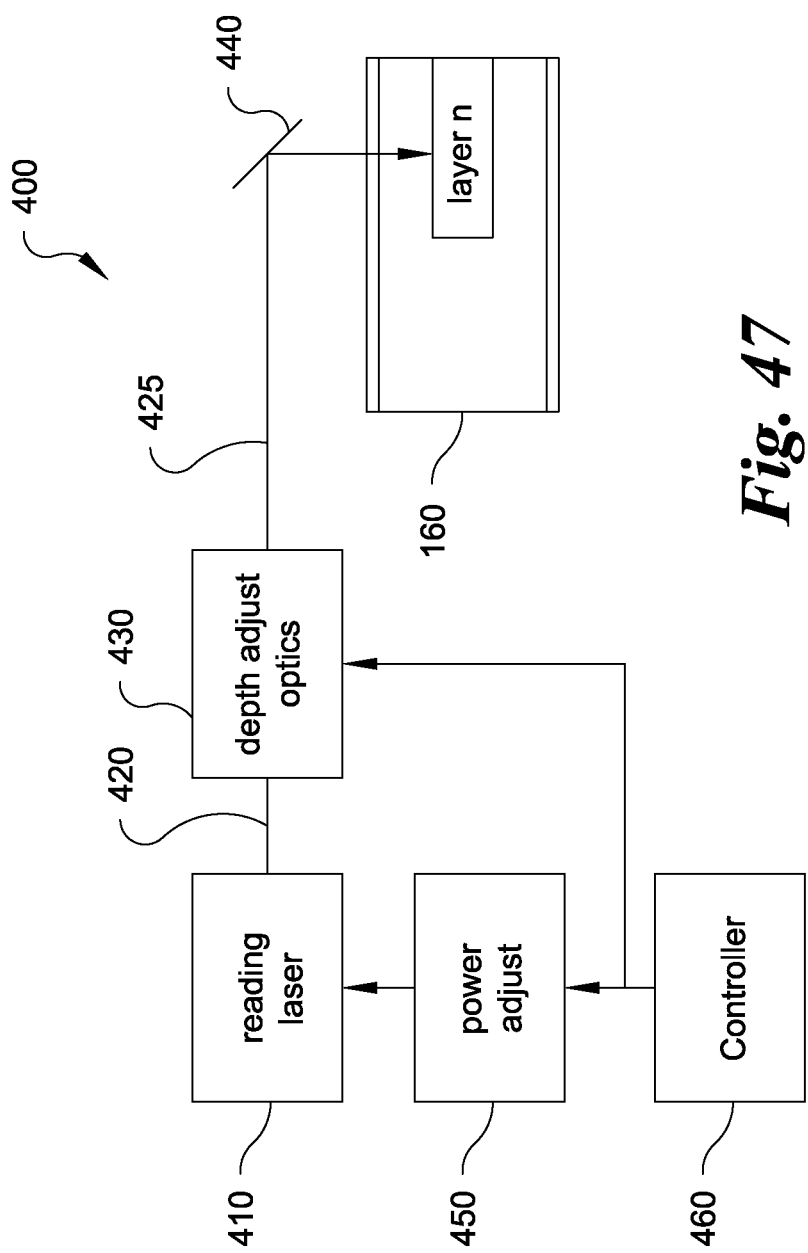
FIG. 47 illustrates a process flow for adjusting power for reading micro-holograms according to an embodiment of the present invention.

In another aspect, controlling the variation in return power when reading a microhologram may serve to reduce dynamic range of a detected microhologram and enable tighter thresholds on the declared detection of a microhologram. This may also improve the bit error rate of the holographic medium. With reference to the exemplary configuration as shown in FIG. 47, by adjusting the read power based upon the layer to be read, variation in returned power is reduced. In the exemplary embodiment, disk reading apparatus 400 receives a command to read layer n from the disk controller 460. This command results in two actions. First, the reading laser 410 power is adjusted by the power adjust module 450 so that the expected returned optical power from reading a hologram at the depth of layer n will be substantially the same as the expected returned optical power from reading a hologram at the depth of any other layer. Second, the depth adjust optics 430 are adjusted to focus the reading energy 420 provided by the reading laser 410 onto a hologram at layer n. The power adjusted and focused laser beam 425 is then guided by reflective optics 440 so that it falls upon the top surface of the disk 160. Thus, microholograms are read using an adjustable power laser where the power of the laser is adjusted according to the depth of the microhologram below the surface of the disk illuminated by the laser.

Thus, there is disclosed a method of focusing and tracking micro-holograms in a spatial storage medium. A master system timing reference is generated for a sampled tracking and focusing. Error signals are generated based on micro-holograms reflection asymmetry resulting from an off-track condition and/or expansion resulting from an out of focus condition. Kalman filters are used to estimate and correct for tracking path errors in a tracking control servo for micro-holograms. Kalman filters may are used to correct for focus path errors in a focus control servo for micro-holograms. The servo control can be used if the data are based on different layers or changes between layers.

It should be understood that the tracking and focusing systems and methods described herein are not limited to volumetric storage systems and methods using non-linear and/or threshold responsive materials, but instead have broad applicability to volumetric storage systems and methods in general, including those using linearly responsive materials, such as that described United States Patent Publication 20050136333, the entire disclosure of which is hereby incorporated by reference.

Figure 41:
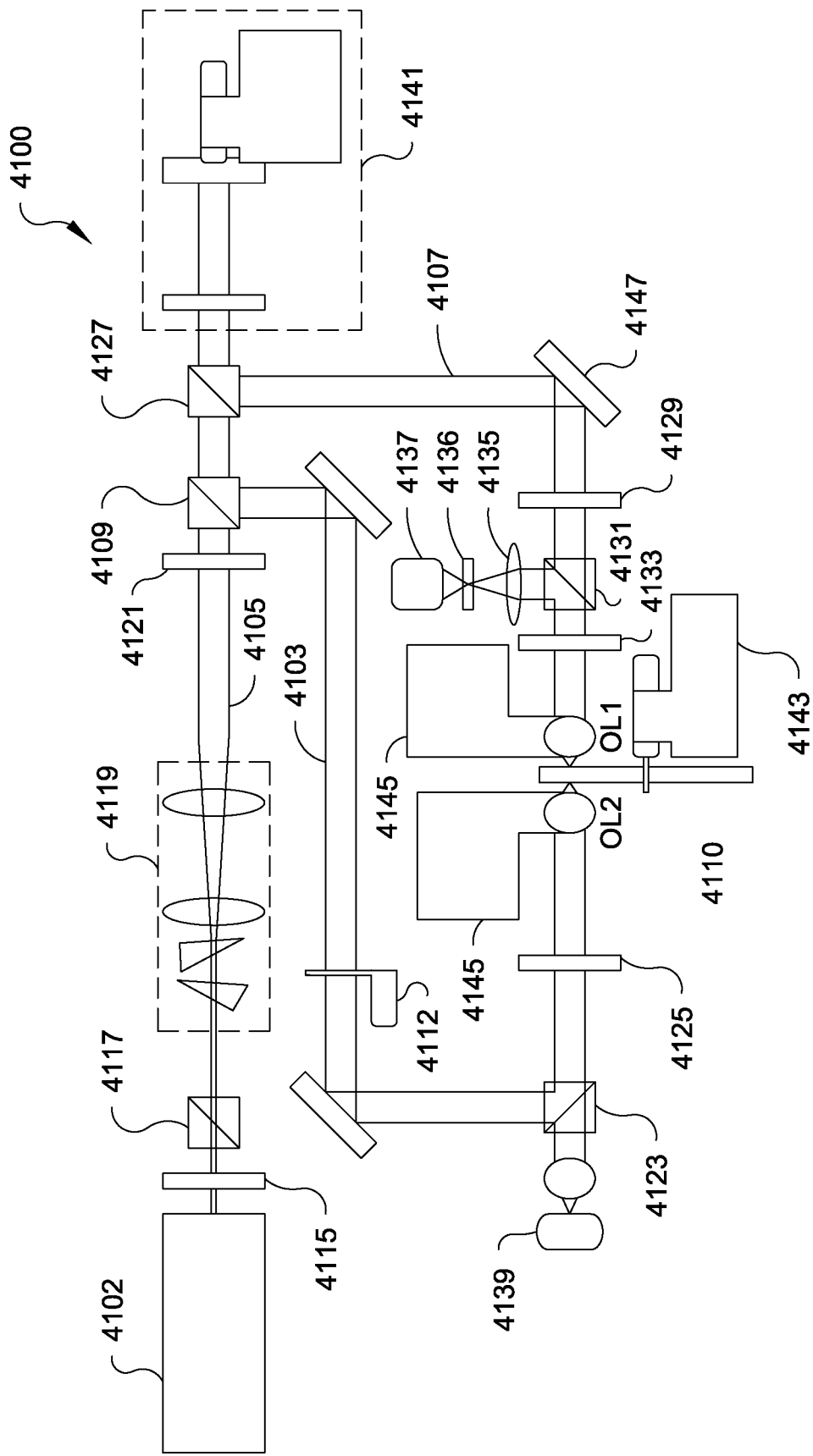
FIG. 41 illustrates a system according to an embodiment of the present invention.

Referring now to FIG. 41, there is shown a representation of a micro-hologram data storage media write/read system. System 4100 includes a beam source 4102, such as a pulsed diode laser, optically coupled through polarization controlling half (½) waveplate 4115, isolation beam splitter 4117 (which collectively provide for power control) and beam shaping optics 4119. Thereafter, source 4102 beam 4105 impinges beams splitter 4109 after traversing quarter (¼) waveplate 4121. Splitter 4109 provides two output beams—a write beam 4103 and read/reference beam 4107. Write beam 4103 is directed through a shutter 4112, beam splitter 4123, quarter waveplate 4125 and objective tensing (OL2) into a target volume of holographic media 4110. Read/reference beam 4107 is also focused into the target volume of media 4110—by beam splitter 4127, half waveplate 4129, beam splitter 4131, quarter waveplate 4133 and objective lensing (OL1). Read/reference beam 4107 media 4110 micro-hologram reflections are directed to a detector 4137 by beam splitter 4131, lensing 4135 and pinhole 4136. Read/reference beam 4107 transmissions through media 4110 are directed to a focusing sensor detector array 4139. Optical path length correction for read/reference beam 4107 (to match write beam 4103) is provided by microstage positioned reflector 4141. Spindle 4143 mechanically rotates media 4110 (which in the illustrated case takes the form of a rotatable disc), while 3-axis positioning stages 4145 position lensing OL1 and OL2 to focus beams 4103, 4107 into different target volumes of holographic media 4110.

In the writing process, beam 4105 is split by polarization beam splitter 4109 into write beam 4103 and reference beam 4107. After polarization adjustment, the two counter-propagating beams, focused by objective lensing OL1 and OL2, are overlapped in a same volume of media 4110. Localized interference fringes result and cause a micro-hologram to be created. In the reading process, the writing beam 4103 is blocked by shutter 4112. The read beam 4107 is focused to a target volume, and if there is a micro-hologram existing in that target volume, around 1% or less of the read beam 4107 is diffracted/reflected from the spot to detector 4137. A corresponding data state is determined based upon the detector 4137 detected presence or absence of a reflection. During writing and reading, a majority of the read/reference beam 4137 energy is transmitted through the medium and to detector array 4139. Likewise, during writing a majority of the write beam 4103 passes through media 4110. According to an embodiment of the present invention, in lieu or in addition to the approach to focal depth determination discussed hereinabove, a spiral grating or grooved track is stamped into, or otherwise formed on, a volumetric data storage medium surface. For example, one or more grooves may be stamped into the surface of volumetric data storage disc 4110. The groove(s) diffract the read/write beam(s) when they impinge the volumetric medium. The groove induced diffraction is dependent upon the distance between the focused spot and the groove surface. By detecting that portion of a read/reference and/or write beam that traverses through the volumetric medium, the depth of the focused target volume may be determined based upon the groove induced diffraction.

Figure 42:
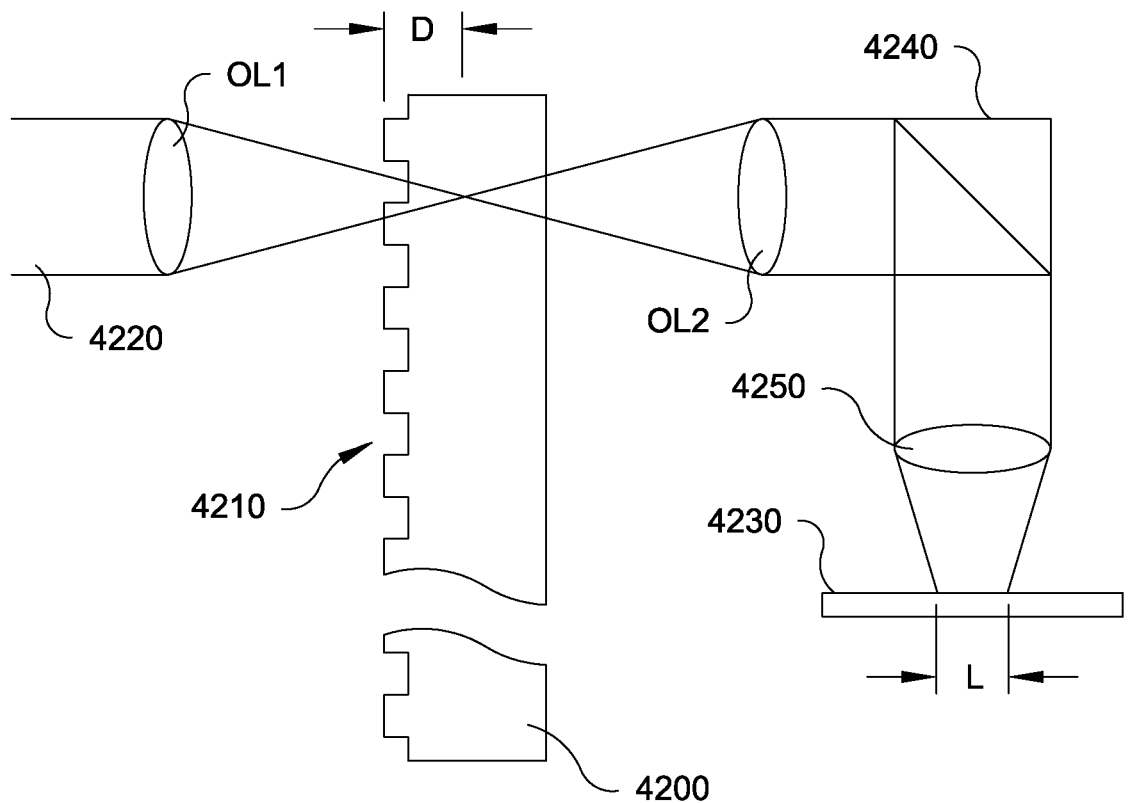
FIG. 42 illustrates a focal depth determination according to an embodiment of the present invention.
Figure 43:
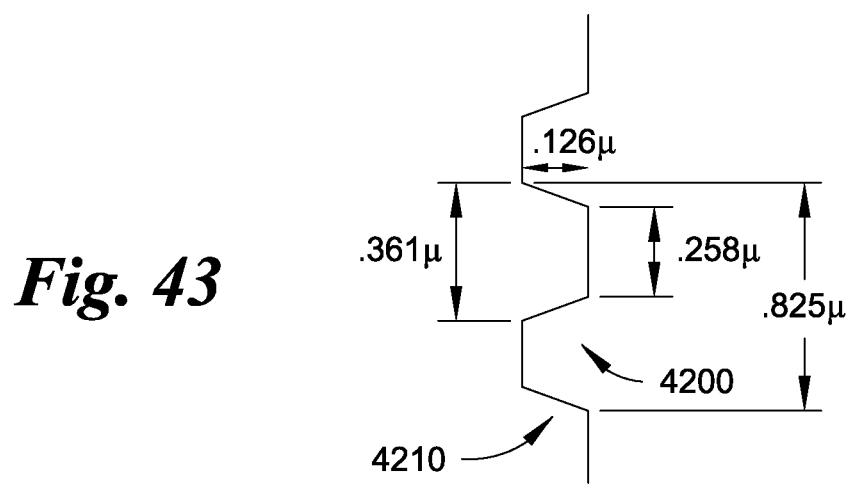
FIG. 43 illustrates an enlarged view of a portion of FIG. 42.
Figure 44C:
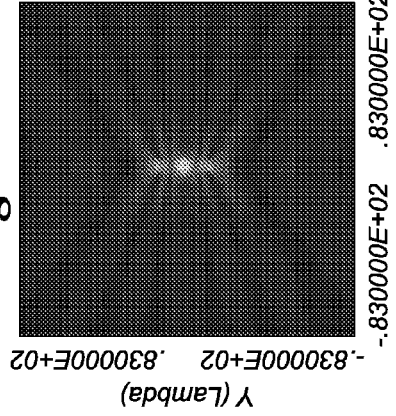
FIG. 44 illustrates various focal depth conditions being sensed according to an embodiment of the present invention.
Figure 44B:
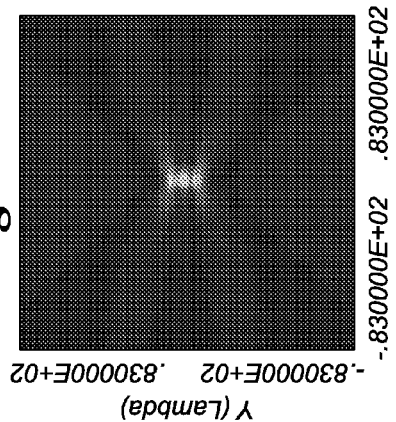
Figure 44A:
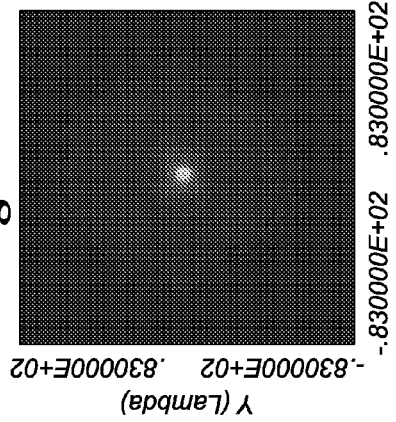
Figure 44F:
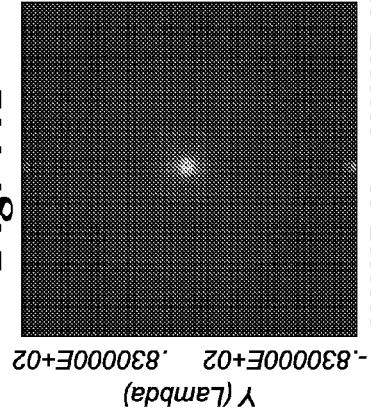
Figure 44E:
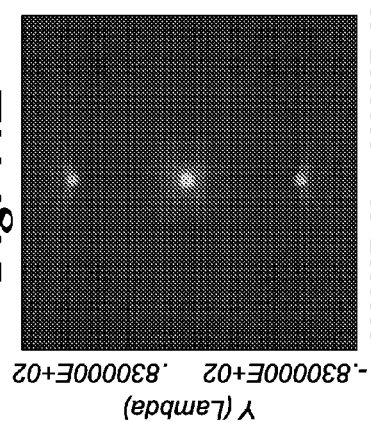
Figure 44D:
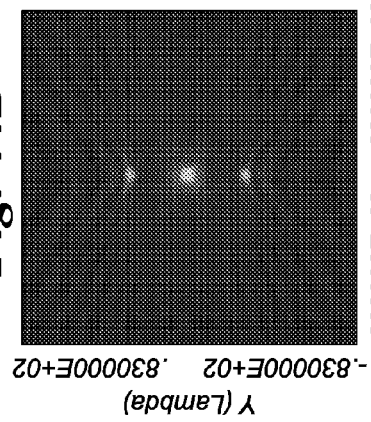

Referring now also to FIG. 42, there is shown a diagrammatic representation of such a configuration. As seen therein, medium 4200 includes groove(s) 4210 on a surface thereof. A beam 4220 is focused into a target volume of medium 4210 by objective lensing OL1. The portion of beam 4220 passing through medium 4210 is substantially re-collimated by objective lensing OL2. Beam 4220 diffraction resulting from grooves 4210 on the medium 4200 surface can be used to measure the depth of the focused reference spot under the grooved medium surface (D in FIG. 42). Referring now also to FIG. 43, there is shown an enlarged cross-section of a portion of medium 4200 and groove(s) 4210. The illustrated embodiment is suitable for use with a beam 4220 having a central wavelength of around 405 nm. In the illustrated case, the depth of each groove is around depth is around 0.136 μm, the width of each groove is around 0.258 μm and the grooves have a pitch or period of around 0.825 μm. In such a case, the depth of a groove 4210 pit (or recess) times the medium 4200 refraction index is a half wavelength of the beam 4220 central wavelength (as compared to a quarter wavelength in the CD/DVD applications).

Referring again to FIG. 42, the groove induced diffracted spots may be detected using a detector array 4230. The lateral distance (L) between a detected main spot and satellite diffracted spots is linearly related to the depth (D) of the focused spot under the medium surface.

Referring again to FIGS. 41 and 42, during reading, the portion of the read beam 4107 transmitted through medium 4110 may be detected by detector array 4139. During writing, by controlling the polarization state of the write and reference beams 4103, 4107, that portion of the reference beam 4107 transmitted through medium 4110 may be detected by detector array 4139 without interfering with the incoming writing beam 4103. Accordingly, such a configuration can be used in both writing and reading micro-holograms. Alternatively, or in addition thereto, the writing beam focus depth (D) may similarly be determined—such as by providing a beamsplitter and sensor analogous to beam splitter 4123 and detector 4139 in place of reflector 4147.

It should also be understood that the depth sensing sensitivity, the relation between L and D (FIG. 42), also depends on the pitch of the grooves 4210 (FIG. 42). As this parameter can be adjusted, the depth sensing sensitivity of the system may also be adjusted or tuned depending upon system design.

Referring still to FIG. 41 and FIG. 42, detectors 4139, 4230 may each take the form of a CCD or CMOS sensor array, analogous to those used in digital cameras. For example, the diagonal chip size of a Panasonic FX-9 camera sensor is 0.4 inches, and provides a resolution of 6 megapixels. Accordingly, a 7 mm length sensor provides for around 3000 pixels. Further, as a distance measurement along a single dimension (L) is of primary interest, the pixel count over the other dimension can be reduced to reduce detector cost.

Referring now also to FIG. 44, there are shown six exemplary spot conditions (designated conditions a-f) that may be sensed by sensor 4230 (4139 in FIG. 41). The spot conditions of FIG. 44 correspond to an impinging beam having a central wavelength of 405 nm, a volumetric media material having a refractive index n=1.6172, consistent with a polycarbonate material, for example, and objective lensing OL1, OL2 having a numerical aperture of 0.6 and an f-stop of 2.025 mm. Therein, the lateral positions of the diffracted spots (L in FIG. 42) indicate the depth of the focused reference beam spot (D in FIG. 42) inside the media. Condition (a) corresponds to a depth (D) of 0 μm. Condition (b) corresponds to a depth (D) of 4.05 μm. Condition (c) corresponds to a depth (D) of 8.1 μm. Condition (d) corresponds to a depth (D) of 20.25 μm. Condition (e) corresponds to a depth (D) of 40.5 μm. And, condition (f) corresponds to a depth (D) of 60.75 μm (where the satellite spots are outside of the sensor 4230 sensed area).

Figure 45:
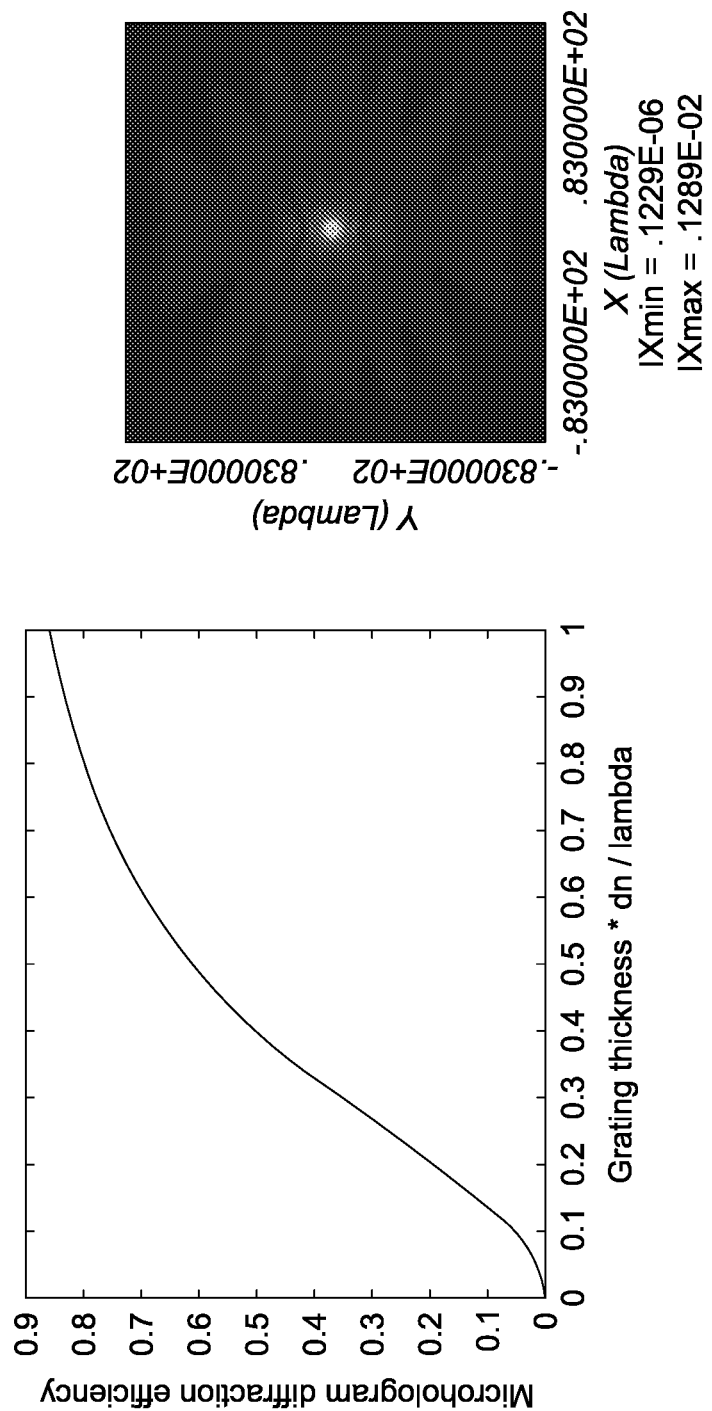
FIG. 45 illustrates the relationship between a micro-hologram diffraction efficiency and grating thickness, and a beam spot cross-section.

Referring again to FIG. 44 in conjunction with FIG. 45, the plots show the spacing of spots resulting from diffraction off of a surface grating when the focus is located at different depths. (a) is when the focus is on the groove, (b) is when the focus is 4.05 microns beyond the groove, (c) is 8.1 microns beyond the groove, (d) is 20.25 microns, (e) is 40.5 microns, and (f) is 60.75 microns. The varied spacing can be used as a control signal to servo the depth of the focus for reading different layers of microholograms. As shown in FIG. 45, the micro-hologram array itself also diffracts light. Where multiple data layers are used, such as 10 vertically stacked, radially extending layers of micro-holograms, the average refractive index variation times the total depth is 0.2 times the read/write wavelength. However, this diffraction is negligible, compared to the diffraction from the grooved medium surface. Accordingly, the groove diffraction of light passing through a holographic medium is the dominant diffraction and can be used for read/write beam depth sensing and/or control.

Figure 46A:
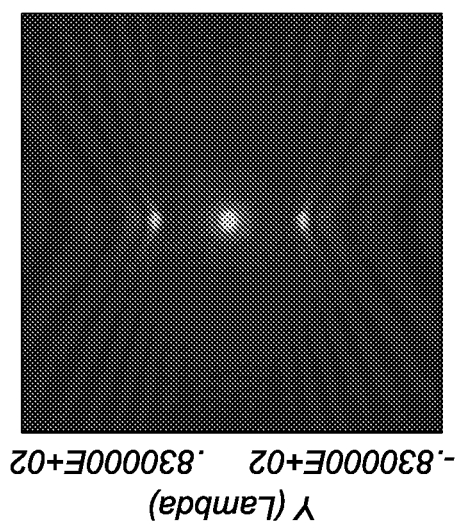
FIG. 46 illustrates focal depth signal profiles at different processing stages.
Figure 46B:
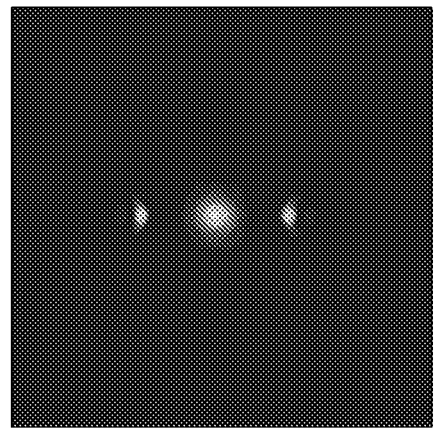
Figure 46C:
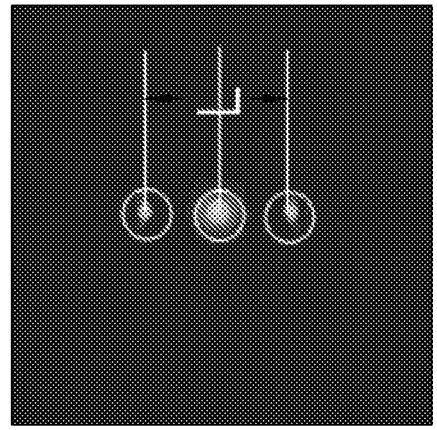

Referring now also to FIG. 46, exposure from the detector pixel array 4230 (FIG. 42) or 4139 (FIG. 41) (condition (a)) may be low-pass noise and sharpening filtered (condition (b)). The exposure may then scanned to obtain three spot areas (condition (c)). Coordinates falling within the three areas may be averaged to calculate center coordinates of each of the three spots. The distance (L) between a center spot and each satellite spot may then be calculated with the three center coordinates. The distance (D) may then be calculated from L based upon a modeled equation relating the two (such as by using data indicative of conditions (a)-(f) of FIG. 44), or a look-up of distance (D) may be conducted using the determined length (L).

Formatting for Rotatable Volumetric Storage Disc Using Data Indicative Micro-Holograms for Tracking As set forth herein, micro-holograms can be stored in a rotating disc using multiple vertical layers and along a spiral track on each layer. The format of the data storage media may have a significant large impact on system performance and cost. For example, the proximity of adjacent layers of micro-holograms in adjacent layers can result in cross talk between micro-holograms. This problem intensifies as the number of layers in the disc increases.

FIG. 28 shows a format 2800 to overcome data discontinuities between different layers by storing the data in spirals in both radial directions on a media, such as a rotatable disc. Micro-holograms are stored on one layer 2810 in a spiral that traverses inward, for example. At the end of this layer 2810, the data continues with minimal interruption by focusing onto another layer 2820 in the disc in a spiral that traverses in an opposite direction. Adjacent layers, e.g., 2830, may continue to alternate in starting position and direction. In this manner, the time it would otherwise take for the sensor head to go back to the location where the previous spiral 2810 started is eliminated. Of course, if it is desired to start at the same starting point as the previous spiral, data can be stored ahead of time and read out at the desired system rate while the detector moves back to starting point. Alternatively, different groups of layers may have one starting location, and/or progressing direction, while other groups of layers have another starting location and/or progressing direction. Reversing direction of the spiral in adjacent layers may also reduce the amount of crosstalk between layers by providing a separation between spirals that progress in a same direction.

Figure 29:
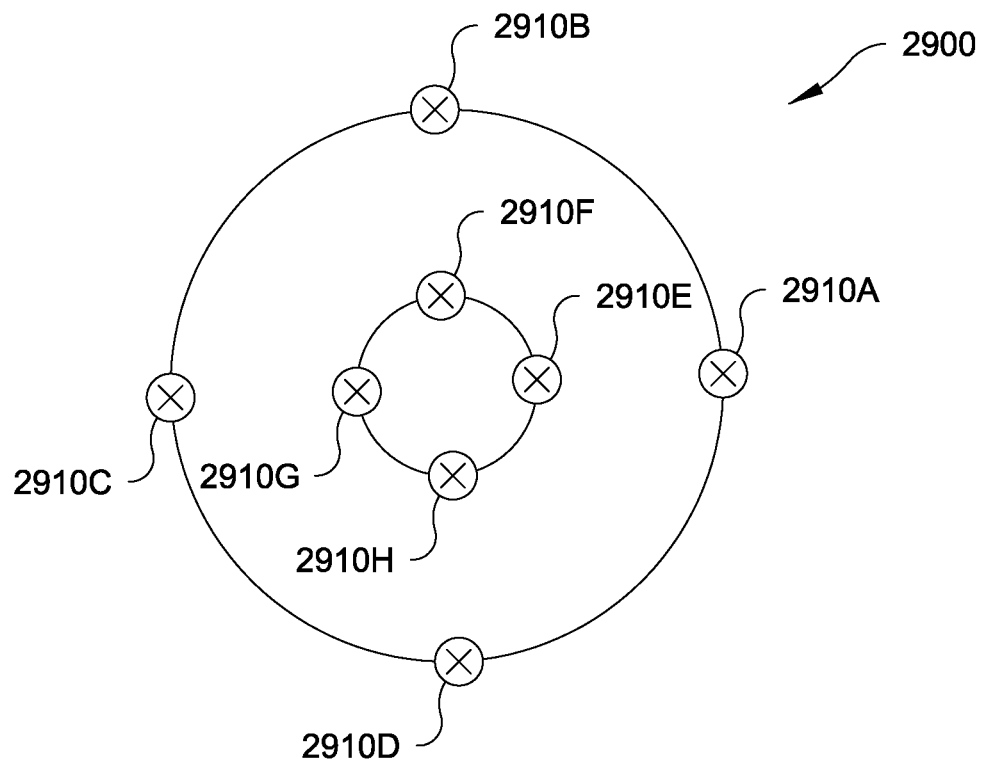
FIG. 29 illustrates various track starting an ending points.

Referring now also to FIG. 29, crosstalk may be further reduced by changing the phasing or starting point of each spiral. FIG. 29 shows a format 2900 that includes multiple potential micro-hologram track starting/ending points 2910A-2910G. It should be recognized that while eight (8) track starting/ending points are shown, any suitable number, greater or less, may be used. According to an aspect of the present invention the phase or starting/ending point of each layer may be alternated. Cross-talk between layers may be reduced by varying the ending points of data spirals on different layers. That is, where a first layer starts at point 2910A and spirals inward to point 2910H, a next layer may start at point 2910H and spiral outward to point 2910D, where the next layer that spirals inward then starts, for example. Of course, other particular groupings of starting/ending points may be used.

Thus, micro-holograms may be stored in layers in spiral tracks that spiral in different directions on different layers in order to reduce time needed for a read/write detector head to move to the next spiral, e.g., starting point for a next layer. During the interval when the detector head moves from one layer to another, one or more data memories may be used to maintain a consistent data stream to the user or system. Data stored in this memory from the previous data layer may be read out while the detector head moves to the next spiral layer. Cross-talk between layers may be reduced by reversing of spirals on adjacent or different layers. Cross-talk between layers may also be reduced by changing the phase or starting point of each layer and varying the ending points of data spirals on different layers. The starting and ending points on different layers to be read consecutively may be spaced so to avoid unnecessary or extended interruption of data during the time required to focus on the next consecutive layer of data.

In one embodiment, oblong shaped micro-holograms are used as the format for a volumetric data storage system. In other words, self tracking micro-holograms are provided. Advantageously, using oblong shaped micro-holograms may allow for micro-hologram size to be smaller than a recovery laser spot size in at least one lateral dimension. For tracking purposes, the oblong shaped micro-holograms are used to determine the track orientation by detecting the reflection shape. A differential signal based on the reflected light may be used to increase system robustness.

Referring now also to FIG. 30, in a single-bit holographic storage medium, format micro-holograms may be written by locally modulating the refractive index in a periodic structure the same way as data holograms. The micro-hologram generates a partial reflection of a reading laser beam. When there is no micro-hologram, the reading laser transmits through the local area. By detecting the reflected light, a driver generates a signal indicative of whether the content is a 1 or 0. In the illustrated case of FIG. 30, a bit is a substantially circular micro-hologram 3010, with a size determined by the writing laser spot size. Because the micro-hologram writing process follows the Gaussian spatial profile of the laser, the micro-holographic bit is also Gaussian in spatial profile. Gaussian profiles tend to have substantial energy outside the light beam waist (or spot diameter). In order to decrease the interference from the neighboring bits (micro-holograms 1, 2, 3, 4 and 5), the bit separation (the distance between two bits dt) may need to be as large as three times the laser spot size. As a result, the content density on a layer may actually be much less than the content density on CD or DVD layer. Another possible drawback associated with a circular format is associated with tracking, where a media disc is spinning in direction 3020. Referring still to FIG. 30, it is desirable that the laser spot move to bit 2 after reading bit 1. However, since micro-hologram bit 1 is symmetric, the drive does not have additional information to indicate the direction of the track 3030 including bits 1 and 2. Accordingly, the drive may cause the laser to wander to another track 3040, 3050, e.g., bit 4 or 5 unintentionally.

Figure 31:
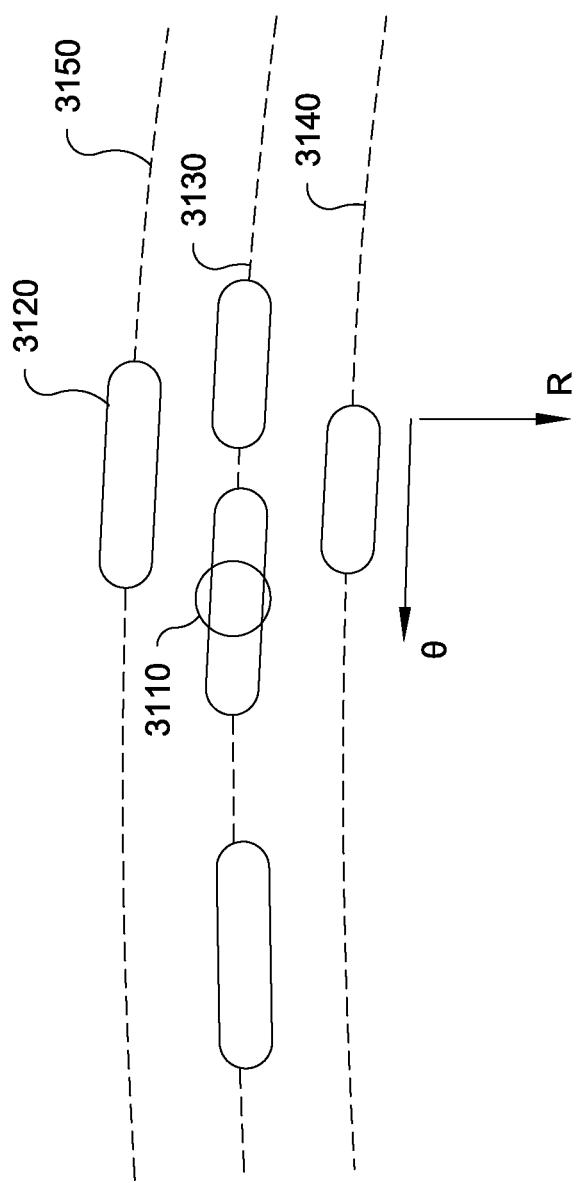
FIG. 31 illustrates a formatting including elongated micro-holograms.

Referring now also to FIG. 31, to assist in correcting for potential track misalignment, the micro-hologram spot shape can be made non-circular, or non-symmetric, so that the laser head can determine the track orientation. In order to have a bit separation smaller than the read laser spot size 3110 in at least one lateral dimension, oblong-shaped micro-holograms 3120 having a high reflectivity are formed along the tracks 3130, 3140, 3150. It is worth noting that in contrast, single layer formats, such as CD and DVD, use oblong shaped pits that generate interference resulting in areas of relatively low reflectivity. In order to write a format as shown in FIG. 31, a media disc is spun along the track (e.g., 3130) and a writing laser is turned on and off, depending upon whether a reflection is or is not desired in a local volume. In other words, the media is advanced relative to the laser spot during exposure thereby exposing an elongated portion of the media. Oblong shaped micro-holograms are written with controlled length via the length of time the writing laser is turned on and advancement or rotation speed. This advantageously serves to eliminate the need to rapidly pulse the writing laser when writing spot-by-spot. When the reading laser is focused on an oblong shaped micro-hologram, the circular shaped Gaussian laser spot has more strength of reflection along the track orientation than normal to the track orientation. The signal reflected by the micro-hologram is no longer perfectly circular (see, e.g., FIGS. 25A-25C), and a detector, such as a quadrant detector, may be used to determine the reflected light beam shape and hence track direction—which is then used as a feedback to help keep the laser head on track. To increase the system sensitivity, conventional CD/DVD format methodologies, such as by using differential signals based on reflection, may also be incorporated.

Thus, in one embodiment oblong shaped micro-holograms are provided along the track inside the medium for the volumetric data storage physical format. The format micro-holograms may encode data themselves, or additional data optionally recorded at different locations, or co-located yet recorded at a different angle, and/or at a different wavelength than primary data-indicative micro-holograms. Where the recording media provides a non-linear optical response (i.e., a threshold response), the width (short dimension) of the oblong marks may further be decreased thereby further increasing layer capacity.

It should be understood that the formatting systems and methods described herein are not limited to volumetric storage systems and methods using non-linear and/or threshold responsive materials, but instead have broad applicability to volumetric storage systems and methods in general, including those using linearly responsive materials, such as that described United States Patent Publication 20050136333, the entire disclosure of which is hereby incorporated by reference.

Formatting for Rotatable Volumetric Disc Using Separate Holographic Components

Alternatively, or in addition to self tracking data-indicative micro-holograms, separate tracking elements may be incorporated into the media. Without active focusing to maintain the laser spot focused to the correct layer and to keep the laser head on the right track, it may prove commercially impractical to store micron or sub-micron size features inside a media disc, due at least in part to physical limitations including, but not limited to, surface roughness and scratches.

Single layer storage formats (e.g. CD, DVD) use a reflective asymmetric light beam for focusing, and a three-light beam mechanism for tracking. However, volumetric storage media don't include a highly reflective layer at the data recording levels in the medium. In recordable or re-writable versions of CD and DVD formats, tracks or grooves are pre-formed, so that the laser head follows the track when writing the digital content. United States Published Patent applications 2001/0030934 and 200410009406, and U.S. Pat. No. 6,512,606, the entire disclosures of each of which are hereby incorporated by reference as if being set forth in their entirety herein, propose to pre-form tracks inside a single bit holographic medium, so that a laser head can follow it in the content writing process. This track is also followed by the laser head during the reading process.

In one embodiment, track pre-formatting and/or off-axis micro-holograms are used to encode tracking data (e.g., depth and radius position information). More particularly, prior to storing micro-holographic bits inside a volumetric storage media, tracks encoded with off-axis micro-holographic gratings are pre-recorded at various depths and positions in the media. Such tracking micro-holograms may be oriented so as to generate a reflection off of the normal of an impinging laser beam. The orientation angle may correlate to the tracking micro-hologram depth and radius, such that the tracking micro-holograms serve as check points. In a reading or writing process, the tracking micro-holograms reflect incident light away from the optical normal axis, which can be detected using a separate detector, for example. The focusing depth and radius of the current location in the disc is determined based on detection of the angled, off-axis reflections. Pre-formed micro-holograms may thus be used to provide a feedback signal to the drive about the optical head position.

Precise positioning stages and a writing laser are suitable for writing tracks inside the holographic media. Each track may spiral through various radii and/or depths inside the media. Of course, other configurations, including circular or substantially concentric tracks, may be used though. Digital bits are written by forming micro-holograms along each track. A track may be formed, for example, by focusing a high power laser to locally alternate the refractive index of the medium. The locally refracted index modulation generates a partial reflection from incident focused light to a tracking detector and provides information about the track. Conversely, the tracks may be written into a holographic master and optically replicated into the media devices (e.g. discs), as discussed herein.

Figure 32:
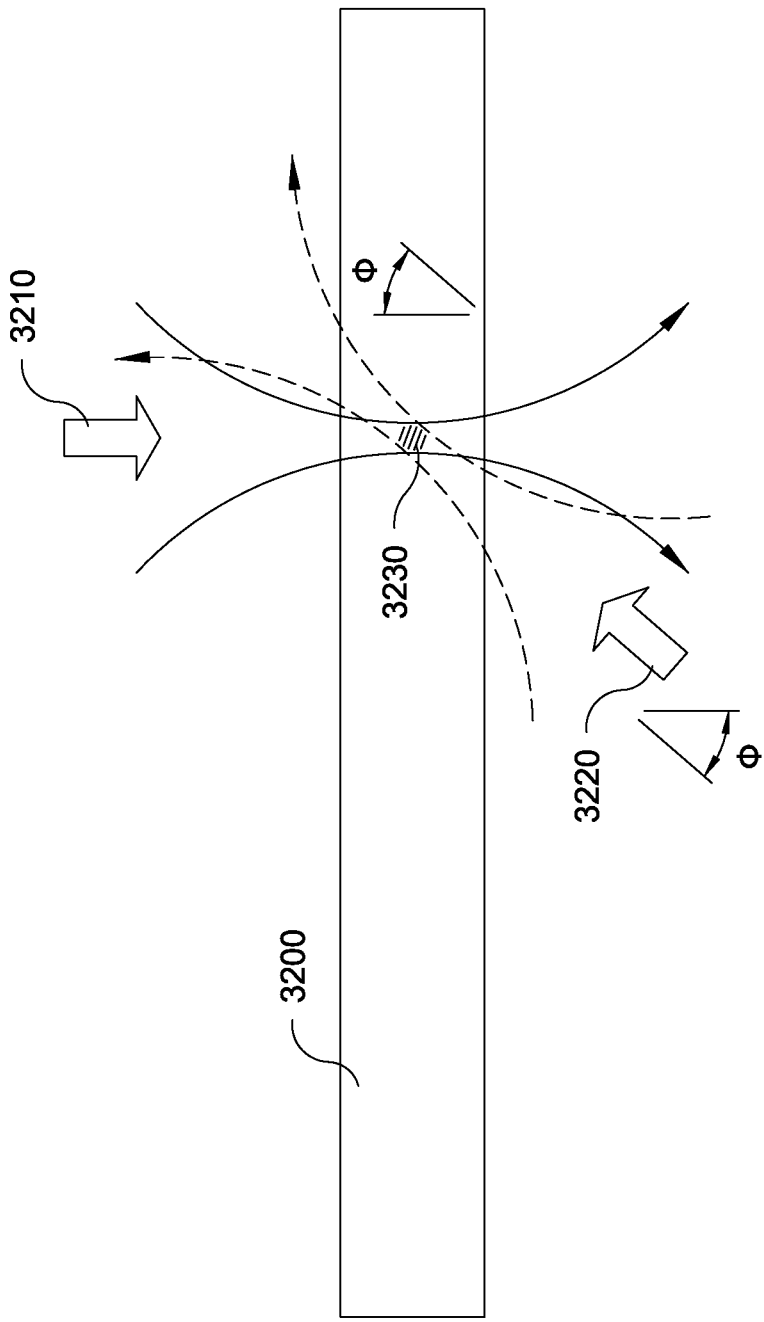
FIG. 32 illustrates an off-axis micro-hologram recording.

FIG. 32 shows a medium 3200 in the form of a disc may be spun to cause a writing or reading head to follow a pre-programmed track. A laser head substantially adjacent to the medium focuses a light beam 3210 to a local area to facilitate writing of the track in the medium. Light beam 3210 is normal to medium. Formed micro-holograms are used to encode track positions as off-axis angles. A second laser beam 3220 impinging from another side of the medium illuminates the same volume as laser beam 3210. Light beam 3220 is off-axis from the disc normal axis. The two light beams 3210, 3220 interfere and form a micro-hologram 3230 off-axis from the medium normal. This off-axis angle may be used to encode the physical or logical position of the track, i.e., depth or radius. As will be understood by those possessing an ordinary skill in the pertinent arts, the off-axis angle $\phi$ of micro-hologram 3230 is dependent upon the off axis angle $\phi$ of light beam 3220, where light beam 3210 is normal to the medium 3200. Thus, by altering the angle of impinging light beam 3220, the location of the formed hologram may be encoded.

Light beam 3210 may take the form of a continuous wave to write a continuous track, or be pulsed. Where pulsed, the pulse repetition rate determines how frequently track position can be checked during content writing and/or reading. Alternatively, or in addition thereto, micro-hologram bursts with varied repetition rates or numbers of pulses may be used in addition or in lieu of angle dependence, to encode track position information. However, where pulsing of the micro-hologram writing light beam is used, such that the pulse repetition rate or number of pulses indicates the track position, more than one tracking micro-hologram may need to be read to determine useful positioning information.

Figure 33:
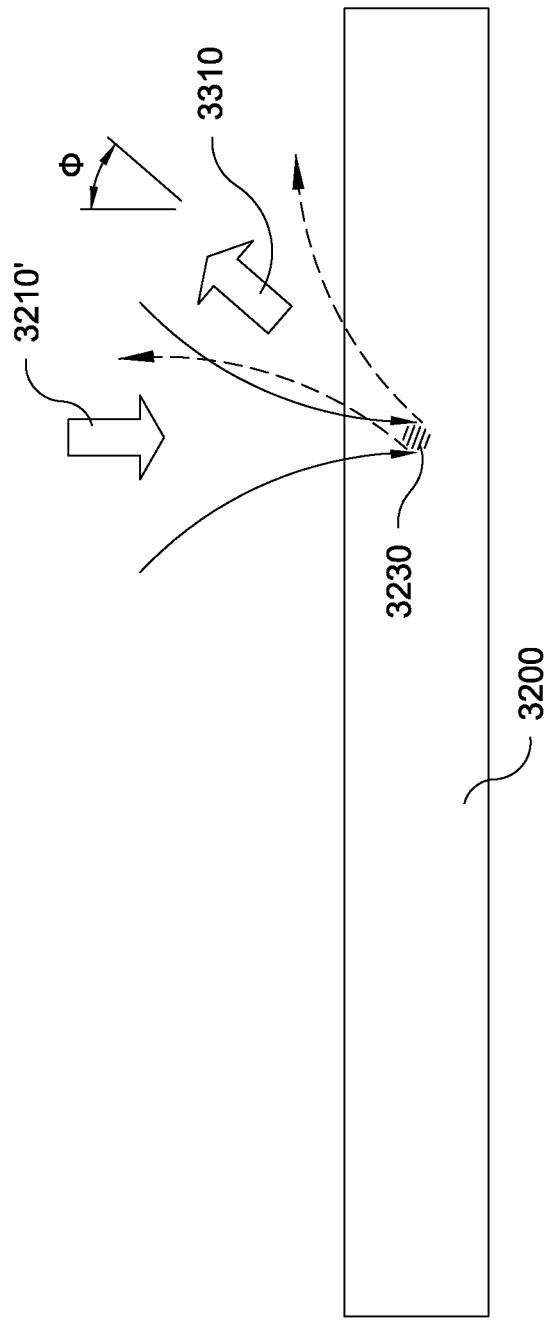
FIG. 33 illustrates an off-axis micro-hologram reflection.

Returning again to using angular dependence, during the content writing and reading process, pre-formed off-axis micro-holograms 3230 reflect an incident laser beam 3210' normal to the media off-axis, to provide information about the track. Other information, such as copyright information, may optionally be encoded. In such a case, the off-axis light beam may be modulated to encode such other data, and at an angle indicative of the position within the media. Referring now also to FIG. 33, when an incident light beam 3210' normal to the media axis is focused to a locally pre-written tracking micro-hologram 3230, the tracking micro-hologram 3230 partially reflects the light as a light beam 3310 having an analogous direction and spatial profile as the second laser beam used in the micro-hologram recording process (e.g., light beam 3220, FIG. 32). An off-axis sensor, or array of sensors, may be used to detect the reflected angular light beam 3310 and determines the position of the focused spot of the incident light beam 3210'.

Thus, track and/or other information may be encoded in pre-formed, off-axis micro-holograms. Where the off-axis angle light beam is used as an encoder, an optical drive can determine the position of the focused incident light beam by reading a single tracking micro-hologram. The information gathered may be used for focusing and tracking, e.g., provided to a focus/tracking system akin to that shown in FIG. 27. For example, the off-axis signal may be used to determine whether the incident light is at the appropriate depth and whether the appropriate lens is being used to correct the spherical aberration associated with the depth.

Figure 34A:
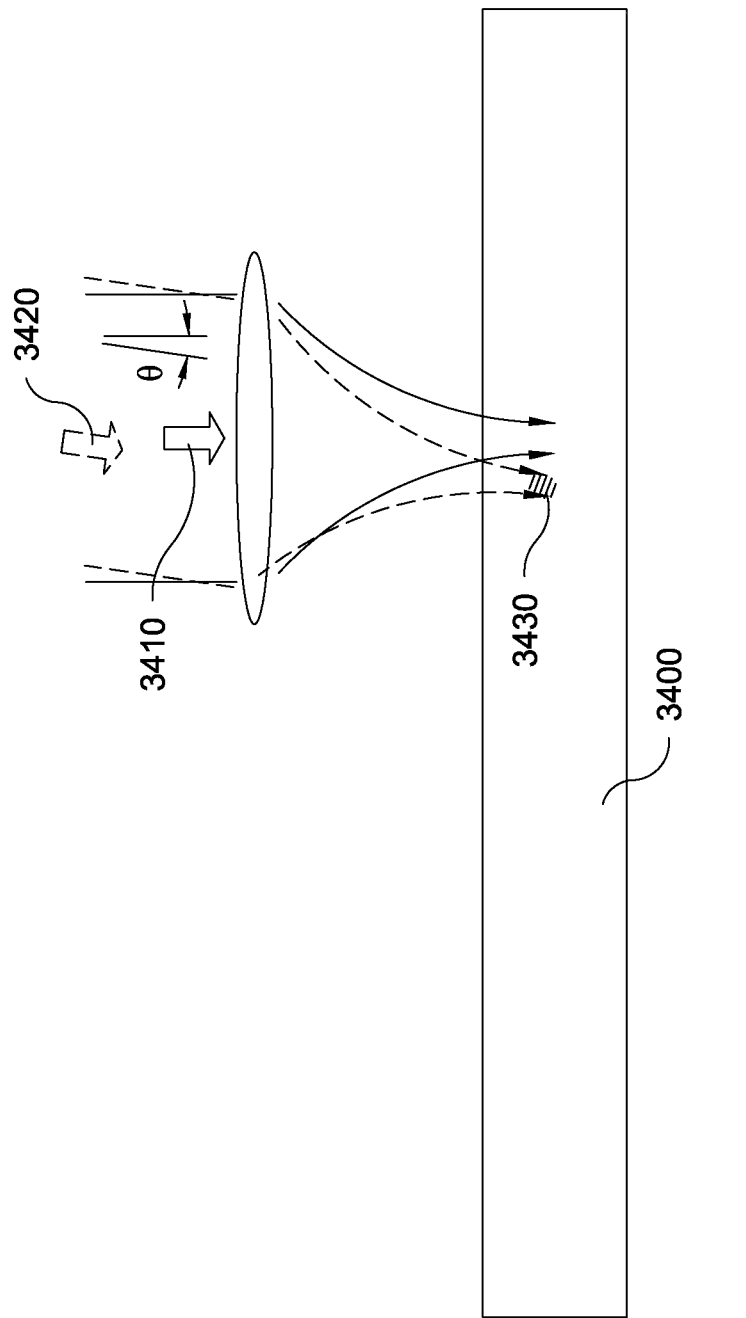
FIGS. 34A-34C illustrate off-axis micro-hologram recording and reading.
Figure 34B:
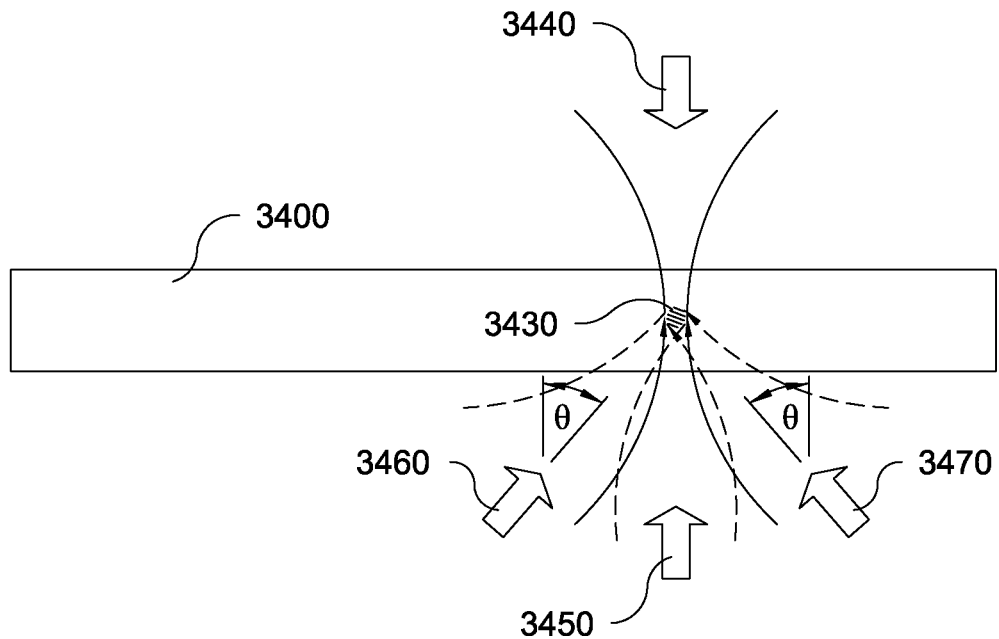
Figure 34C:
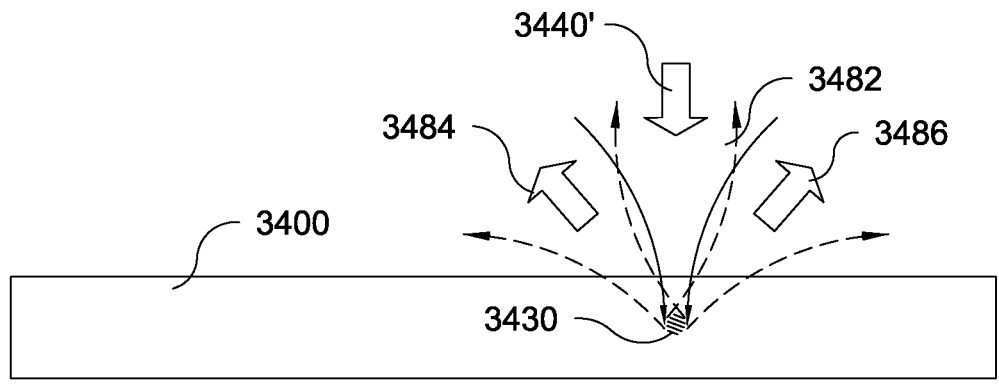

In one embodiment, one or more micro-holograms may include off-axis and/or off-center components. Referring now also to FIG. 34A, a holographic diffraction unit, such as a phase mask or grating, splits an incident light beam into a main light beam 3410 for writing/reading and at least one off-axis light beam for tracking 3420. The off-axis light beam's 3420 propagation angle θ is in-line with an off-axis, off-center tracking micro-hologram 3430 in a media 3400, such that the reflected light beam propagates back along the direction of the incident off-axis light beam 3420. In this scenario, additional collecting optics other than the objective lens may not be needed. However, the off-axis angle θ of the micro-hologram 3430 is fixed and use of the micro-hologram pulse repetition rate or pulse number modulation may be necessary to index the track position.

FIGS. 32-34A illustrate one off-axis micro-hologram. Alternatively, the data micro-hologram may be formatted with two off-axis micro-holograms, one on each side. The writing of the 3 overlapping micro-holograms are shown in FIG. 34B. The micro-hologram data is written by the reference beam 3440 and the data beam 3450, which is counter-propagating along the same axis as the reference beam. Two off-axis micro-holograms may be written by the interference between the same reference beam 3440 and the off-axis writing beams 3460, 3470.

In the read process (FIG. 34C), the reference beam 3440' serves as the read beam. The three micro-holograms have already been stored in one location. The reference beam 3440' will thus be diffracted in three directions: the back reflection 3482 from the data micro-hologram, and the side reflections 3484, 3486 from the two off-axis micro-holograms. When the plane formed by the two side reflections is perpendicular to the micro-hologram data track direction, the two side reflection as an indicator for tracking.

It should be understood that the tracking and focusing systems and methods described herein are not limited to volumetric storage systems and methods using non-linear and/or threshold responsive materials, but instead have broad applicability to volumetric storage systems and methods in general, including those using linearly responsive materials, such as that described United States Patent Publication 20050136333, the entire disclosure of which is hereby incorporated by reference.

Pre-Recorded Media Batch Replication

Optical replication is well suited for distributing large volumes of digital information recorded as micro-holograms in a supporting media. Industrial processes for optical replication using micro holographic, as opposed to page-based holographic, approaches appear desirable. One problem with optical replication using linear materials is that any undesired reflection in the optical replication system will produce an undesired hologram. Because high power lasers are typically involved in optical replication, those undesired holograms may significantly disturb the data indicative and/or formatting holograms. Also, the strength of the holograms recorded in linear materials will be directly proportional to the ratio of the power densities of the recording laser beams. For ratios very different from 1, holograms will be weak and a large quantity of dynamic range (recording capability of the material) will be undesirably consumed. Again, this can be addressed through the use of a non-linear optically responsive media.

Figure 35:
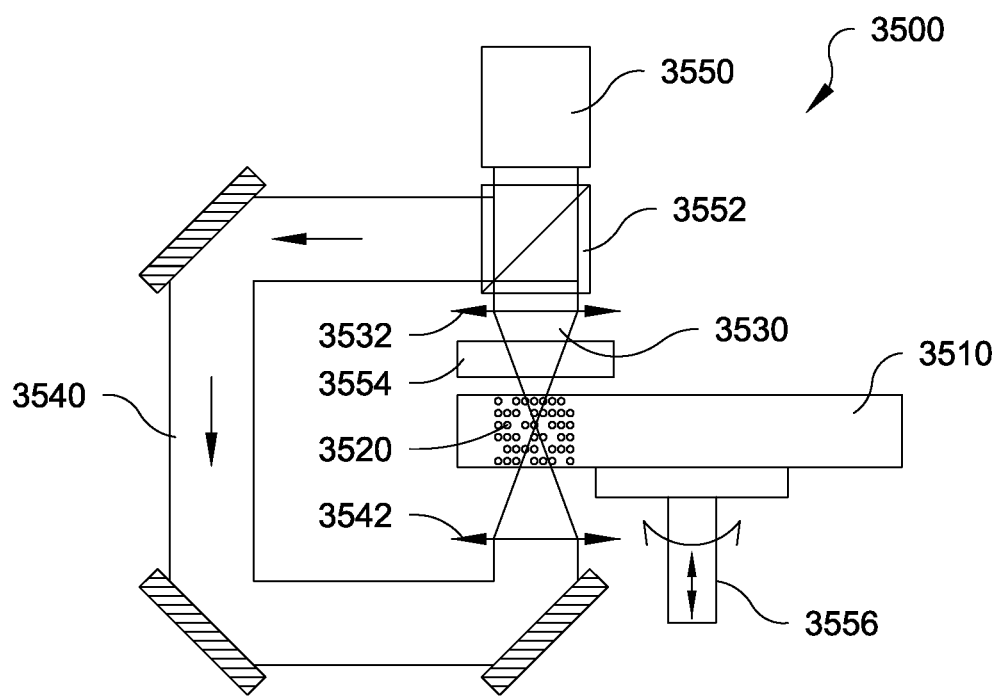
FIG. 35 illustrates a configuration for preparing a master micro-holographic media.
Figure 36:
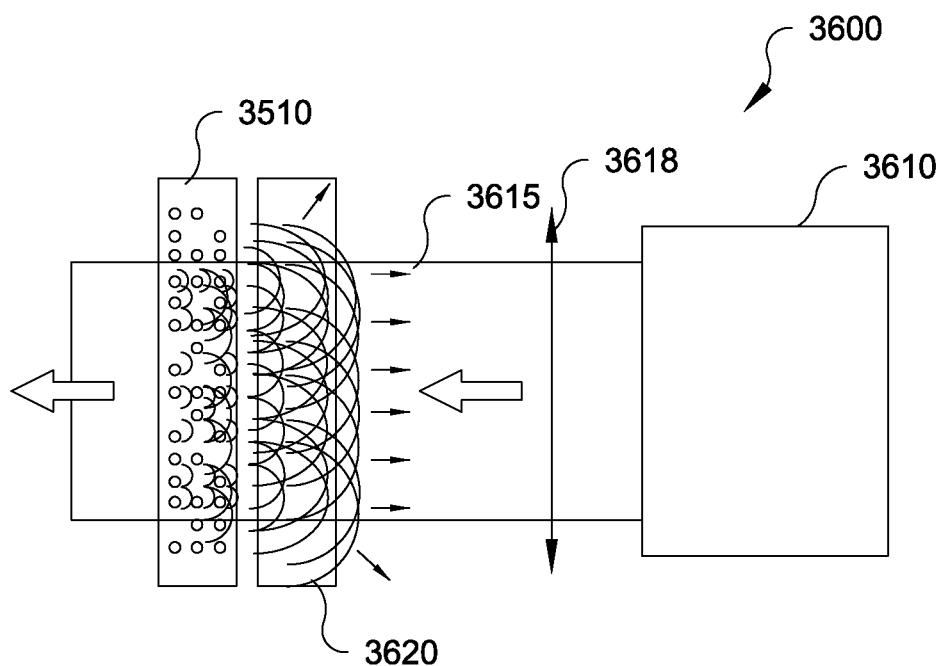
FIG. 36 illustrates a configuration for preparing a conjugate-master micro-holographic media from a master micro-holographic media.
Figure 37:
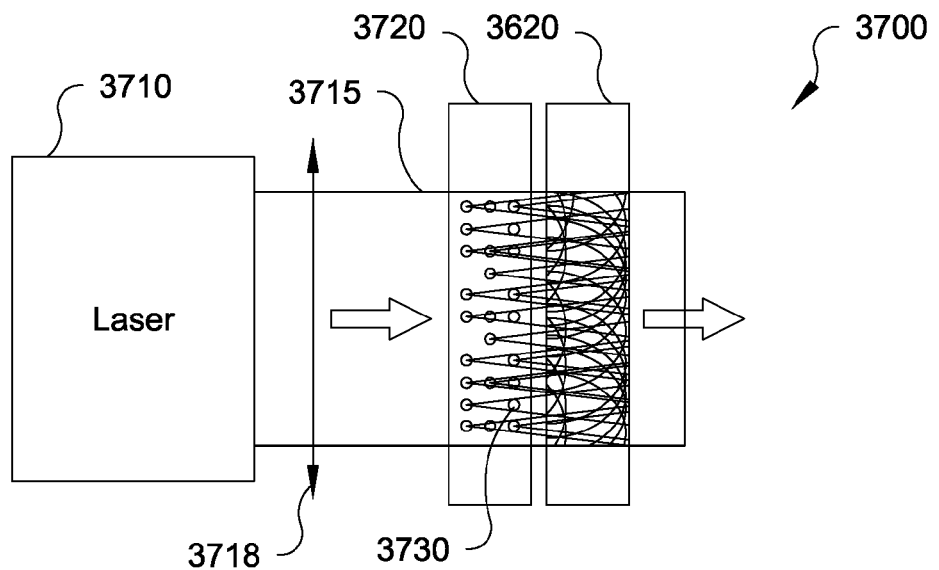
FIG. 37 illustrates a configuration for preparing a distribution micro-holographic media from a conjugate master micro-holographic media.

Referring now to FIGS. 35, 36 and 37, there are shown implementations of optical replication techniques suitable for use with a non-linear optically responsive media. FIG. 35 illustrates a system for preparing a master media, FIG. 36 illustrates a system for preparing a conjugate master media and FIG. 37 illustrates a system for preparing a copy media, e.g., for distribution. Referring first to FIG. 35, there is shown a system 3500 for recording a master media 3510. In the illustrated embodiment, master media 3510 takes the form of an optically non-linear responsive material molded disc, such as those described herein. Master holographic media 3510 is recorded by forming an array of micro-holograms 3520, one-by-one. System 3500 includes a laser 3550 optically coupled to beam-splitter 3552. Laser 3550 may take the form of a 532 nm, 100 mW CW, single-longitudinal-mode, intra-cavity doubling, diode pumped solid state Nd:YAG laser, where beam-splitter 3552 takes the form of a polarizing cube beam splitter, for example. Focusing optics 3532, 3542 are used to focus the split light beams 3530, 3540 to common volumes within media 3510, where they counter-propagate, interfere and form fringe patterns, inducing micro-hologram formation, as discussed hereinabove. Focusing optics 3532, 3542 may take the form of high numerical aperture aspheric lenses, for example. A shutter 3554 is used to selectively pass light beam 3530 to media 3510, to encode data and/or facilitate the orderly formation of micro-holograms 3520. Shutter 3554 may take the form of a mechanical, electro-optical or acousto-optical shutter having an around 2.5 ms window time, for example.

To enable micro-holograms to be formed in particular target volumes, focusing optics 3532, 3542 are actuated to selectively focus to different radii from a center of spinning media, e.g., disc, 3510. That is, they laterally translate the focus region at different radii from a center of spinning media, e.g., disc, 3510. The media 3510 is supported by a precision positioning stage 3556 that spins the media, and allows for vertical alignment of the focused light beams 3530, 3540 at different vertical layers in the media 3520. Angular positioning is controlled by selectively opening shutter 3554 at appropriate times. For example, a stepper motor or air bearing spindle may be used to rotate media 3510, such that the shutter may be selectively opened and shut at various times corresponding to different angular positions of rotating media 3510.

Referring now to FIG. 36, there is shown a block diagram of a system 3600. System 3600 includes a light source 3610. Light source 3610 may take the form of a 532 nm, 90 W, 1 kHz repetition rate pulsed Nd:YAG laser, such as the commercially available Coherent Evolution model 90, for example. Source 3610 illuminates master media 3510 through conjugate master media 3620. In the illustrated embodiment, conjugate master media 3620 takes the form of an optically linear responsive material molded disc, such as that described in United States Patent Publication 20050136333, the entire disclosure of which is hereby incorporated by reference herein. By rapidly exposing master 3510 to source 3610 emissions 3615 through conjugate master 3620, reflections from master 3510 interfere with emissions directly from source 3510 to form fringe patterns in conjugate master 3620. The holographic patterns formed in conjugate master 3620 are not identical to that of master 3510, but are instead indicative of reflections there from. According to an aspect of the present invention entire master and conjugate master 3510, 3620 pairs may be flash, or batch, exposed at once. Alternatively, emission 3615 may mechanically scan the master/conjugate master pair, as indicated by transverse arrow 3618.

FIG. 37 shows a system 3700. Like system 3600, system 3700 includes a light source 3710. Source 3710 may take the form of a 532 nm, 90 W, 1 kHz repetition rate pulsed Nd:YAG laser, such as the commercially available Coherent Evolution model 90, for example. Source 3710 illuminates conjugate master 3620 through distribution media 3720. In the illustrated embodiment, media 3720, like master media 3510 and conjugate master media 3620, takes the form of an optically non-linear responsive material molded disc, such as those described herein. More particularly, source 3710 emits emissions 3715 through distribution media 3720 and into conjugate master media 3620. The refractive index changes therein, which correspond to reflections from micro-hologram array 3520 (FIGS. 35, 36), generate reflections. These reflections again traverse distribution media 3720, where they interfere with the counter-propagating emissions 3715 to form interference fringe patterns indicative of a micro-hologram array 3730. Where light emissions 3715 and emissions 3615 are substantially identical in direction and wavelength, array 3730 corresponds to array 3520 (FIGS. 35, 36)—thereby duplicating master 3510 as distribution media 3720. The entire conjugate master and distribution media 3620, 3720 pairs may be flash, or batch, exposed at once. Alternatively, emissions 3715 may scan the conjugate master/distribution media pair, as indicated by transverse arrow 3718.

It should be understood that systems 3500, 3600, and 3700 are only examples, and several variations in setup would lead to similar results. Further, the master, conjugate master, and the distribution medium do not need to be made of the same material and can be made of a combination of linear and non-linear materials. Alternatively, they may all be formed of a threshold responsive material, for example.

Figure 38:
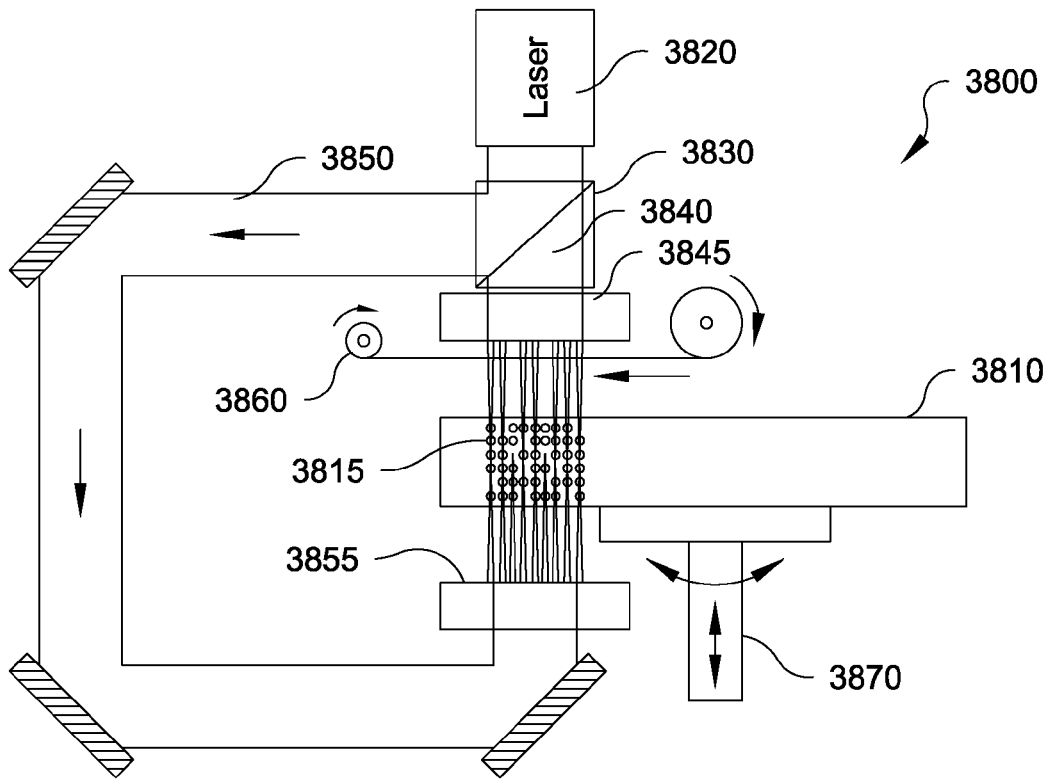
FIG. 38 illustrates a configuration for preparing a distribution micro-holographic media from a master micro-holographic media.

Referring now also to FIG. 38, in a different implementation 3800, the master from which distribution media 3810 ultimately are created may take the form of a tape, having apertures, or holes, or at least substantially transparent regions. Alternatively, the master from which distribution media 3810 ultimately are created may take the form of a spatial light modulator, having a two-dimensional array of pixels or apertures. Either way, system 3800 includes a laser 3820, that may take the form of a 532 nm, Q-switched, high power (e.g., 90 W, 1 kHz repetition rate pulsed) Nd:YAG laser, such as the commercially available Coherent Evolution model 90, for example. Laser 3820 is optically coupled to a beam-splitter 3830, which may take the form of a polarizing cube beam splitter, for example. Beam-splitter 3830 thus produces first and second light beams 3830, 3840, that counter-propagate within particular volumes of media 3810 in a manner suitable for forming an array of micro-holograms 3815 indicative of stored data as discussed herein. More particularly, light beam 3840 is communicated through conditioning optics 3845 into media 3810. Light beam 3850 is communicated through conditioning optics 3855 into media 3810.

Conditioning optics 3845, 3855 may take the form of micro-lens array(s) suitable for transforming the laser beam into a series, or two-dimensional array, of focused spots. Where the lenses have a high numerical aperture, dense packing may be realized by moving the media in small enough increments that the exposures generate an interlaced array. Conditioning optics 3845, 3855 thus focus counter-propagating light beams 3840, 3850 into a two-dimensional array of focused points within a single layer of media 3810. According to an aspect of the present invention, this array of points corresponds to an array of digital 0's or 1's being recorded throughout the entire layer. Thus, by activating laser 3850, a layer of all digital 0's or 1's may be recorded in a single layer of media 3810 by the interfering fringes of the spots forming an array of micro-holograms therein. This may be of particular use where the media takes the form of an optically non-linear responsive material disc, as has been described herein.

According to an aspect of the present invention, tape or spatial light modulator 3860 may be used to provide for different data being recorded in a single layer of media 3810. Tape or spatial light modulator 3860 may include a series or array of apertures, or holes. The presence or absence of an aperture may correspond to the digital state of corresponding digital data. That is, areas lacking apertures selectively block light beam 3840 depending upon whether a micro-hologram is to be recorded or not, depending upon a corresponding data state.

In either case, one layer of data is recorded at a time and only in one area of the recording medium. Medium 3810 may be advanced or rotated a few times to record a full layer, using a positioning stage 3870, for example. The medium may be moved up or down, to record other layers, using positing stage 3870 as well, for example.

Thus, flood illumination of a master medium to record an intermediate or conjugate master may be used. Flood illumination of a master or conjugate master to record data in a distribution media may also be used. A tape or spatial light modulator may be used as a master to record distribution media. And, diffraction efficiency (strength) of recorded holograms may be independent from the ratio of the recording laser beam power densities.

Pre-Formatted Media

As set forth, holographic media discs may be recorded with arrays of micro-holograms indicative of a data state. These arrays may be spread throughout substantially all of the volume of a medium made of an optically non-linear or threshold responsive recording material. In one embodiment, particular data (e.g., alternating states of data) are recorded in the pre-formatted media by erasing or not-erasing certain ones of the micro-holograms. Erasing may be effected by using a single light beam with enough focused energy to bring the volume of the micro-hologram above the threshold condition, e.g., heating to approach Tg of a constituent polymer matrix.

Figure 39:
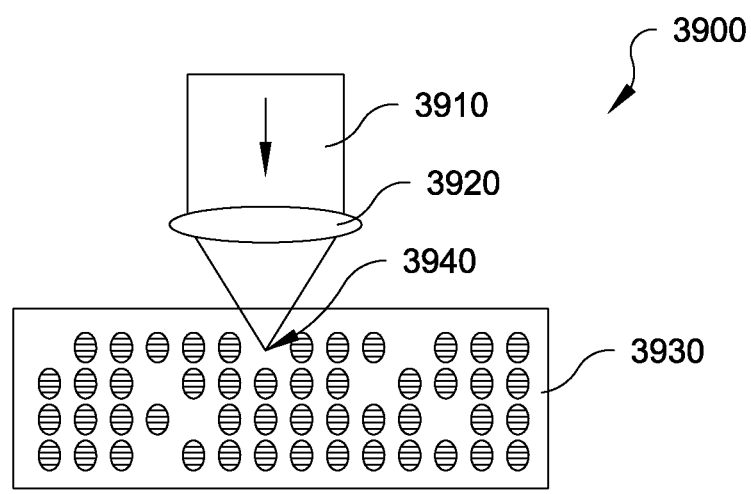
FIG. 39 illustrates the recording of data by altering a pre-formatted micro-hologram array.

More particularly, recording of data into a pre-formatted medium (e.g., an array of micro-holograms indicative of a single data state, e.g., all 0's or all 1's, within an optically non-linear responsive material), may be accomplished by either erasing or not erasing select ones of the pre-recorded, or pre-formatted, micro-holograms. A micro-hologram may be effectively erased by focusing one or more laser beams there-upon. Where the light beam delivered energy exceeds the writing threshold intensity, as discussed herein-above, the micro-hologram is erased. Thus, the threshold condition may be the same needed to be satisfied to form the targeted micro-hologram in the first place. The light beam may emanate from a conventional diode laser, similar to those conventionally used in CD and DVD technologies. FIG. 39 shows a system 3900 where data is recorded by a single laser beam, by focusing on pre-provided micro-holograms in a pre-formatted array and selectively erasing those micro-holograms corresponding to a bit to be written.

More particularly, laser beam 3910 is focused by focusing optics 3920 to a target volume 3940 in a media 3930 containing a pre-formed micro-hologram (not shown). The actual mechanism that erases the targeted hologram may be analogous to that used to form it in the first place. For example, pre-formatted holograms can be erased by using a single incident beam to cause any previously unaffected portion of the volume element (i.e., the regions in between the original fringes) to experience an index change resulting in the destruction of the fringe pattern—thus producing a region of continuous refractive index. Further, the laser need not be single-longitudinal-mode, because no interference is required, making the reading and recording lasers of a micro-holographic data device advantageously simple and potentially relatively inexpensive.

Optionally, a serial number may be optically recorded in the media. This serial number may be used to track the ownership of the recordable media to facilitate copyright protection, for example. The serial number may be optically recorded in a manner to facilitate optical detection thereof. The serial number may be optically recorded in predetermined location(s) in the media prior to, substantially simultaneously with, or after, data replication using a spatial light modulator.

Such a pre-formatted non-linear recording format for a micro-holographic data storage configuration may facilitate low cost micro-holographic recording systems to be realized. With optics on a single side of the medium, simplified optical heads may also be used. Further, a non single-longitudinal-mode laser may be used for recording data. Also, since only a single light beam is used, vibration tolerant recording systems for micro-holographic systems may also be realized.

It should be understood that the pre-format systems and methods described herein are not limited to volumetric storage systems and methods using non-linear and/or threshold responsive materials, but instead have broad applicability to volumetric storage systems and methods in general, including those using linearly responsive materials, such as that described United States Patent Publication 20050136333, the entire disclosure of which is hereby incorporated by reference.

Recovering Micro-Hologram Stored Data

Figure 40:
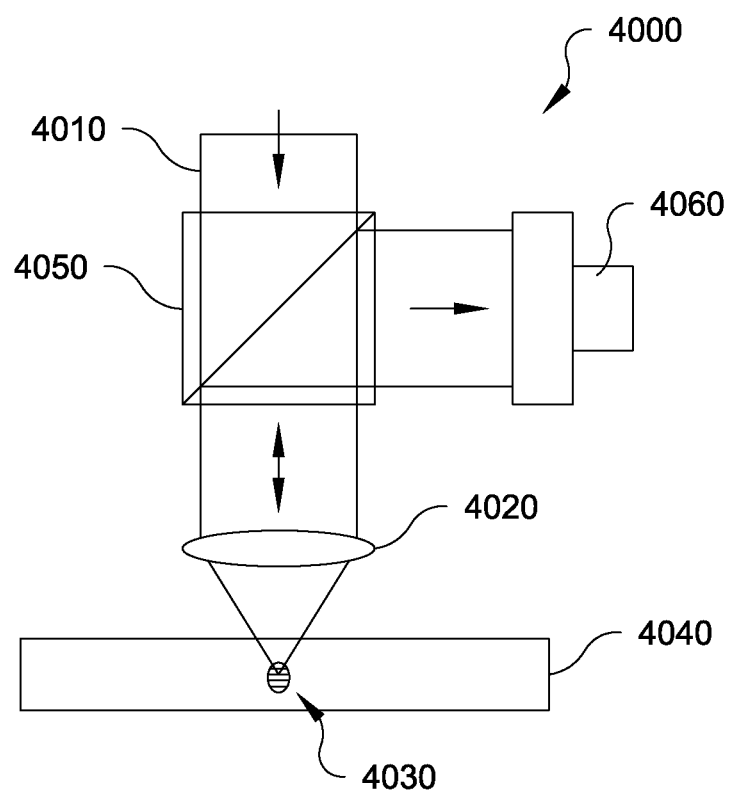
FIG. 40 illustrates a configuration for reading a micro-hologram array based memory device.

FIG. 40 shows a system 4000. System 4000 is suitable for detecting the presence or absence of a micro-hologram at a particular location within a medium, such as a spinning disc media. System 4000 may be targeted to select volumes using the tracking and focusing mechanisms described herein. In the illustrated embodiment, a laser beam 4010 is focused by a focusing optics 4020 to impinge a target volume 4030 within a media disc 4040, through a beam-splitter 4050. Light beam 4010 may emanate from a conventional laser diode, such as those used in CD and DVD players. Such a laser may take the form of a GaAs or GaN based diode laser, for example. Beam-splitter 4050 may take the form of a polarizing cube beam splitter, for example. Focusing optics 4020 may take the form of high numerical aperture focusing objective lensing, for example. Of course, other configurations are possible.

Regardless of the particulars, where a micro-hologram is present in target volume 4030, light beam 4010 is reflected back though optics 4020 to beam-splitter 4050. Beam-splitter 4050 re-directs the reflection to a detector 4060, which detects the presence or absence of a reflection. Detector 4060 may take the form of a photo-diode, surrounded by a quadrant detector, such as the commercially available Hamamatsu Si Pin photodiode model S6795, for example.

It should be understood that the data recovery systems and methods described herein are not limited to volumetric storage systems and methods using non-linear and/or threshold responsive materials, but instead have broad applicability to volumetric storage systems and methods in general, including those using linearly responsive materials, such as that described United States Patent Publication 20050136333, the entire disclosure of which is hereby incorporated by reference.

Revenue Protection

Pirating, and even casual copying, of pre-recorded optical media represents a significant source of economic loss for the entertainment and software industries. The availability of recordable media with high-speed (such as up to 177 Mbps) data transfer rates makes it reasonably easy to copy CDs or DVDs containing copyrighted music or feature films. In the software industry, content providers often use product activation codes to attempt to curtail the pirating of software. However, product activation codes and the data on the disc are not uniquely connected and several copies of the software can be installed on numerous machines with little or no way to detect the multiple copies or preventing simultaneous use.

In conventional pre-recorded optical media, e.g., CD or DVD, pre-recorded content is conventionally replicated by stamping corresponding data into the media during an injection molding process. This process may be used to reproduce the data on tens of thousands of discs from a single master, which inherently limits the ability to uniquely identify an individual disc. Several attempts have been made to provide additional equipment and processes to mark each disc subsequent to the molding process. However, these processes typically require one to record new data on, or erase data from, a molded disc to mark the disc. For example, attempts have been made to use a high power laser to "mark" the disc in a way that can be read by the drive. However, the data on the disc is considerably smaller than the spot that the laser is focused to, such that these marks are typically larger than the data and not easily interpreted by the drive.

Further, conventional optical data storage devices, such as DVD's, used to distribute pre-recorded content typically have sufficient capacity for, at most, two full length feature films. Often, content providers use the capacity to accommodate two different viewing formats of a same content, for example a traditional 4:3 format combined with the 16:9 format popular on more recent models of televisions.

Single-bit micro-holographic systems according to the present invention may be used to offer multiple, such as up to more than 50 individual feature films on a single CD-size disc, for example. In one embodiment, each disc is marked with an individually unique identification number, or a substantially unique identification number, that is embedded in the data and readable by the holographic drive. This is facilitated by the fact that the holographic data may be replicated in an optical manner. The ability to uniquely identify each large capacity disc enables a new business model for delivering content, in which each disc can contain numerous feature films grouped by various categories (such as genre, director, lead actor or actress), for example.

In such an embodiment a consumer may acquire, such as by purchasing, a pre-recorded disc. The cost may be commensurate with conventional media that provides user access to one content feature, such as one feature film, for example. According to an aspect of the present invention, the consumer may subsequently activate, such as by purchasing, additional content, such as additional feature films, contained on the disc. This may be accomplished by a content provider issuing an individual access code associated with an identification number encoded on a particular disc, or discreet set of discs. Where the disc serial number is not copy-able, the access code is not suitable to enable viewing of pirated content on another, differently serialized disc.

Further, consumers may be encouraged to copy discs (e.g., by recovering the data and re-reproducing it in another analogous media disc) and receive their own access codes based on serial numbers embedded on pre-formatted recordable discs, for example. In this way, user to user content distribution may actually be encouraged, while preserving a revenue stream for the content owner.

In one embodiment, single-bit micro-holographic data may be reproduced for mass-distribution by injection molding blank discs and subsequently transferring the data to discs through optical replication, e.g., flash exposure, as is discussed herein. Several locations on the disc may be intentionally left blank during the initial exposure of the data to be reproduced. These locations are subsequently recorded via additional optical exposures corresponding to identification numbers, where each number is unique to each disc or set of discs using a spatial light modulator, for example. These locations can also be used for identifying numbers on blank, pre-formatted discs.

Based upon anticipated storage requirements and storage capacities, a content-containing micro-holographic disc the size of a conventional CD may contain up to 50 standard definition full-length feature films, or 10 high definition (HD) full-length films, by way of non-limiting example only. The content may be grouped in any number of ways. For example, the content provider might place films in a given series on a disc, or films with a specific leading actor or actress, or films that fall within the same genre. The serial number of the disc may be indicated on or in the packaging of the disc when prepared for retail sale. When a consumer purchases the disc, the package may include an access code that the user is prompted to enter when playing the disc. The access code corresponds to the associated serialized disc to enable the user to view one, and only one specific feature (or discrete set of features) on the disc. Alternatively, a player for the disc may be equipped with hardware/software to enable it to communicate with a use authority, that provides an activation code to the player responsively to the serial number, and possibly the player's, identifiers and the level of access currently permitted.

Regardless, the drive or reading device may include memory, such as solid-state or magnetic memory devices, to store the access code once it has been entered so subsequent viewing of the feature will not require re-entering the number.

The user may contact the content provider, or its agent, via a computer network, such as the Internet, or via phone (for example via a toll-free phone call) to obtain additional activation codes that correspond to other features contained on the disc. Alternatively, the player may prompt the user to determine whether the user wishes to purchase the additional content, such as upon attempted selection of the digital content by the user. When the user enters another activation code, or that code is provided by a use authority for example, the player may check the number against the serial number of the disc and only enables the feature to be played if the code and serial number correspond or are associated. Accordingly, an access code is keyed for a specific disc serial number, which is not reproducible, such that while data corresponding to a feature on a disc may be copied, an access code that permits access to that feature is specific to the original disc and will not enable copies on other discs to be played.

According to an aspect of the present invention, the content itself may be reproduced onto a preformatted, blank media disc, for example. The content provider may even encourage consumers to provide copies of the disc to other consumers, to permit the downstream copy users to limited access to the content of the disc. Each disc (preformatted and prerecorded) may be provided with a unique, or substantially unique, identifier. The serial number will not transfer during copying. A user of the copy of the original media may contact the content provider or agent, analogously to the user of the original media, and request access codes corresponding to, or derived from, the serial number of the copy media disc. In this manner, the content is propagated while managing the corresponding digital rights.

According to an aspect of the present invention, a micro-holographic replication system may thus provide the ability to (at least substantially) uniquely serialize each disc in a manner that is readable by the micro-holographic drive. Micro-holograms may be recorded in reserved area(s) of the media disc by interfering two, counter-propagating laser beams, for example. Media discs may contain multiple content, such as feature films or other content, that can be accessed, such as by purchasing, individually.

Hardware and/or software may be used to compare access codes and serial numbers on the discs, to see if they correspond. A memory may be used to store access codes, so future viewing of the content does not require re-entry of the code. A business model in which new codes can be purchased to gain access to additional content on a disc may be provided. Pre-serialized recordable discs on which content can be copied and for which new access codes may be used to access the copied content may be provided.

Using a micro-hologram containing disc and reading drive with unique serial numbers and a business model enabling content to be purchased subsequent to the acquiring the media may provide several advantages. For example, revenue may be generated by facilitating the purchase of additional content already contained on a user's disc. Digital right protection may be enhanced via the serial numbering of both content containing and recordable discs and prohibiting copying of serial numbers. Avenues of content distribution via user copying of content-containing discs and the subsequent authorization of these discs may be provided. Multiple features films, albums, or other content may be provided, and independently activate-able on a single disc.

It should be understood that the revenue model described herein are not limited to volumetric storage systems and methods using non-linear and/or threshold responsive materials, but instead have broad applicability to volumetric storage systems and methods in general, including those using linearly responsive materials, such as that described United States Patent Publication 20050136333, the entire disclosure of which is hereby incorporated by reference.

It will be apparent to those skilled in the art that modifications and variations may be made in the apparatus and process of the present invention without departing from the spirit or scope of the invention. It is intended that the present invention cover such modifications and variations of this invention, including all equivalents thereof.

What is claimed is:

1. A method for storing data comprising:
providing a substrate having oppositely disposed surfaces, at least one groove in at least one of the surfaces, and a plurality of volumes arranged along tracks between the surfaces, wherein the grooves are configured to diffract light through at least one of the oppositely disposed surfaces; and,
forming a plurality of micro-holograms in the substrate;
wherein, each of the micro-holograms is substantially contained in a corresponding one of the plurality of volumes and the presence or absence of a micro-hologram in each of the plurality of volumes is indicative of a corresponding portion of the data;
sensing at least one diffraction pattern resulting from the at least one groove; and,
determining a depth in the substrate dependently upon the sensed diffraction pattern.

2. The method of claim 1, wherein said micro-holograms are selectively formed dependently upon the data.

3. The method of claim 1, further comprising selectively erasing select micro-holograms dependently upon the data.

4. The method of claim 1, wherein at least one of said micro-holograms stores more than one bit of data.

5. The method of claim 1, wherein said forming comprises interfering two counter-propagating light beams, wherein the sensed diffraction pattern corresponds to one of the interfering beams after it has traversed through the medium.

6. A method for recovering data stored in a substrate having oppositely disposed surfaces and a plurality of volumes arranged along tracks between the surfaces, comprising:
impinging said substrate with a reading beam;
detecting at least one diffraction pattern in said reading beam after it has traversed through the surfaces; and,
determining a focal depth of the reading beam in the substrate dependently upon a lateral spacing in the detected diffraction pattern;
wherein the diffraction pattern is substantially independent of the stored data.

7. The method of claim 6, wherein the substrate comprises at least one groove, having a pitch, in a surface thereof, and the lateral spacing is partially dependent upon the pitch.

* * * * *